(12) United States Patent
Kim et al.

(10) Patent No.: US 12,088,751 B2
(45) Date of Patent: Sep. 10, 2024

(54) HINGE ASSEMBLY AND ELECTRONIC DEVICE INCLUDING THE SAME

(71) Applicant: SAMSUNG ELECTRONICS CO., LTD., Suwon-si (KR)

(72) Inventors: Jongkeun Kim, Suwon-si (KR); Yonghwa Han, Suwon-si (KR); Myungchul Ryu, Suwon-si (KR); Sukjin Yun, Suwon-si (KR); Jaehoon Jang, Suwon-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 197 days.

(21) Appl. No.: 17/897,329

(22) Filed: Aug. 29, 2022

(65) Prior Publication Data
US 2023/0053373 A1 Feb. 23, 2023

Related U.S. Application Data

(63) Continuation of application No. PCT/KR2022/008678, filed on Jun. 20, 2022.

(30) Foreign Application Priority Data

Aug. 17, 2021 (KR) .................. 10-2021-0107984

(51) Int. Cl.
*G06F 1/16* (2006.01)
*F16C 11/04* (2006.01)
(Continued)

(52) U.S. Cl.
CPC ........... *H04M 1/0268* (2013.01); *F16C 11/04* (2013.01); *G06F 1/1641* (2013.01);
(Continued)

(58) Field of Classification Search
CPC .. H04M 1/0268; H04M 1/0214; H04M 1/022; H04M 1/0216; F16C 11/04;
(Continued)

(56) References Cited

U.S. PATENT DOCUMENTS 10,480,227 B1 * 11/2019 Chen ................... E05D 3/122
10,782,739 B2 9/2020 Ou et al.
(Continued)

FOREIGN PATENT DOCUMENTS

CN 210423406 U 4/2020
CN 212259028 U 12/2020
(Continued)

OTHER PUBLICATIONS

International Search Report for PCT/KR2022/008678 dated Sep. 29, 2022.

*Primary Examiner* — Anthony Q Edwards
*Assistant Examiner* — Hung Q Dang
(74) *Attorney, Agent, or Firm* — CANTOR COLBURN LLP

(57) ABSTRACT

An electronic device includes a display, and a hinge assembly foldable together with the display and corresponding to a folding area of the display. The hinge assembly includes a hinge bracket defining first and second hinge axes, first and second rotators connected to the hinge bracket and respectively rotatable about the first and second hinge axes, first and second sliders connected to the hinge bracket, respectively slidable relative to the hinge bracket in a direction parallel with the hinge axes, and spaced apart from each other in the direction, and an elastic member between the first and second sliders and providing an elastic force in the direction. The first and second rotators respectively include first and second helical structures having a helical shape with the first and second hinge axes as a center, and are each
(Continued)

connected to the first and second sliders through the first and second helical structures.

20 Claims, 28 Drawing Sheets

(51) Int. Cl.
 *H04M 1/02* (2006.01)
 *E05D 3/18* (2006.01)
(52) U.S. Cl.
 CPC ............. *H04M 1/0214* (2013.01); *E05D 3/18* (2013.01); *E05Y 2999/00* (2024.05)
(58) Field of Classification Search
 CPC ...... F16C 11/10; F16C 11/12; F16C 2380/00; E05D 3/18; E05Y 2900/606; G06F 1/1641; G06F 1/1652; G06F 1/1679; G06F 1/1681; H05K 5/0226
 See application file for complete search history.

(56) References Cited

U.S. PATENT DOCUMENTS

| | | | |
|---|---|---|---|
| 10,824,204 | B2 | 11/2020 | Lin et al. |
| 11,681,335 | B1* | 6/2023 | Hsu ....................... G06F 1/1681 |
| | | | 361/679.01 |
| 11,914,433 | B2* | 2/2024 | Liao ...................... G06F 1/1652 |
| 2015/0160695 | A1 | 6/2015 | Su et al. |
| 2018/0239402 | A1 | 8/2018 | Wang et al. |
| 2020/0291702 | A1* | 9/2020 | Hsu ....................... G06F 1/1681 |
| 2020/0371561 | A1* | 11/2020 | Lin ..................... E05D 11/1014 |

FOREIGN PATENT DOCUMENTS

| | | | | |
|---|---|---|---|---|
| CN | 110159648 B | | 3/2021 | |
| JP | 6342948 B2 | | 6/2018 | |
| KR | 1020190097898 A | | 8/2019 | |
| KR | 102181791 B1 | | 11/2020 | |
| KR | 1020200139066 | * | 12/2020 | ........... G06F 1/1641 |
| KR | 1020200139066 A | | 12/2020 | |
| KR | 1020220098945 A | | 7/2022 | |
| KR | 1020220115349 A | | 8/2022 | |

* cited by examiner

HINGE ASSEMBLY AND ELECTRONIC DEVICE INCLUDING THE SAME

CROSS-REFERENCE TO RELATED APPLICATIONS

This application is a national stage application of International Application No. PCT/KR2022/008678 designating the United States, filed on Jun. 20, 2022, in the Korean Intellectual Property Receiving Office and claiming priority to Korean Patent Application No. 10-2021-0107984, filed on Aug. 17, 2021, in the Korean Intellectual Property Office, the disclosures of which are incorporated by reference herein in their entireties.

BACKGROUND

1. Field

The disclosure relates to a hinge assembly and an electronic device including the hinge assembly.

2. Description of Related Art

With the development of display-related technologies, electronic devices with flexible displays have been developed. A flexible display may be used in the form of a flat shape, and may also be deformed to be used in a non-flat shape. For example, an electronic device with a flexible display may be implemented in a foldable form to be folded or unfolded about at least one folding axis.

SUMMARY

To implement a folding operation or unfolding operation of an electronic device, a hinge assembly may be provided between a first housing and a second housing. The hinge assembly may have a structure for generating a force to maintain a predetermined folding state of the electronic device. In addition, to synchronize folding angles of the first housing and the second housing, a sync assembly configured to interoperate the folding operation of the first housing with the folding operation of the second housing may be provided. When the hinge assembly and the sync assembly are provided as separate components, the number of components may increase, and thus, the weight and/or cost of the electronic device may increase. In addition, due to a gap between components of the sync assembly, an interoperation difference on the left and right and/or an abnormal operation may occur in folding or unfolding operations.

Various example embodiments may provide a hinge assembly integrating rotation, detent (e.g., maintenance of position), and interoperation functions into one assembly and an electronic device including the same.

Various example embodiments may provide a hinge assembly that may reduce an interoperation difference on opposing sides (e.g., the left and right) due to a gap between components and/or an abnormal operation and an electronic device including the same.

According to an example embodiment, the electronic device 300 includes the display 250 including the first area 251 (e.g., a non-folding area or a first non-folding area), the second area 252 (e.g., a non-folding area or a second non-folding area), and the folding area 253 between the first area 251 and the second area 252, the first housing 311 configured to support the first area 251, the second housing 312 configured to support the second area 252, the hinge assembly 400 configured to connect the first housing 311 to the second housing 312 and operate between a folded state in which the first area 251 and the second area 252 face each other and an unfolded state in which the first area 251 and the second area 252 do not face each other (e.g., are disposed in a same plane or flat), where the hinge assembly 400 may include the hinge bracket 410 defining the first hinge axis Ha and the second hinge axis Hb, the first rotator 420 and the second rotator 430 both connected to the hinge bracket 410 and respectively rotatable on the first hinge axis Ha and the second hinge axis Hb, the first slider 440 and the second slider 450 both connected to the hinge bracket 410, slidable in a direction parallel with the first hinge axis Ha or the second hinge axis Hb, and spaced apart from each other in the direction parallel with the first hinge axis Ha and the second hinge axis Hb, and the elastic member 460 disposed between the first slider 440 and the second slider 450 and configured to provide an elastic force in the direction parallel with the first hinge axis Ha or the second hinge axis Hb, where the first rotator 420 may be connected to the first slider 440 and the second slider 450 through the first helical structure 423 formed in a helical shape in a direction with the first hinge axis Ha as a center, and the second rotator 430 may be connected to the first slider 440 and the second slider 450 through the second helical structure 433 formed in a helical shape in a direction with the second hinge axis Hb as a center.

According to an example embodiment, the hinge assembly 400 applied to the foldable electronic device 300 includes the hinge bracket 410 defining the first hinge axis Ha and the second hinge axis Hb, the first rotator 420 and the second rotator 430 both connected to the hinge bracket 410 and respectively rotatable on the first hinge axis Ha and the second hinge axis Hb, the first slider 440 and the second slider 450 both connected to the hinge bracket 410, slidable in a direction parallel with the first hinge axis Ha or the second hinge axis Hb, and spaced apart from each other in the direction parallel with the first hinge axis Ha and the second hinge axis Hb, and the elastic member 460 disposed between the first slider 440 and the second slider 450 and configured to provide an elastic force in the direction parallel with the first hinge axis Ha or the second hinge axis Hb, where the first rotator 420 may be connected to the first slider 440 and the second slider 450 through the first helical structure 423 formed in a helical shape in a direction with the first hinge axis Ha as a center, and the second rotator 430 may be connected to the first slider 440 and the second slider 450 through the second helical structure 433 formed in a helical shape in a direction with the second hinge axis Hb as a center.

According to various example embodiments, one same hinge assembly may perform rotation, detent (e.g., maintenance of position), and interoperation functions. Accordingly, the number of components, width, weight, and/or cost of the electronic device may decrease.

According to various embodiments, by reducing an abnormal operation and/or an interoperation difference on the left and right of an electronic device including the hinge assembly, due to a gap between components, the quality of folding or unfolding operations of the hinge assembly and the electronic device may improve.

BRIEF DESCRIPTION OF THE DRAWINGS

The above and other aspects, features, and advantages of embodiments of the present disclosure will be more apparent from the following detailed description, taken in conjunction with the accompanying drawings, in which.

DETAILED DESCRIPTION

Figure 1:
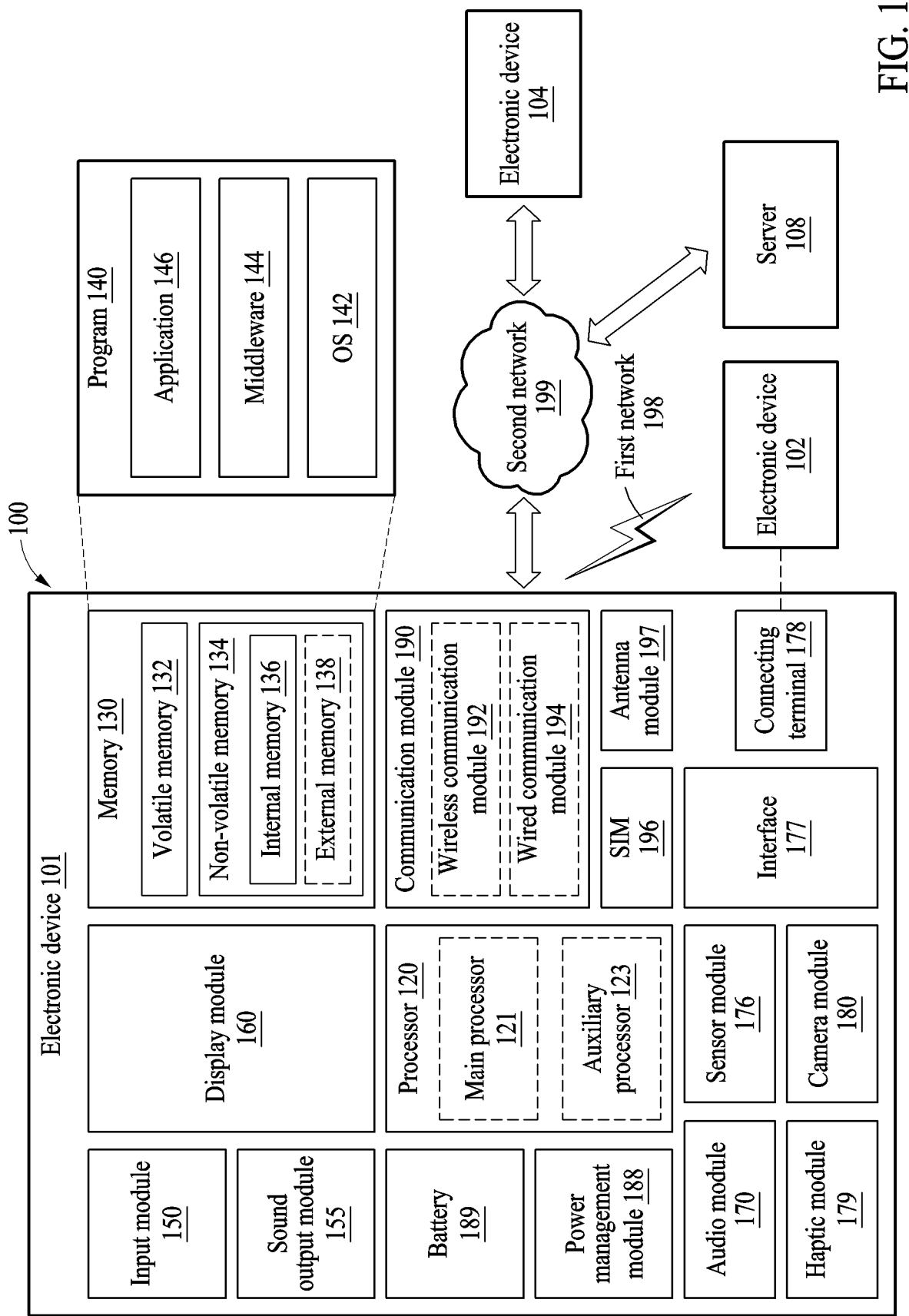
FIG. 1 is a block diagram illustrating an electronic device in a network environment according to an example embodiment.

Hereinafter, example embodiments will be described in detail with reference to the accompanying drawings. When describing the example embodiments with reference to the accompanying drawings, like reference numerals refer to like elements and a repeated description related thereto will be omitted.

FIG. 1 is a block diagram illustrating an electronic device 101 in a network environment 100 according to an example embodiment.

Referring to FIG. 1, the electronic device 101 in the network environment 100 may communicate with an electronic device 102 via a first network 198 (e.g., a short-range wireless communication network), or communicate with an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one (e.g., the connecting terminal 178) of the above components may be omitted from the electronic device 101, or one or more other components may be added in the electronic device 101. In some example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to an example embodiment, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
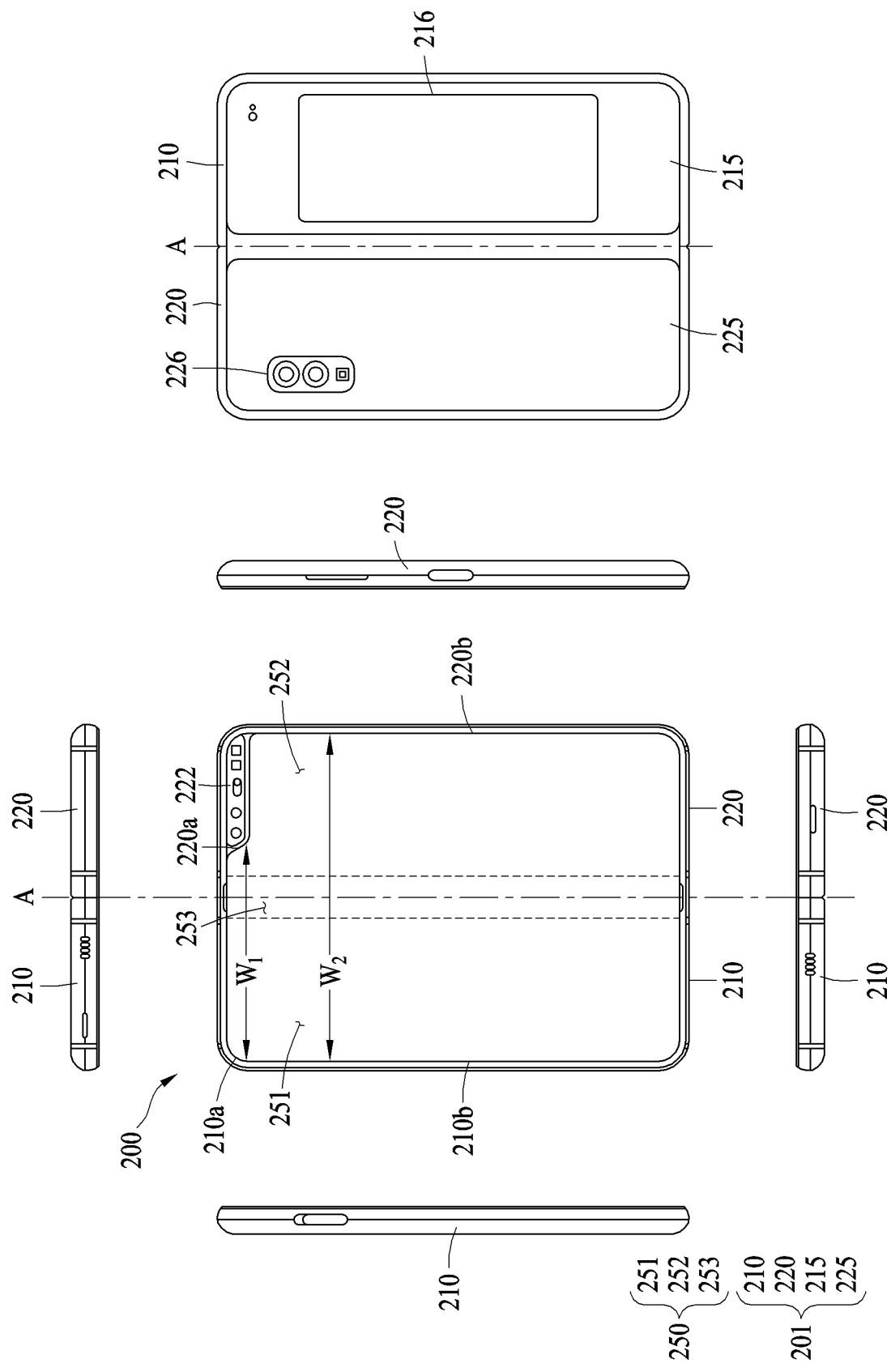
FIG. 2A is a view of an unfolded state of an electronic device according to an example embodiment.
Figure 2B:
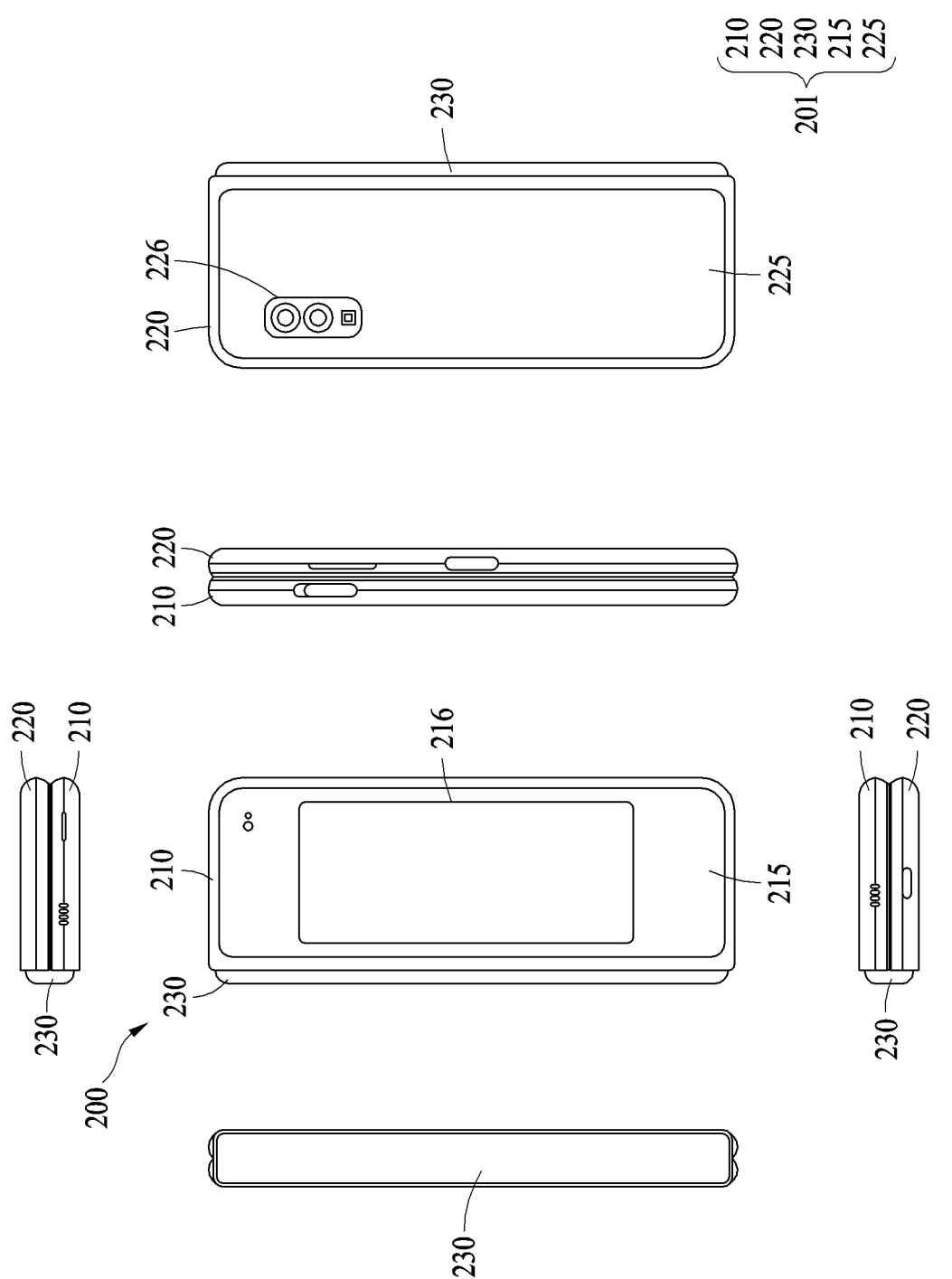
FIG. 2B is a view of a folded state of the electronic device according to an example embodiment.
Figure 2C:
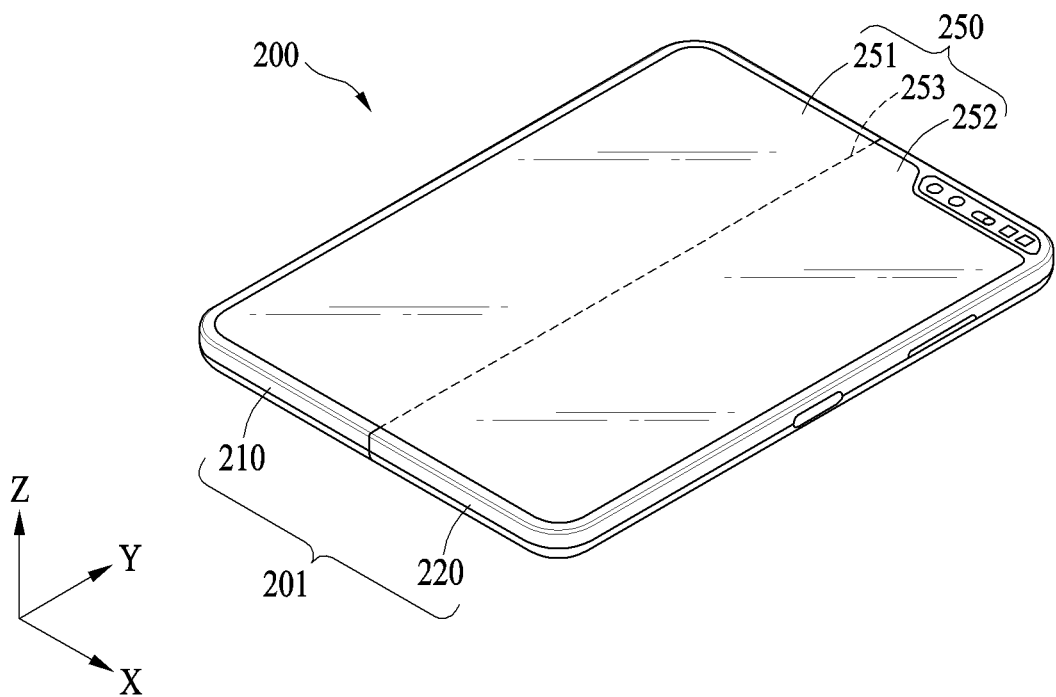
FIG. 2C is a perspective view of the electronic device in a fully unfolded state according to an example embodiment.
Figure 2D:
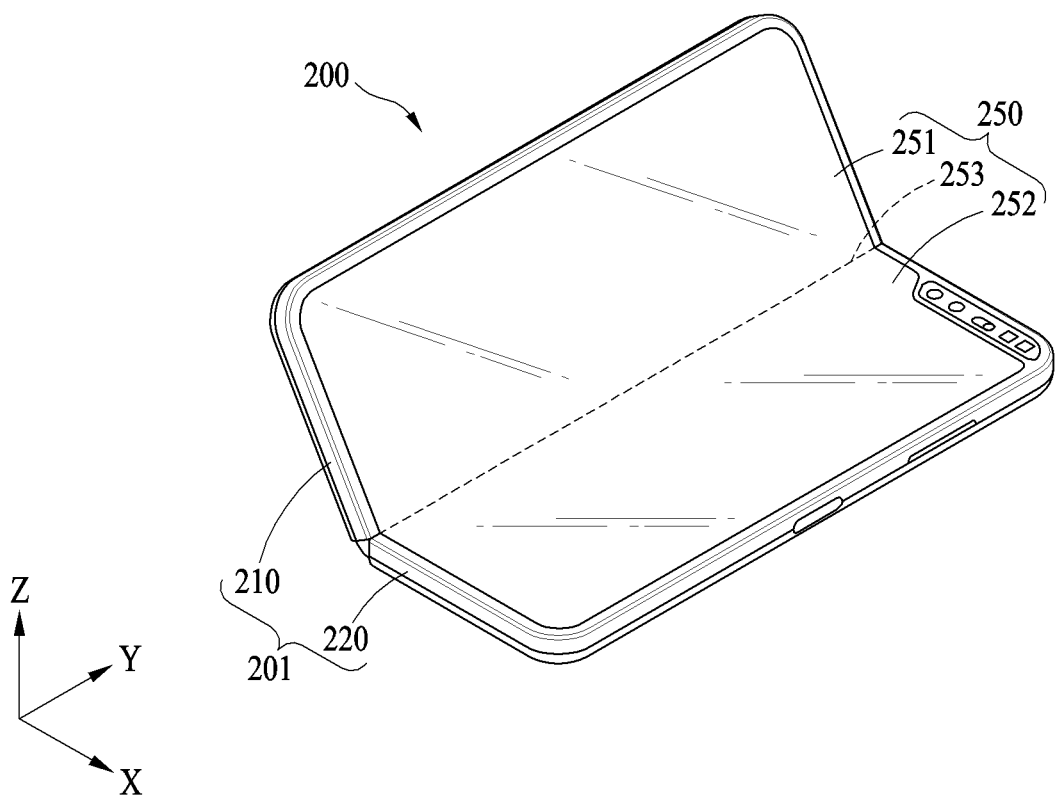
FIG. 2D is a perspective view of the electronic device in a partially unfolded state (or an intermediate state) according to an example embodiment.

FIG. 2A is a diagram illustrating an electronic device 200 which is unfolded (e.g., an unfolded state of an electronic device 200) according to an example embodiment. FIG. 2B is a diagram illustrating the electronic device 200 which is folded (e.g., a folded state of the electronic device 200) according to an example embodiment. Within each of FIGS. 2A and 2B, the middle views in order from left to right show a left side view, a front view, a right side view and a rear view, the uppermost view shows top side view, and the lowermost view shows a bottom side view, relative to each other. FIG. 2C is a perspective view illustrating an example of the electronic device 200 which is fully unfolded (e.g., a fully unfolded state of the electronic device 200) according to an example embodiment. FIG. 2D is a perspective view illustrating an example of the electronic device 200 which is partially folded (e.g., an intermediate state of the electronic device 200) according to an example embodiment.

The electronic device 200 of FIGS. 2A through 2D is an example of the electronic device 101 of FIG. 1 and may be a foldable or bendable electronic device.

In FIGS. 2C and 2D and other following drawings, illustrated is a spatial coordinate system defined by an X axis, a Y axis, and a Z axis that are orthogonal to each other. Here, the X-axis may represent a width direction of an electronic device, the Y-axis may represent a length direction of the electronic device, and the Z-axis may represent a height (or thickness) direction of the electronic device. In the following description, a "first direction" may refer to a direction parallel to the Z-axis.

Referring to FIGS. 2A and 2B, in an example embodiment, the electronic device 200 may include a foldable housing 201 and a flexible or foldable display 250 (hereinafter, the "display" 250 in short) (e.g., the display module 160 of FIG. 1) disposed in a space formed by the foldable housing 201. A surface on which the display 250 is disposed (or a surface on which the display 250 is viewed from the outside of the electronic device 200) may be defined as a front surface of the electronic device 200. In addition, a surface opposite to the front surface may be defined as a rear surface of the electronic device 200. Furthermore, a surface surrounding a space between the front surface and the rear surface may be defined as a side surface of the electronic device 200.

According to an example embodiment, the foldable housing 201 may include a first housing structure 210, a second housing structure 220 including a sensor area 222, a first rear cover 215, a second rear cover 225, and a hinge structure 230. Here, the hinge structure 230 may include a hinge cover that covers a foldable portion of the foldable housing 201. The foldable housing 201 of the electronic device 200 is not limited to the shape and combination shown in FIGS. 2A and 2B and may be implemented in a different shape or a different combination of components. For example, in an example embodiment, the first housing structure 210 and the first rear cover 215 may be integrally formed as a first housing and the second housing structure 220 and the second rear cover 225 may be integrally formed as a second housing. The first housing and the second housing may together form a housing of the electronic device 200.

According to an example embodiment, the first housing structure 210 may be connected to the hinge structure 230 and may include a first surface facing a first direction and a second surface facing a second direction opposite to the first direction. The second housing structure 220 may be connected to the hinge structure 230 and may include a third surface facing a third direction and a fourth surface facing a fourth direction opposite to the third direction. The second housing structure 220 may be rotatable to rotate with respect to the first housing structure 210 about the hinge structure 230. A state of the electronic device 200 may be changed to a folded state or an unfolded state.

According to an example embodiment, the first surface may face the third surface in a state in which the electronic device 200 is fully folded and the third direction may be identical to the first direction in a state in which the electronic device 200 is fully unfolded.

According to an example embodiment, the first housing structure 210 and the second housing structure 220 are disposed on both sides (or opposing sides) with respect to a folding axis A and generally may be symmetrical with respect to the folding axis A. As to be described hereinafter, an angle or distance between the first housing structure 210 and the second housing structure 220 may vary depending on whether the state of the electronic device 200 is the unfolded state, the folded state, or a partially unfolded or folded state (or an intermediate state). According to an example embodiment, unlike the first housing structure 210, the second housing structure 220 may additionally include the sensor area 222, in which various sensors are arranged, however the first housing structure 210 and the second housing structure 220 may have shapes symmetrical to each other in areas other than the sensor area 222.

According to an example embodiment, as shown in FIG. 2A, the first housing structure 210 and the second housing structure 220 may together form a recess (or receiving space) for accommodating the display 250. In an example embodiment, due to the sensor area 222, the recess may have at least two different widths in a direction perpendicular to the folding axis A. For example, the recess may have a first width $W_1$ between a first portion 210a of the first housing structure 210 parallel to the folding axis A and a first portion 220a of the second housing structure 220 formed on a periphery of the sensor area 222 and may have a second width $W_2$ formed by a second portion 210b of the first housing structure 210 and a second portion 220b of the second housing structure 220 not corresponding to the sensor area 222 and parallel to the folding axis A. In this case, the second width $W_2$ may be greater than the first width $W_1$. In an example embodiment, the first portion 220a and the second portion 220b of the second housing structure 220 may be at different distances from the folding axis A. The widths of the recess are not limited to the shown example. In an example embodiment, the recess may have a plurality of widths according to the shape of the sensor area 222 or asymmetrical portions of the first housing structure 210 and the second housing structure 220. According to an example embodiment, the sensor area 222 may be formed to have a predetermined area adjacent to one corner of the second housing structure 220. However, the arrangement, shape, and size of the sensor area 222 are not limited to the shown example. For example, in an example embodiment, the sensor area 222 may be provided at another corner of the second housing structure 220 or in a predetermined area between an upper corner and a lower corner. In an example embodiment, components embedded in the electronic device 200 to perform various functions (e.g., functional component) may be exposed to the front surface of the electronic device 200 through the sensor area 222 or through one or more openings provided in the sensor area 222. In an example embodiment, the components may include various types of sensors. The sensors may include, for example, at least one of a front camera, a receiver, or a proximity sensor. According to an example embodiment, the sensor area 222 may not be included in the second housing structure 220 or may be formed at a position different from that shown in the drawings.

According to an example embodiment, at least a portion of the first housing structure 210 and the second housing structure 220 may be formed of a metal material or a non-metal material having a selected magnitude of rigidity to support the display 250. At least a portion formed of the metal material may provide a ground plane for the electronic device 200 and may be electrically connected to a ground line formed on a printed circuit board (PCB) disposed inside the foldable housing 201.

According to an example embodiment, the first rear cover 215 may be disposed on one side of the folding axis A on a rear surface of the electronic device 200 and may have, for example, a substantially rectangular periphery that may be surrounded by the first housing structure 210. Similarly, the second rear cover 225 may be disposed on the other side of the folding axis A on the rear surface of the electronic device 200 and may have a periphery that may be surrounded by the second housing structure 220.

According to an example embodiment, the first rear cover 215 and the second rear cover 225 may be substantially symmetrical with respect to the folding axis A. However, the first rear cover 215 and the second rear cover 225 are not necessarily mutually symmetrical. In another example, the electronic device 200 may include a first rear cover 215 and a second rear cover 225 in various shapes. In an example embodiment, the first rear cover 215 may be formed integrally with the first housing structure 210 and the second rear cover 225 may be formed integrally with the second housing structure 220.

According to an example embodiment, the first rear cover 215, the second rear cover 225, the first housing structure 210, and the second housing structure 220 may together form a housing which defines a space in which various components (e.g., a PCB or a battery) of the electronic device 200 are to be disposed. In an example embodiment, one or more components may be disposed or visually exposed on (or at) the rear surface of the electronic device 200, to outside the electronic device 200. For example, at least a portion of a sub-display may be visually exposed through a first rear area 216 of the first rear cover 215. In another example embodiment, one or more components or sensors may be visually exposed to outside the electronic device 200 through a second rear area 226 of the second rear cover 225. In an example embodiment, the sensors may include a proximity sensor and/or a rear camera.

According to an example embodiment, a front camera exposed to outside the electronic device 200 at the front surface of the electronic device 200 through one or more openings provided in the sensor area 222, or a rear camera exposed to outside the electronic device 200 through the second rear area 226 of the second rear cover 225, may include one or more lenses, an image sensor, and/or an image signal processor. A flash may include, for example, a light-emitting diode (LED) or a xenon lamp. In some example embodiments, two or more lenses (e.g., infrared camera, wide-angle, and telephoto lenses) and image sensors may be disposed on one surface of the electronic device 200.

Referring to FIG. 2B, the hinge cover may be disposed between the first housing structure 210 and the second housing structure 220 to cover internal components (e.g., the hinge structure 230). According to an example embodiment, the hinge structure 230 may be covered by a portion of the first housing structure 210 and a portion of the second housing structure 220, or may be exposed to the outside, depending on the state (e.g., the unfolded state, the intermediate state, or the folded state) of the electronic device 200.

For example, when the electronic device 200 is in the unfolded state (e.g., the fully unfolded state), as illustrated in FIG. 2A, the hinge structure 230 may be covered by portions of the first housing structure 210 and the second housing structure 220, such that the hinge structure 230 may not be exposed to outside the electronic device 200 (e.g., to the outside). In another example, when the electronic device 200 is in the folded state (e.g., a fully folded state), as shown in FIG. 2B, the hinge structure 230 may be exposed to the outside, at a location between the first housing structure 210 and the second housing structure 220. In another example, when the first housing structure 210 and the second housing structure 220 are in the intermediate state where the first housing structure 210 and the second housing structure 220 are folded with a certain angle, a portion of the hinge structure 230 may be exposed to the outside between the first housing structure 210 and the second housing structure 220. However, the area exposed in this example may be smaller than that in the fully folded state. In an example embodiment, the hinge structure 230 may include a curved surface.

According to an example embodiment, the display 250 may be disposed in a space formed by the foldable housing 201. For example, the display 250 may be seated in the recess formed by the foldable housing 201 and may be viewable from the outside through the front surface of the electronic device 200. For example, the display 250 may constitute (or define) most of the front surface of the electronic device 200. Accordingly, the front surface of the electronic device 200 may include a portion or surface of the display 250, together with a partial area of the first housing structure 210 and a partial area of the second housing structure 220, which are adjacent to the display 250. In addition, the rear surface of the electronic device 200 may include the first rear cover 215, a partial area of the first housing structure 210 adjacent to the first rear cover 215, the second rear cover 225, and a partial area of the second housing structure 220 adjacent to the second rear cover 225.

According to an example embodiment, the display 250 may refer to a display (or display device) in which at least one area is deformable into a planar surface or a curved surface. In an example embodiment, the display 250 may include a folding area 253, a first area 251 disposed on one side of the folding area 253 (e.g., on the left side of the folding area 253 shown in FIG. 2A), and a second area 252 disposed on the other side of the folding area 253 (e.g., on the right side of the folding area 253 shown in FIG. 2A).

However, the area division of the display 250 shown in FIG. 2A is merely an example, and the display 250 may be divided into a plurality of areas (e.g., four or more areas, or two areas) depending on the structure or functions thereof. In an example, as shown in FIG. 2A, the display 250 may be divided into areas based on the folding area 253 extending in parallel to the folding axis A. In another example, the display 250 may be divided into areas based on another folding axis (e.g., a folding axis parallel to a width direction of an electronic device).

According to an example embodiment, the display 250 may couple or be adjacent to a touch panel (not shown) in which a touch sensing circuit and a pressure sensor configured to measure an intensity (or pressure) of an external input such as a touch are provided. For example, the display 250 is an example of a touch panel and may be coupled to or disposed adjacent to a touch panel for detecting an electromagnetic resonance (EMR) type stylus pen as an input tool providing the external input.

According to an example embodiment, the first area 251 and the second area 252 may generally have symmetrical shapes with respect to the folding area 253. However, unlike the first area 251, the second area 252 may include a notch cut according to inclusion of the sensor area 222, but the other areas of the second area 252 may be symmetrical to the first area 251. For example, the first area 251 and the second area 252 may include mutually symmetrical portions and mutually asymmetrical portions.

According to an example embodiment, an edge thickness of each of the first area 251 and the second area 252 may be different from an edge thickness of the folding area 253. The edge thickness of the various areas may be taken at an outer edge thereof, without being limited thereto. The edge thickness of the folding area 253 may be less than those of the first area 251 and the second area 252. For example, the first area 251 and the second area 252 may be asymmetrical in terms of thickness when cross-sectionally viewed. For example, an edge of the first area 251 may be formed to have a first radius of curvature and an edge of the second area 252 may be formed to have a second radius of curvature that is different from the first radius of curvature. In another example, the first area 251 and the second area 252 may be symmetrical in terms of thickness when cross-sectionally viewed.

Hereinafter, each area of the display 250 and operations of the first housing structure 210 and the second housing structure 220 depending on the state (e.g., a folded state, an unfolded state, or an intermediate state) of the electronic device 200) will be described.

According to an example embodiment, when the electronic device 200 is in the unfolded state (e.g., FIG. 2A), the first housing structure 210 and the second housing structure 220 may be arranged to face the same direction and define an angle of about 180 degrees between the first housing structure 210 and the second housing structure 220. The surface of the first area 251 of the display 250 and the surface of the second area 252 thereof may face the same direction (e.g., a front direction of an electronic device) with an angle of about 180 degrees therebetween. The folding area 253 may form a same plane together with the first area 251 and the second area 252 (e.g., the folding area 253, the first area 251 and the second area 252 may be coplanar with each other).

According to an example embodiment, when the electronic device 200 is in the folded state (e.g., FIG. 2B), the first housing structure 210 and the second housing structure 220 may be arranged to face each other. The surface of the first area 251 and the surface of the second area 252 of the display 250 may face each other and form a narrow angle (e.g., an angle between about 0 degrees to about 10 degrees as an internal angle) between the first housing structure 210 and the second housing structure 220. The first housing structure 210 and the second housing structure 220 facing each other may dispose at least a portion of the folding area 253 curved to define a curved surface having a predetermined curvature.

According to an example embodiment, when the electronic device 200 is in the intermediate state, the first housing structure 210 and the second housing structure 220 may be arranged to form a certain angle therebetween (e.g., an intermediate angle greater than the narrow angle and less than the angle of 180 degrees). The surface of the first area 251 and the surface of the second area 252 of the display 250 may form an angle greater than that in the folded state and smaller than that in the unfolded state. At least a portion of the folding area 253 may include a curved surface having a predetermined curvature, and the curvature may be less than a curvature in the folded state.

FIG. 2C illustrates a fully unfolded state of the electronic device 200 and FIG. 2D illustrates a partially folded state, that is, an intermediate state of the electronic device 200. As described above, the state of the electronic device 200 may be changed to the folded state or the unfolded state. According to an example embodiment, when viewed in (or along) a direction of a folding axis (e.g., the folding axis A of FIG. 2A), the electronic device 200 may be folded in two types, e.g., an "in-folding" type in which portions of the front surface of the electronic device 200 are folded to form an acute angle therebetween, and an "out-folding" type in which the portions of the front surface of the electronic device 200 are folded to form an obtuse angle therebetween. In an example, in the state in which the electronic device 200 is folded in the in-folding type, the first surface of the first housing structure 210 may face the third surface of the second housing structure 220. In the fully unfolded state, the first surface of the first housing structure 210 and the third surface of the second housing structure 220 may face the same direction (e.g., a direction parallel to the z-axis).

In another example, when the electronic device 200 is folded in the out-folding type, the second surface of the first housing structure 210 may face the fourth surface of the second housing structure 220.

In addition, although not shown in the drawings, the electronic device 200 may include a plurality of hinge axes (e.g., two parallel hinge axes including the folding axis A of FIG. 2A and another axis parallel to the folding axis A). In this example, the electronic device 200 may also be folded in a "multi-folding" type in which the in-folding type is combined with the out-folding type.

The in-folding type may refer to a state in which the display 250 is not exposed to the outside in the fully in-folded state. The out-folding type may refer to a state in which the display 250 is exposed to the outside in the fully out-folded state. FIG. 2D shows an intermediate state in which the electronic device 200 is partially unfolded in an in-folding process.

Although the state in which the electronic device 200 is folded in the in-folding type will be described below for convenience's sake, it should be noted that the description may be similarly applied to the state in which the electronic device 200 is folded in the out-folding type.

The electronic device according to an example embodiment may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that an example embodiment of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof "At least one" is not to be construed as limiting "a" or "an." "Or" means "and/or." As used herein, the term "and/or" includes any and all combinations of one or more of the associated listed items.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Terms such as "first", "second", or "first" or "second" may simply be used to distinguish the component from other components in question, and do not limit the components in other aspects (e.g., importance or order). Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly, physically contacting, forming an interface therebetween), wirelessly, or via a third element. In contrast, when elements which are described as related to each other such as being "directly coupled" or "directly on", no third (intervening) element is disposed between the elements.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used in connection with an example embodiment of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

An example embodiment as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to an example embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to an example embodiment, each component (e.g., a module or a program) of the above-described components may include a single entity or multiple entities, and some of the multiple entities may be separately disposed in different components. According to an example embodiment, one or more of the above-described components may be omitted, or one or more other components may be added. Alternatively or additionally, a plurality of components (e.g., modules or programs) may be integrated into a single component. In such a case, according to an example embodiment, the integrated component may still perform one or more functions of each of the plurality of components in the same or similar manner as they are performed by a corresponding one of the plurality of components before the integration. According to an example embodiment, operations performed by the module, the program, or another component may be carried out sequentially, in parallel, repeatedly, or heuristically, or one or more of the operations may be executed in a different order or omitted, or one or more other operations may be added.

Figure 3:
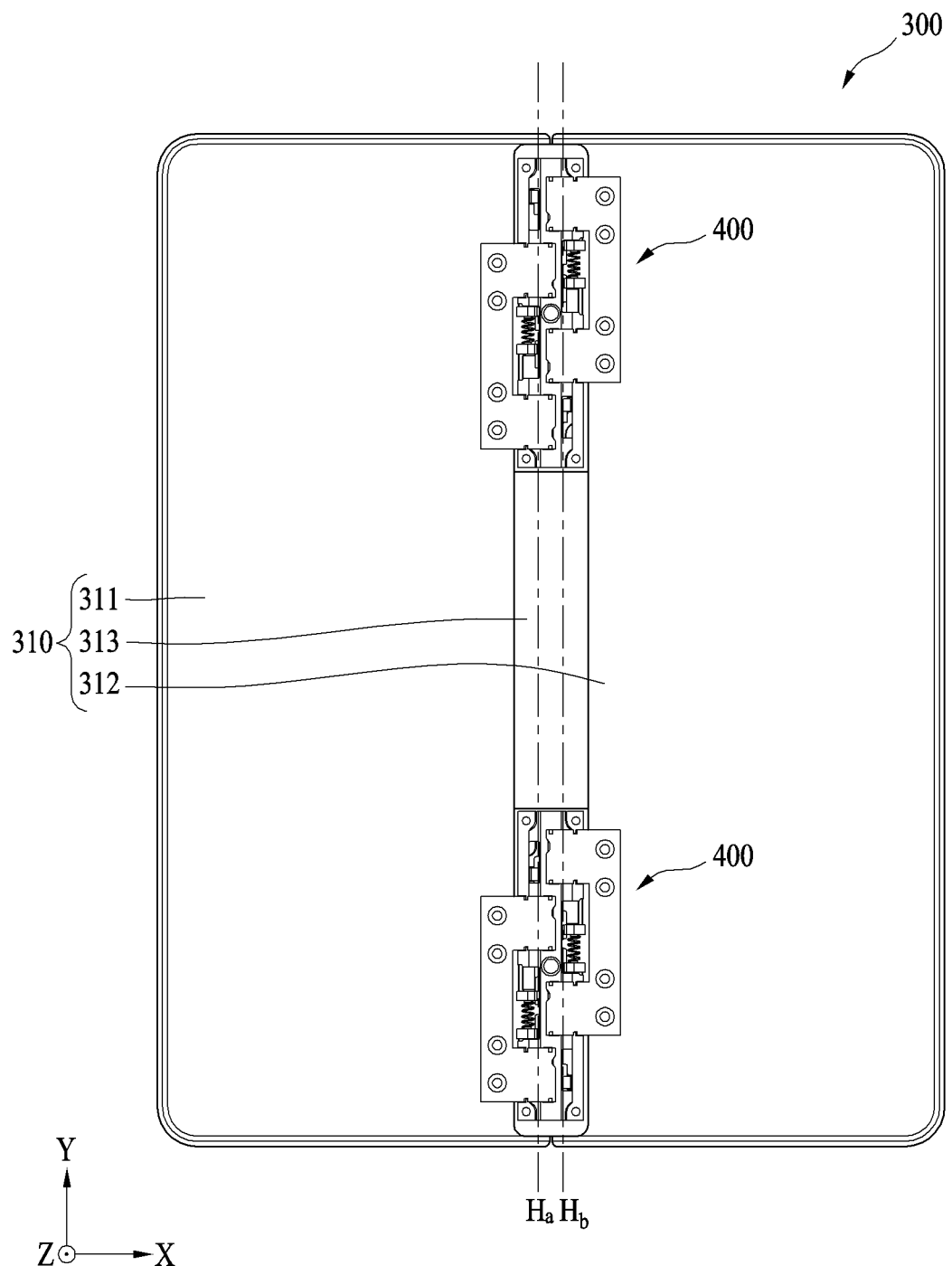
FIG. 3 is a front view illustrating a state in which a hinge assembly is applied to an electronic device according to an example embodiment.

FIG. 3 is a front view illustrating a state in which a hinge assembly is applied in an electronic device according to an example embodiment.

Referring to FIG. 3, an electronic device 300 (e.g., the electronic device 101 of FIG. 1 or the electronic device 200 of FIGS. 2A through 2D) according to an example embodiment may be a foldable electronic device. For example, the electronic device 300 may be folded or unfolded based on a pair of hinge axes Ha and Hb. The pair of hinge axes Ha and Hb may be substantially parallel with each other. However, FIG. 3 is merely an example, and the size, the shape, the structure, and the hinge axes of the electronic device 300 are not limited thereto. For example, the electronic device 300 of FIG. 3 may include the first or second hinge axis Ha or Hb in the y-axis direction, which is a long side direction, however, an electronic device according to an example embodiment may also include a hinge axis in the x-axis direction, which is a short side direction.

The electronic device 300 according to an example embodiment may include a housing 310 (e.g., the foldable housing 201 of FIGS. 2A through 2D), a display (not shown) (e.g., the display module 160 of FIG. 1 or the display 250 of FIGS. 2A through 2D), and a hinge assembly 400.

In an example embodiment, the housing 310 may form at least a portion of external surfaces of the electronic device 300. The housing 310 may include a first housing 311 (e.g., the first housing structure 210 of FIGS. 2A through 2D), a second housing 312 (e.g., the second housing structure 220 of FIGS. 2A through 2D), and a hinge housing 313.

In an example embodiment, the first housing 311 and the second housing 312 may be foldably and rotatably connected to each other by the hinge assembly 400. An angle or distance between the first housing 311 and the second housing 312 may vary depending on whether the electronic device 300 is in a flat state or unfolded state, a folded state, or an intermediate state. The intermediate state described above may include all states between the (fully) unfolded state and the (fully) folded state. The hinge housing 313 may be disposed between the first housing 311 and the second housing 312 to provide a space for mounting internal components (e.g., the hinge assembly 400). For example, the hinge housing 313 may be configured to cover the hinge assembly 400 such that the hinge assembly 400 is not exposed to the outside.

In an example embodiment, the first housing 311 and the second housing 312 may provide a space in which the display 250 is disposed. The display 250 may be a foldable flexible display. For example, the display 250 may include a first area (e.g., the first area 251 of FIG. 2C), a second area (e.g., the second area 252 of FIG. 2C), and a folding area (e.g., the folding area 253 of FIG. 2C) between the first area and the second area. The first housing 311 may be disposed at a position corresponding to the first area 251 of the display 250 to support the first area 251 of the display 250. The second housing 312 may be disposed at a position corresponding to the second area 252 of the display 250 to support the second area 252 of the display 250.

In an example embodiment, the hinge assembly 400 may be disposed between the first housing 311 and the second housing 312 to connect the first housing 311 to the second housing 312. For example, the hinge structure 230 of FIG. 2B may include a plurality of hinge assemblies 400. The plurality of hinge assemblies 400 may be spaced apart from each other along the first or second hinge axis Ha or Hb. For example, as shown in FIG. 3, two hinge assemblies 400 may be spaced apart along the first or second hinge axis Ha or Hb. However, this is merely an example, and the number of hinge assemblies 400 is not limited thereto. The hinge assembly 400 may implement folding or unfolding operations of the electronic device 300. The hinge assembly 400 may operate between a folded state in which the first area 251 and the second area 252 face each other and an unfolded state in which the first area 251 and the second area 252 do not face each other.

The hinge assembly 400 may generate a force (e.g., a friction force) to maintain a specific folded state of the electronic device 300. For example, when the electronic device 300 is in the folded state, the hinge assembly 400 may generate a force for allowing the electronic device 300 to remain in the folded state. When the electronic device 300 is in the unfolded state, the hinge assembly 400 may generate a force for allowing the electronic device 300 to remain in the unfolded state. When the electronic device 300 is in the intermediate state, the hinge assembly 400 may generate a force for allowing the electronic device 300 to remain in the intermediate state. In addition, the hinge assembly 400 may synchronize a folding angle of the first housing 311 with a folding angle of the second housing 312. For example, the hinge assembly 400 may interoperate a folding operation of the first housing 311 with a folding operation of the second housing 312 such that the folding angle of the first housing 311 may be synchronized with the folding angle of the second housing 312. That is, the first housing 311 may be foldable or rotatable together with the folding or rotation of the second housing 312.

Figure 4A:
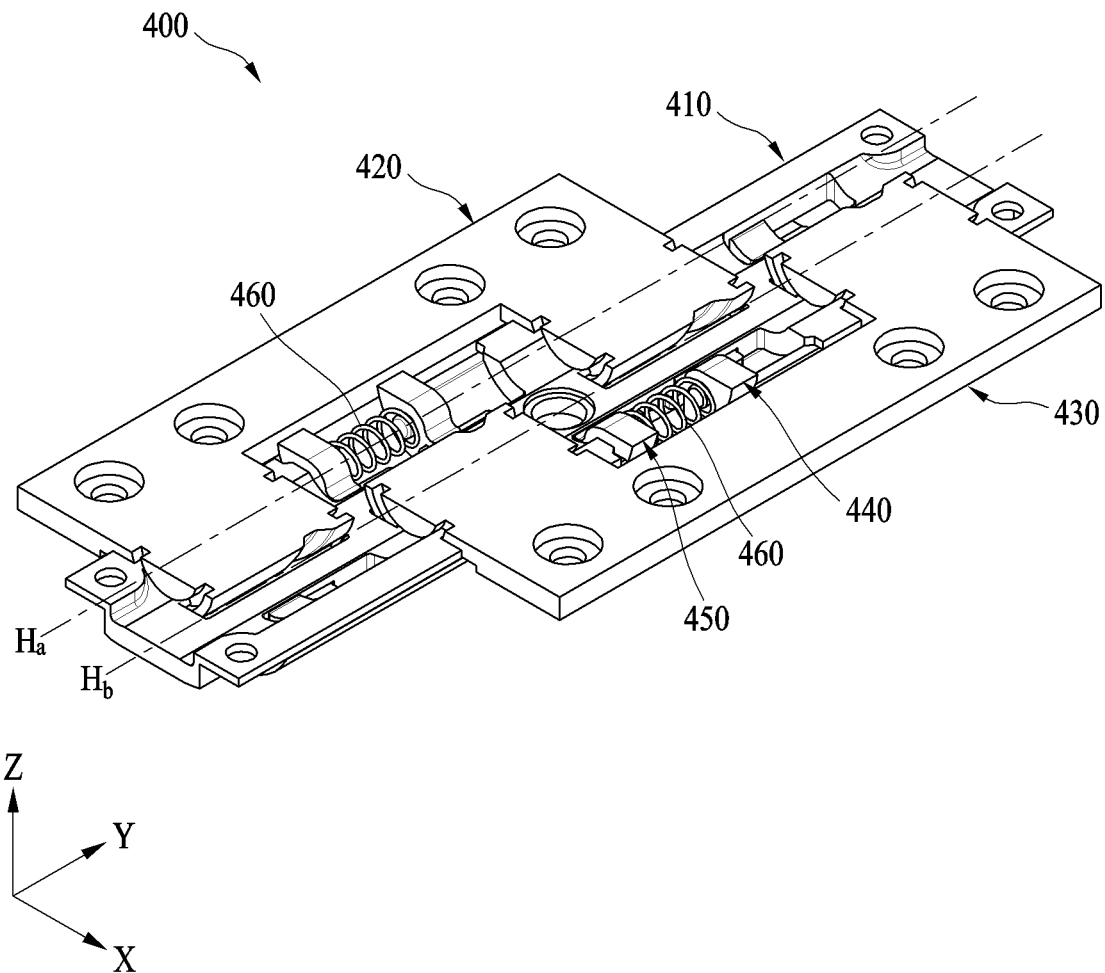
FIG. 4A is a perspective view illustrating an unfolded state of a hinge assembly according to an example embodiment.
Figure 4B:
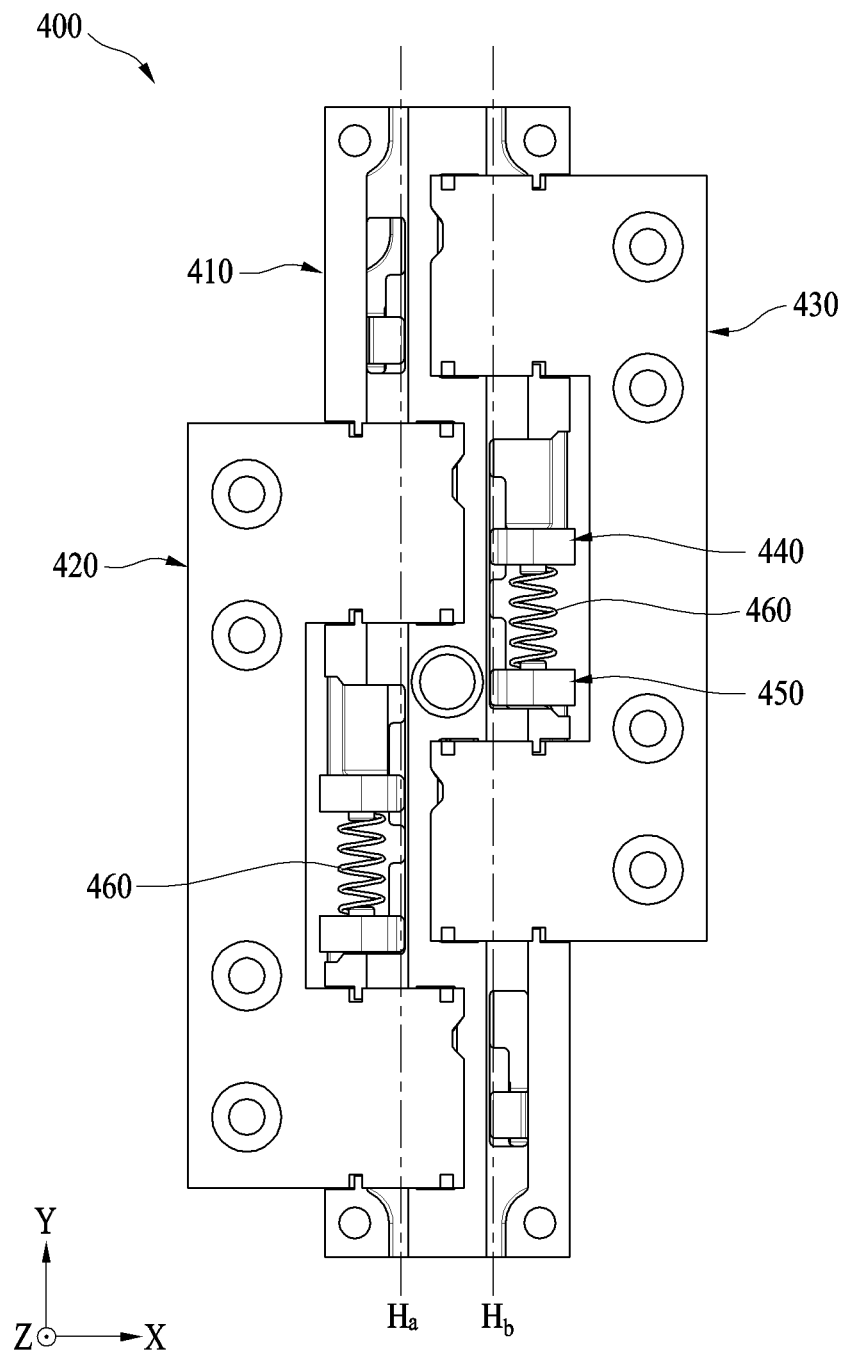
FIG. 4B is a front view illustrating an unfolded state of the hinge assembly according to an example embodiment.
Figure 4C:
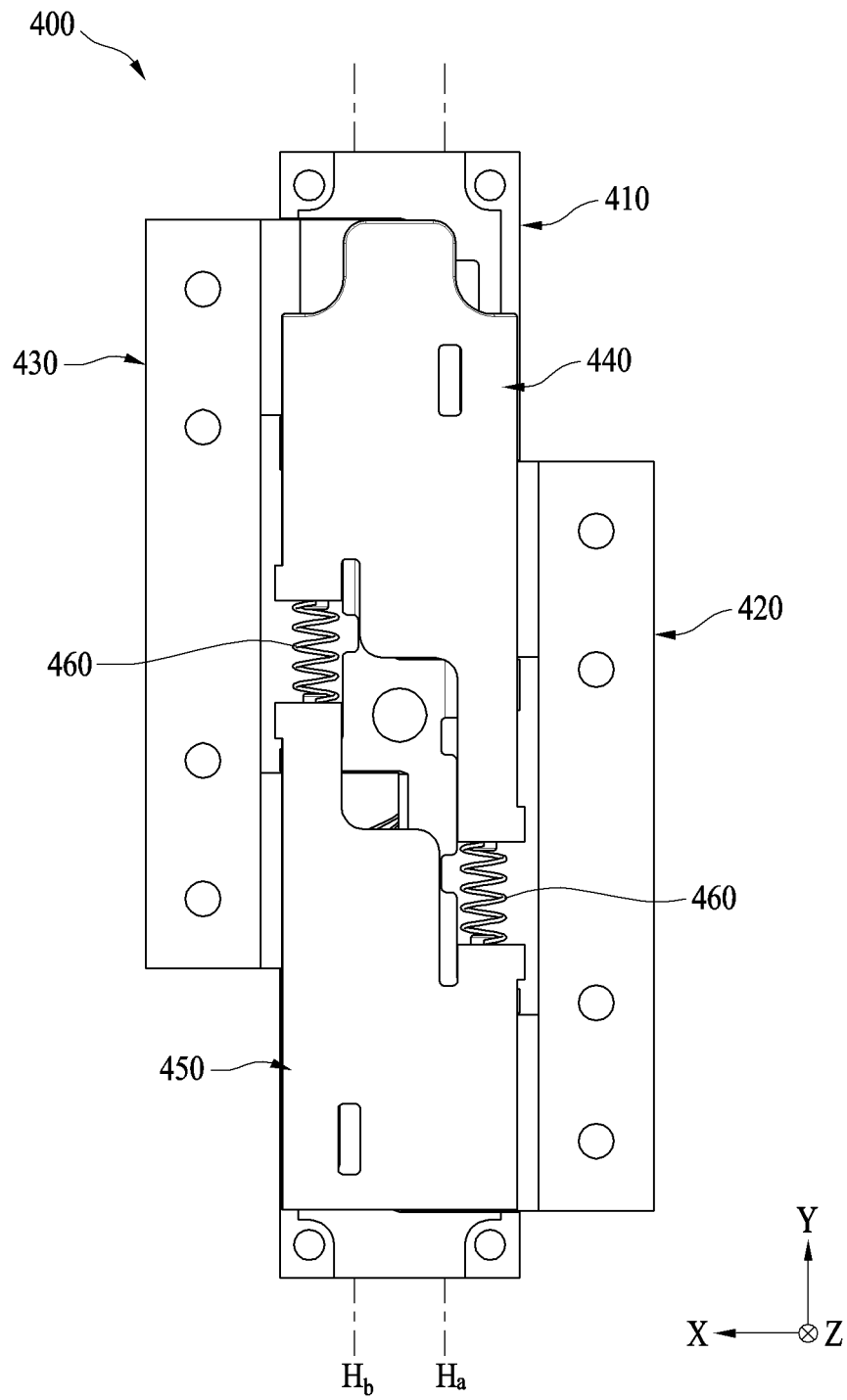
FIG. 4C is a rear view illustrating an unfolded state of the hinge assembly according to an example embodiment.
Figure 4D:
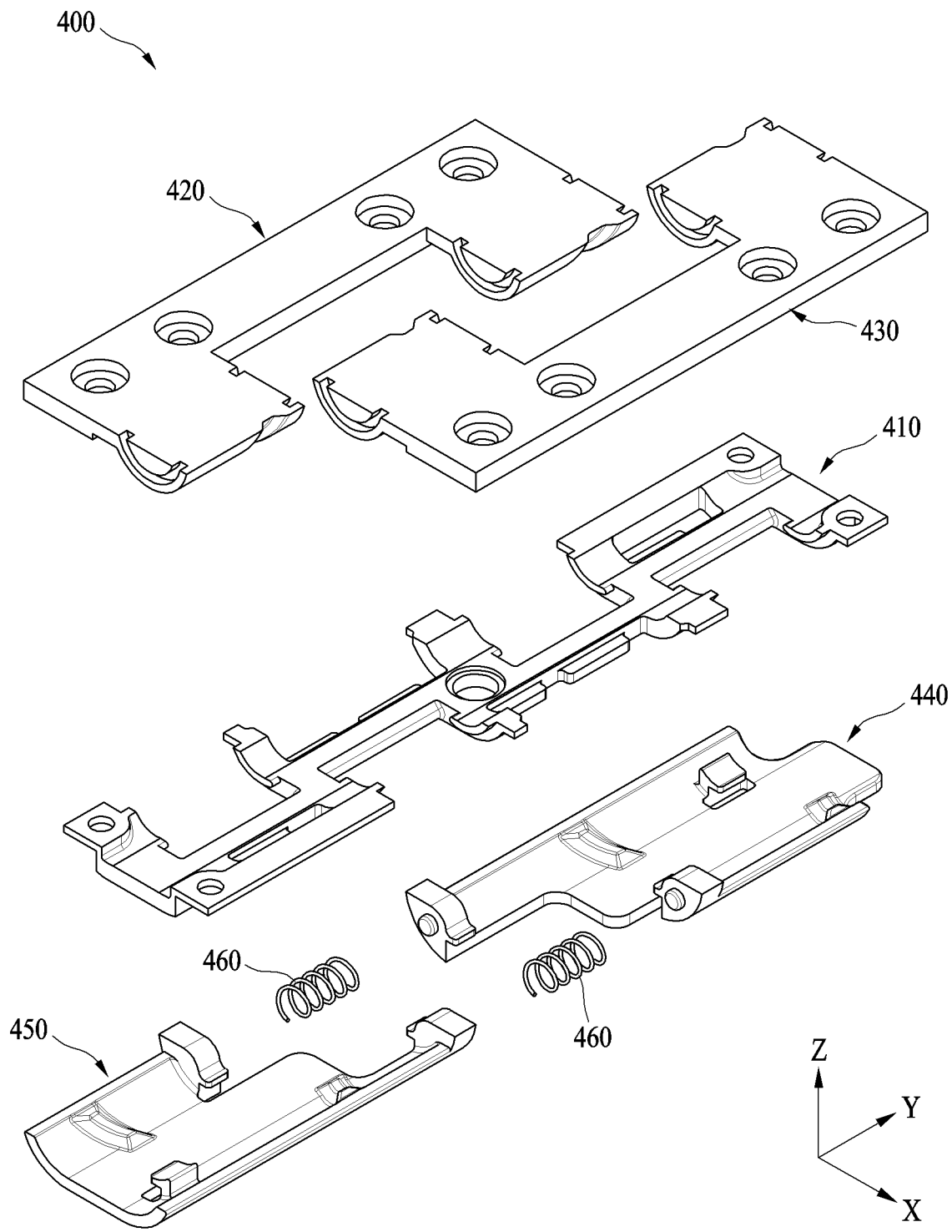
FIG. 4D is an exploded perspective view illustrating the hinge assembly according to an example embodiment.

FIG. 4A is a perspective view illustrating an unfolded state of a hinge assembly according to an example embodiment. FIG. 4B is a front view illustrating an unfolded state of the hinge assembly according to an example embodiment. FIG. 4C is a rear view illustrating an unfolded state of the hinge assembly according to an example embodiment. FIG. 4D is an exploded perspective view illustrating the hinge assembly according to an example embodiment.

Referring to FIGS. 4A to 4D, a hinge assembly 400 according to an example embodiment may include a hinge bracket 410, a first rotator 420 (e.g., a first rotating plate), a second rotator 430 (e.g., a second rotating plate), a first slider 440, a second slider 450, and an elastic member 460.

Figure 4E:
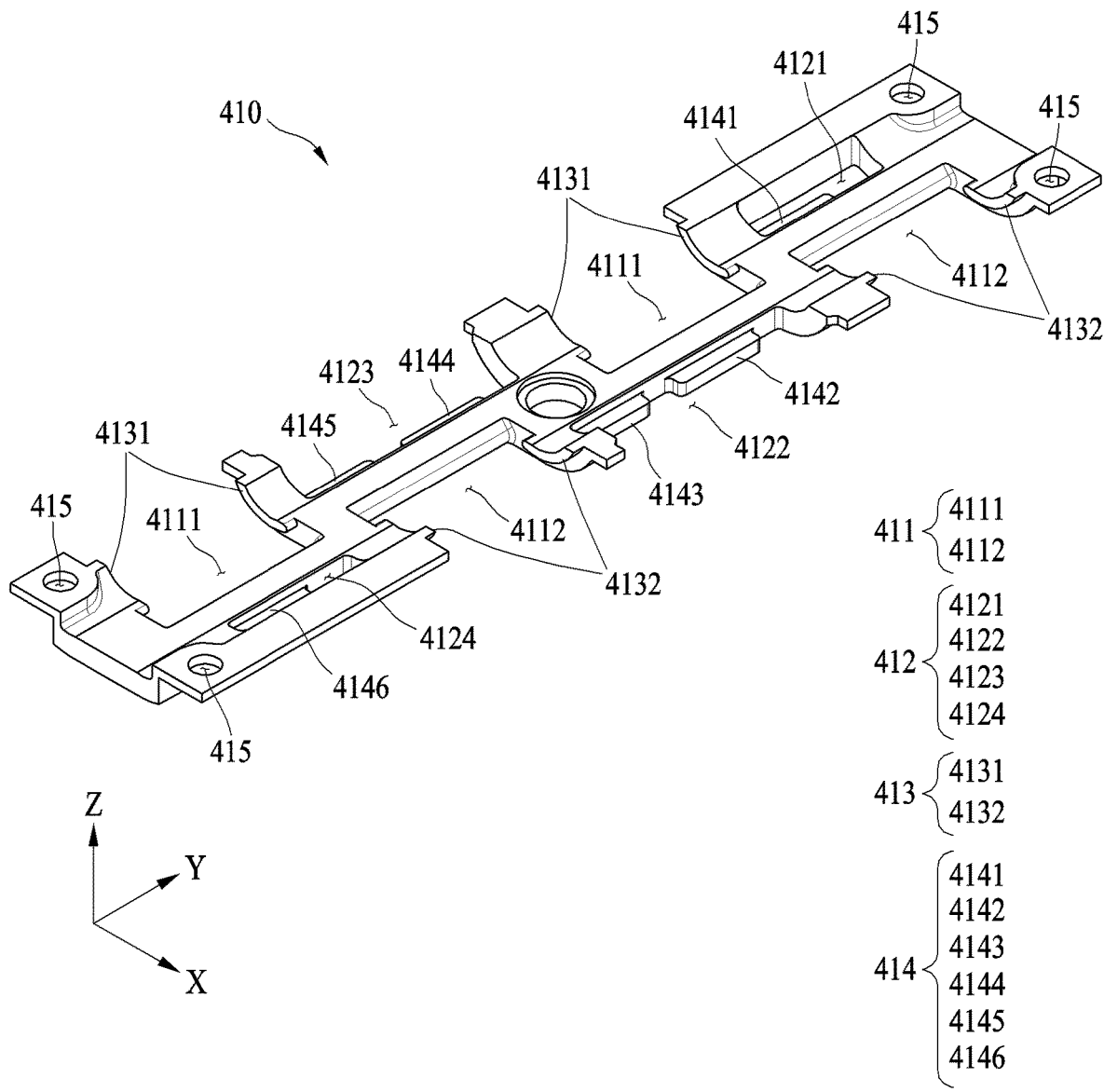
FIG. 4E is a perspective view illustrating a hinge bracket according to an example embodiment.
Figure 4F:
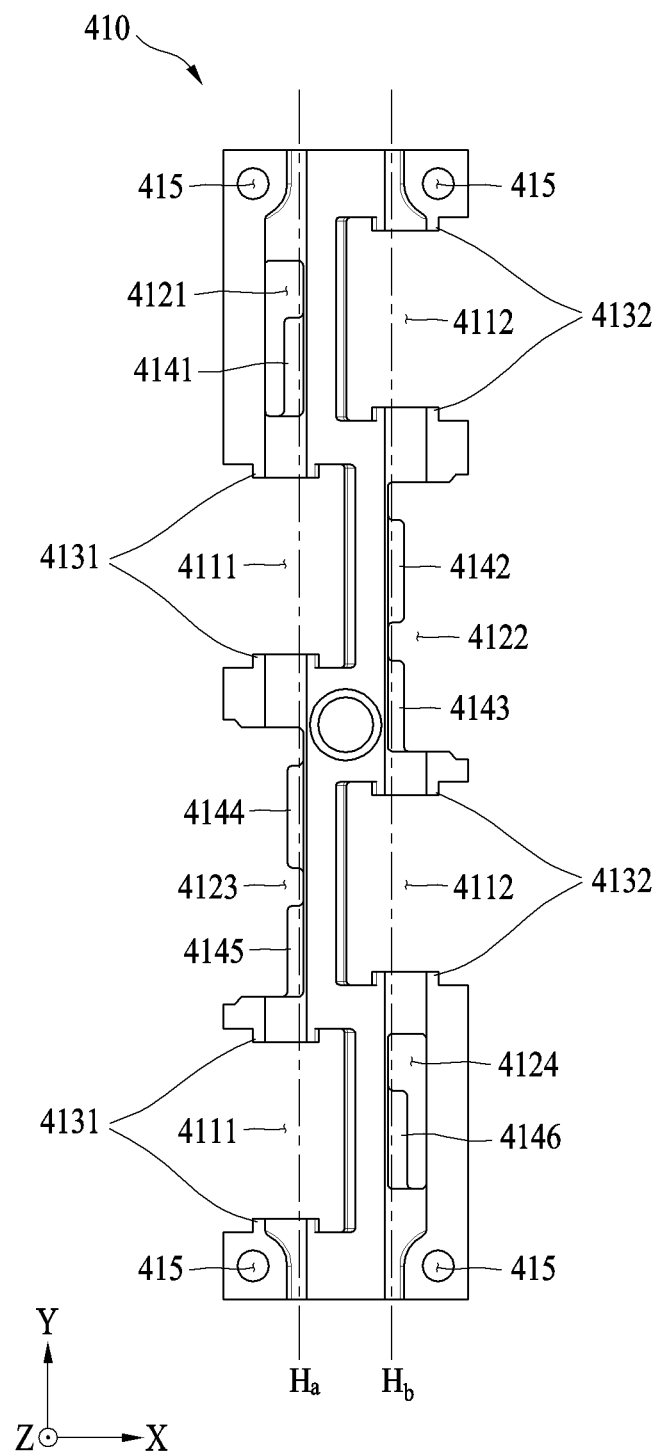
FIG. 4F is a front view illustrating the hinge bracket according to an example embodiment.

FIG. 4E is a perspective view illustrating a hinge bracket according to an example embodiment. FIG. 4F is a front view illustrating the hinge bracket according to an example embodiment.

Referring to FIGS. 4A to 4F, the hinge bracket 410 according to an example embodiment may be a component fixedly connected to a housing (e.g., the housing 310 of FIG. 3). The hinge assembly 400 may be connected to the housing at the hinge bracket 410. For example, the hinge bracket 410 may be fixedly connected to a hinge housing (e.g., the hinge housing 313 of FIG. 3). The hinge bracket 410 may be formed to have a longitudinal direction (e.g., the Y-axis direction) parallel with a first or second hinge axis Ha or Hb. A lower surface (e.g., a surface in the −Z direction) of the hinge bracket 410 may be formed substantially corresponding to an inner shape of the hinge housing 313.

In an example embodiment, the hinge bracket 410 may include a rotator connection space 411, a slider connection space 412, a fixed rotation rail structure 413, a fixed sliding rail structure 414, and a bracket fixing hole 415.

In an example embodiment, the rotator connection space 411 may be a space for connecting the first rotator 420 and the second rotator 430, to the hinge bracket 410. A plurality of rotator connection spaces 411 may be formed. The rotator connection space 411 may include a first rotator connection space 4111 and a second rotator connection space 4112. The first rotator connection space 4111 may be a space for connecting the first rotator (e.g., a space at which the first rotator 420 of FIG. 4D is connected), and the second rotator connection space 4112 may be a space for connecting the second rotator (e.g., a space at which the second rotator 430 of FIG. 4D is connected). With reference to FIG. 4F, the first rotator connection space 4111 may be formed on the left side (e.g., a portion in the −X direction) of the hinge bracket 410 and the second rotator connection space 4112 may be formed on the right side (e.g., a portion in the +X direction) of the hinge bracket 410.

In an example embodiment, a pair of first rotator connection spaces 4111 and a pair of second rotator connection spaces 4112 may be provided. The pair of first rotator connection spaces 4111 and the pair of second rotator connection spaces 4112 each may be spaced apart in (or along) a longitudinal direction (e.g., the y-axis direction) of the hinge bracket 410. For example, the pair of first rotator connection spaces 4111 and the pair of second rotator connection spaces 4112 may be alternately disposed on one side (e.g., the −X direction side) and the other side (e.g., the +X direction side) in the longitudinal direction (e.g., the Y-axis direction) of the hinge bracket 410, and spaced apart from each other along the Y-axis direction. However, this is an example, and the number, shape, and/or location of the first rotator connection spaces 4111 and the second rotator connection spaces 4112 are not limited thereto.

In an example embodiment, the slider connection space 412 may be a space for connecting the first slider 440 and the second slider 450, to the hinge bracket 410. A plurality of slider connection spaces 412 may be formed. For example, the slider connection space 412 may include a first connection space 4121, a second connection space 4122, a third connection space 4123, and a fourth connection space 4124.

In an example embodiment, the first connection space 4121, the second connection space 4122, the third connection space 4123, and the fourth connection space 4124 may be alternately disposed on one side (e.g., the −X direction side) and the other side (e.g., the +X direction side) of the hinge bracket 410, in the longitudinal direction (e.g., the y-axis direction) of the hinge bracket 410, and spaced apart from each other. For example, with reference to FIG. 4F, in a direction from the upper side (e.g., the +Y direction side) to the lower side (e.g., the −Y direction side) of the hinge bracket 410, the first connection space 4121, the second connection space 4122, the third connection space 4123, and the fourth connection space 4124 may be alternately disposed on the left side (e.g., the −X direction side) and the right side (e.g., the +X direction side) of the hinge bracket 410 and apart from each other. However, this is an example, and the number, shape, and/or location of the slider connection spaces 412 are not limited thereto.

In an example embodiment, the fixed rotation rail structure 413 may be formed in the hinge bracket 410 to be rotatably connected to the first rotator 420 and the second rotator 430. The fixed rotation rail structure 413 may interoperate with a first rotation rail structure 422 of the first rotator 420 and a second rotation rail structure 432 of the second rotator 430 described below. The fixed rotation rail structure 413 may include an arc shape, and a center of the arc shape of the fixed rotation rail structure 413 may be defined by the first or second hinge axis Ha or Hb. For example, the fixed rotation rail structure 413 may include the arc shape with the first or second hinge axis Ha or Hb as a center. The fixed rotation rail structure 413 may protrude respectively from surfaces (e.g., surfaces in the +Y and −Y directions), facing each other, of the rotator connection spaces 411 toward a direction of the first or second hinge axis Ha or Hb. For example, the fixed rotation rail structure 413 may include a first fixed rotation rail 4131 and a second fixed rotation rail 4132. The first fixed rotation rail 4131 may protrude respectively from surfaces (e.g., surfaces in the +Y and −Y directions), facing each other, of the first rotator connection spaces 4111 toward the direction of the first hinge axis Ha to include the arc shape with the first hinge axis Ha as a center. The second fixed rotation rail 4132 may protrude respectively from surfaces (e.g., surfaces in the +Y and −Y directions), facing each other, of the second rotator connection spaces 4112 toward the direction of the second hinge axis Hb to include the arc shape with the second hinge axis Hb as a center. However, this is an example, and the number, shape, and/or location of the fixed rotation rail structures 413 are not limited thereto.

In an example embodiment, in the hinge bracket 410, the fixed sliding rail structure 414 may be formed to be slidably connected to the first slider 440 and the second slider 450. The fixed sliding rail structure 414 may interoperate with a first sliding rail structure 442 of the first slider 440 and a second sliding rail structure 452 of the second slider 450 described below. The fixed sliding rail structure 414 may be formed in a longitudinal direction (e.g. the y-axis direction) parallel with the first or second hinge axis Ha or Hb. The fixed sliding rail structure 414 may protrude by a designated width from the slider connection space 412 toward a direction (e.g., −X direction or +X direction) perpendicular to the first or second hinge axis Ha or Hb such that the longitudinal direction of the fixed sliding rail structure 414 is parallel with the first or second hinge axis Ha or Hb. For example, the fixed sliding rail structure 414 may include a first fixed sliding rail 4141, a second fixed sliding rail 4142, a third fixed sliding rail 4143, a fourth fixed sliding rail 4144, a fifth fixed sliding rail 4145, and a sixth fixed sliding rail 4146. The first fixed sliding rail 4141 may protrude by a designated width in the −X direction in at least a partial section of the first connection space 4121 in the y-axis direction. The second fixed sliding rail 4142 and the third fixed sliding rail 4143 may protrude by a designated width in the +X direction in at least a partial section of the second connection space 4122 in the y-axis direction. The second fixed sliding rail 4142 and the third fixed sliding rail 4143 may be spaced apart from each other in the y-axis direction or may be integrally formed as one. The fourth fixed sliding rail 4144 and the fifth fixed sliding rail 4145 may protrude by a designated width in the −X direction in at least a partial section of the third connection space 4123 in the y-axis direction. The fourth fixed sliding rail 4144 and the fifth fixed sliding rail 4145 may be spaced apart from each other in the y-axis direction or may be integrally formed as one. The sixth fixed sliding rail 4146 may protrude by a designated width in the +X direction in at least a partial section of the fourth connection space 4124 in the y-axis direction. However, this is an example, and the number, shape, and/or location of the fixed sliding rail structures 414 are not limited thereto.

In an example embodiment, the bracket fixing hole 415 configured to fix the hinge bracket 410 to a hinge housing (e.g., the hinge housing 313 of FIG. 3) may be formed in (or defined by) the hinge bracket 410. For example, a fastening member (e.g., a screw, a bolt, a pin, and/or a counterpart structure) may be inserted into the bracket fixing hole 415.

A plurality of bracket fixing holes 415 may be formed. For example, with reference to FIG. 4F, the bracket fixing hole 415 may be formed at each corner of the hinge bracket 410. However, this is an example, and the number, shape, and/or location of the bracket fixing holes 415 are not limited thereto.

Figure 4G:
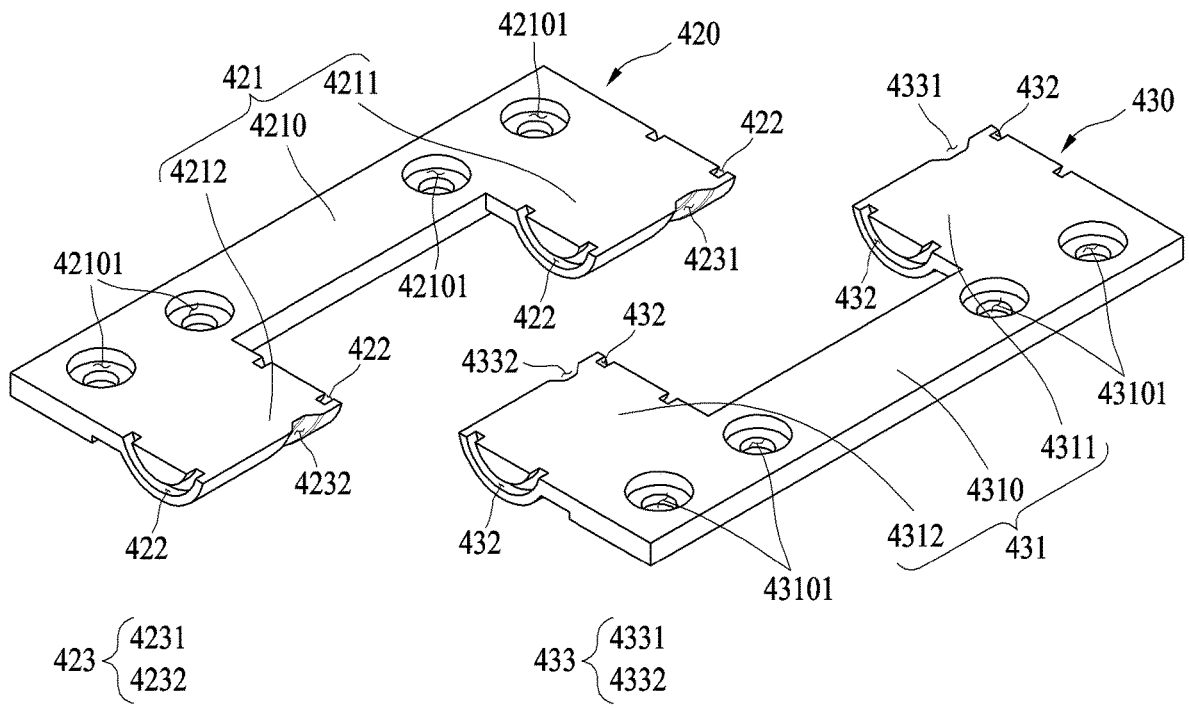
FIG. 4G is a perspective view illustrating a first rotator and a second rotator according to an example embodiment.
Figure 4H:
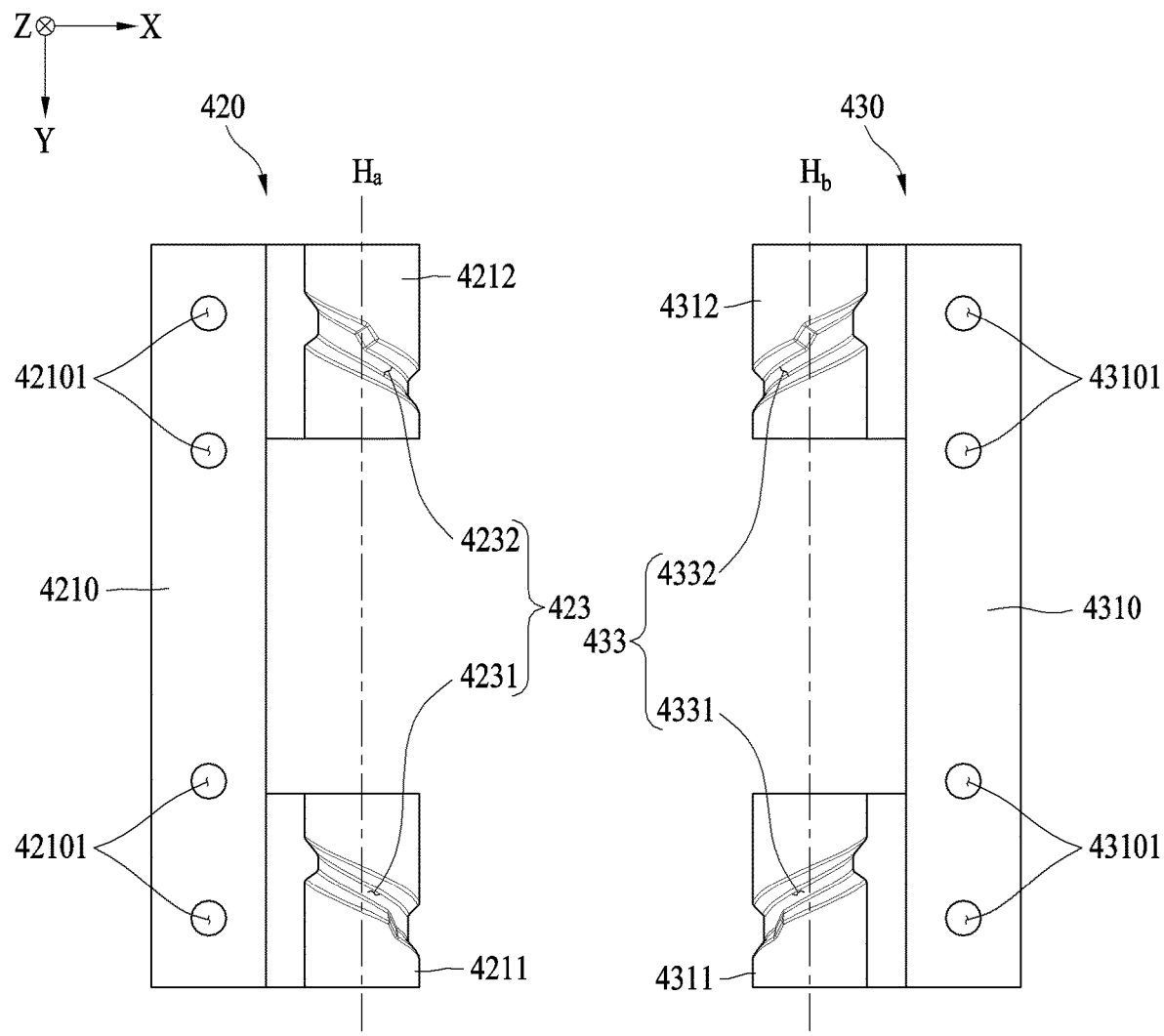
FIG. 4H is a rear view illustrating the first rotator and the second rotator according to an example embodiment.

FIG. 4G is a perspective view illustrating a first rotator and a second rotator according to an example embodiment. FIG. 4H is a rear view illustrating the first rotator and the second rotator according to an example embodiment.

Referring to FIGS. 4A to 4H, in an example embodiment, the first rotator 420 may be rotatably connected to the hinge bracket 410 based on the first hinge axis Ha and the second rotator 430 may be rotatably connected to the hinge bracket 410 based on the second hinge axis Hb. The first rotator 420 and the second rotator 430 may be formed in substantially symmetrical shapes with respect to an axis (e.g., the y-axis) parallel with the first or second hinge axis Ha or Hb.

Hereinafter, with reference to FIGS. 4A to 4H, the first rotator 420 is described according to an example embodiment. In an example embodiment, the first rotator 420 may include a first rotator body 421, the first rotation rail structure 422, and a first helical structure 423.

In an example embodiment, the first rotator body 421 may form an exterior of the first rotator 420. For example, the first rotator body 421 may include a first rotator main body 4210, a first protruding body 4211, and a second protruding body 4212.

In an example embodiment, the first rotator main body 4210 may be formed in a substantially plate shape. The first rotator main body 4210 may be formed to have a longitudinal direction (e.g., the y-axis direction) parallel with the first hinge axis Ha. The first rotator main body 4210 may be configured to be fixedly connected to a first housing (e.g., the first housing 311 of FIG. 3). The first rotator main body 4210 may be disposed in parallel with a front surface (e.g., a surface in the +Z direction with reference to FIG. 3) of the first housing 311. At least one first housing fixing hole 42101 for fixing the first rotator 420 to the first housing 311 may be formed in the first rotator main body 4210. For example, the first housing fixing hole 42101 may be formed to penetrate the first rotator main body 4210 in the z-axis direction. For example, a fastening member (e.g., a screw, a bolt, a pin, and/or a counterpart structure) may be inserted into the first housing fixing hole 42101. Although four first housing fixing holes 42101 are formed as shown in FIG. 4G, this is an example, and the number, shape, and/or location of the first housing fixing holes 42101 are not limited thereto.

In an example embodiment, the first protruding body 4211 and the second protruding body 4212 may respectively extend from one side (e.g., the +X direction side) of the first rotator main body 4210. The first protruding body 4211 and the second protruding body 4212 may extend in the same direction (e.g., the +X direction). The first protruding body 4211 and the second protruding body 4212 may be spaced apart from each other in a longitudinal direction (e.g., the y-axis direction) of the first rotator main body 4210. For example, the first protruding body 4211 may extend in the +X direction from the upper end (e.g., the end in the +Y direction) of one side (e.g., the +X direction side) of the first rotator main body 4210, and the second protruding body 4212 may extend in the +X direction from the lower end (e.g., the end in the −Y direction) of one side (e.g., the +X direction side) of the first rotator main body 4210. The first protruding body 4211 and the second protruding body 4212 may be integrally formed with the first rotator main body 4210. The first protruding body 4211 and the second protruding body 4212 together with the first rotator main body 4210 may define a recess of the first rotator 420.

In an example embodiment, at least a portion of a cross-section of the first protruding body 4211 and the second protruding body 4212 may include an arc shape with the first hinge axis Ha as a center. For example, an upper surface (e.g., a surface in the +Z direction) of the first protruding body 4211 and the second protruding body 4212 may be substantially formed as a plane (e.g., coplanar with each other), and a lower surface (e.g., a surface in the −Z direction) of the first protruding body 4211 and the second protruding body 4212 may include an arc shape with the first hinge axis Ha as a center. The first protruding body 4211 and the second protruding body 4212 may be respectively inserted into the pair of first rotator connection spaces 4111 formed in the hinge bracket 410. However, the shape of the first rotator 420 described above is an example, and the shape of the first rotator 420 is not limited thereto. For example, the first rotator 420 may include the first rotator main body 4210 divided in the middle such that the first protruding body 4211 and the second protruding body 4212 are formed as separate components, which are not connected to each other.

In an example embodiment, the first rotation rail structure 422 may be formed on both side surfaces (e.g., surfaces in the +Y and −Y directions) of the first protruding body 4211 and the second protruding body 4212, respectively. For example, the first rotation rail structure 422 may be recessed in the both side surfaces (e.g., the surfaces in the +Y and −Y directions) of the first protruding body 4211 and the second protruding body 4212, respectively. The first rotation rail structure 422 may include an arc shape with the first hinge axis Ha as a center. The first rotation rail structure 422 may interoperate with the fixed rotation rail structure 413 formed on the hinge bracket 410. For example, the first fixed rotation rail 4131 formed on the hinge bracket 410 may be inserted into the first rotation rail structure 422. The arc shape of the first rotation rail structure 422 may substantially correspond to the arc shape of the first fixed rotation rail 4131. A width of the first rotation rail structure 422 may substantially correspond to a width of the first fixed rotation rail 4131. The first rotation rail structure 422 may rotate on the first hinge axis Ha along the first fixed rotation rail 4131 within a designated angle range. According to the structure described above, the first rotator 420 may rotate about the first hinge axis Ha with respect to the hinge bracket 410 within a designated angle range. However, this is an example, and the first fixed rotation rail 4131 may be recessed and the first rotation rail structure 422 may protrude.

In an example embodiment, the first helical structure 423 may be formed on each lower surface (e.g., a surface in the −Z direction) of the first protruding body 4211 and the second protruding body 4212. The first helical structure 423 may be formed in a helical shape in one direction based on the first hinge axis Ha. For example, with reference to FIG. 4H, the first helical structure 423 may be formed in a counterclockwise helical shape when oriented from a lower side (e.g., the −Y direction side) to an upper side (e.g., the +Y direction side). The first rotator 420 may be connected to the first slider 440 and the second slider 450 through the first helical structure 423. The first helical structure 423 may interoperate with a first helical projection 443 of the first slider 440 and a second helical projection 453 of the second slider 450, which are described below.

In an example embodiment, the first helical structure 423 may include a first helical groove 4231 and a second helical groove 4232. The first helical groove 4231 may be recessed in the lower surface (e.g., a surface in the −Z direction) of the first protruding body 4211. The second helical groove 4232 may be recessed in the lower surface (e.g., a surface in the −Z direction) of the second protruding body 4212. Details of the shapes of the first helical groove 4231 and the second helical groove 4232 are described below.

Hereinafter, with reference to FIGS. 4A to 4H, the second rotator 430 is described according to an example embodiment. In an example embodiment, the second rotator 430 may include a second rotator body 431, a second rotation rail structure 432, and a second helical structure 433.

In an example embodiment, the second rotator body 431 may form an exterior of the second rotator 430. For example, the second rotator body 431 may include a second rotator main body 4310, a third protruding body 4311, and a fourth protruding body 4312.

In an example embodiment, the second rotator main body 4310 may be formed in a substantially plate shape. The second rotator main body 4310 may be formed to have a longitudinal direction (e.g., the y-axis direction) parallel with the second hinge axis Hb. The second rotator main body 4310 may be configured to be fixedly connected to a second housing (e.g., the second housing 312 of FIG. 3). The second rotator main body 4310 may be disposed in parallel with a front surface (e.g., a surface in the +Z direction with reference to FIG. 3) of the second housing 312. At least one second housing fixing hole 43101 for fixing the second rotator 430 to the second housing 312 may be formed in the second rotator main body 4310. For example, the second housing fixing hole 43101 may be formed to penetrate the second rotator main body 4310 in the z-axis direction. For example, a fastening member (e.g., a screw, a bolt, a pin, and/or a counterpart structure) may be inserted into the second housing fixing hole 43101. Although four second housing fixing holes 43101 are formed as shown in FIG. 4G, this is an example, and the number, shape, and/or location of the second housing fixing holes 43101 are not limited thereto.

In an example embodiment, the third protruding body 4311 and the fourth protruding body 4312 may extend from one side (e.g., the −X direction side) of the second rotator main body 4310. The third protruding body 4311 and the fourth protruding body 4312 may extend in the same direction (e.g., the +X direction). The third protruding body 4311 and the fourth protruding body 4312 may be spaced apart from each other in a longitudinal direction (e.g., the y-axis direction) of the second rotator main body 4310. For example, the third protruding body 4311 may extend from the upper end (e.g., the end in the +Y direction) of one side (e.g., the −X direction side) of the second rotator main body 4310 toward the −X direction, and the fourth protruding body 4312 may extend from the lower end (e.g., the end in the −Y direction) of one side (e.g., the −X direction side) of the second rotator main body 4310 toward the −X direction. The third protruding body 4311 and the fourth protruding body 4312 may be integrally formed with the second rotator main body 4310 as one.

In an example embodiment, at least a portion of a cross-section of each of the third protruding body 4311 and at least a portion of a cross-section of the fourth protruding body 4312 may include an arc shape with the second hinge axis Hb as a center. For example, an upper surface (e.g., a surface in the +Z direction) of the third protruding body 4311 and an upper surface of the fourth protruding body 4312 may be substantially formed as a plane, and each of a lower surface (e.g., a surface in the −Z direction) of the third protruding body 4311 and a lower surface of the fourth protruding body 4312 may include an arc shape with the second hinge axis Hb as a center. The third protruding body 4311 and the fourth protruding body 4312 may be respectively inserted into a pair of the second rotator connection spaces 4112 formed in the hinge bracket 410. However, the shape of the second rotator 430 described above is an example and is not limited thereto. For example, the second rotator 430 may include the second rotator main body 4310 divided in the middle such that the third protruding body 4311 and the fourth protruding body 4312 are not connected to each other.

In an example embodiment, the second rotation rail structure 432 may be formed on both side surfaces (e.g., surfaces in the +Y and −Y directions) of the third protruding body 4311 and the fourth protruding body 4312, respectively. For example, the second rotation rail structure 432 may be recessed in the both side surfaces (e.g., surfaces in the +Y and −Y directions) of the third protruding body 4311 and the fourth protruding body 4312, respectively. The second rotation rail structure 432 may include an arc shape with the second hinge axis Hb as a center. The second rotation rail structure 432 may interoperate with the fixed rotation rail structure 413 formed in the hinge bracket 410. For example, the second fixed rotation rail 4132 formed on the hinge bracket 410 may be inserted into the second rotation rail structure 432. The arc shape of the second rotation rail structure 432 may substantially correspond to the arc shape of the second fixed rotation rail 4132. A width of the second rotation rail structure 432 may substantially correspond to a width of the second fixed rotation rail 4132. The second rotation rail structure 432 may rotate on the second hinge axis Hb along the second fixed rotation rail 4132 within a designated angle range. According to the structure described above, the second rotator 430 may rotate on the second hinge axis Hb with respect to the hinge bracket 410 within a designated angle range. However, this is an example, and the second fixed rotation rail 4132 may be recessed and the second rotation rail structure 432 may protrude.

In an example embodiment, the second helical structure 433 may be formed on each lower surface (e.g., a surface in the −Z direction) of the third protruding body 4311 and the fourth protruding body 4312. The second helical structure 433 may be formed in a helical shape in one direction based on the second hinge axis Hb. The second helical structure 433 of the second rotator 430 may be formed in a helical shape in an opposite direction to the first helical structure 423 of the first rotator 420. For example, with reference to FIG. 4H, the second helical structure 433 may be formed in a clockwise helical shape when oriented from a lower side (e.g., the −Y direction side) to an upper side (e.g., the +Y direction side). The second rotator 430 may be connected to the first slider 440 and the second slider 450 through the second helical structure 433. The second helical structure 433 may interoperate with a third helical projection 444 of the first slider 440 and a fourth helical projection 454 of the second slider 450, which are described below.

In an example embodiment, the second helical structure 433 may include a third helical groove 4331 and a fourth helical groove 4332. The third helical groove 4331 may be recessed in the lower surface (e.g., a surface in the −Z direction) of the third protruding body 4311. The fourth helical groove 4332 may be recessed in the lower surface (e.g., a surface in the −Z direction) of the fourth protruding body 4312. Details of the shapes of the third helical groove 4331 and the fourth helical groove 4332 are described below.

Figure 4I:
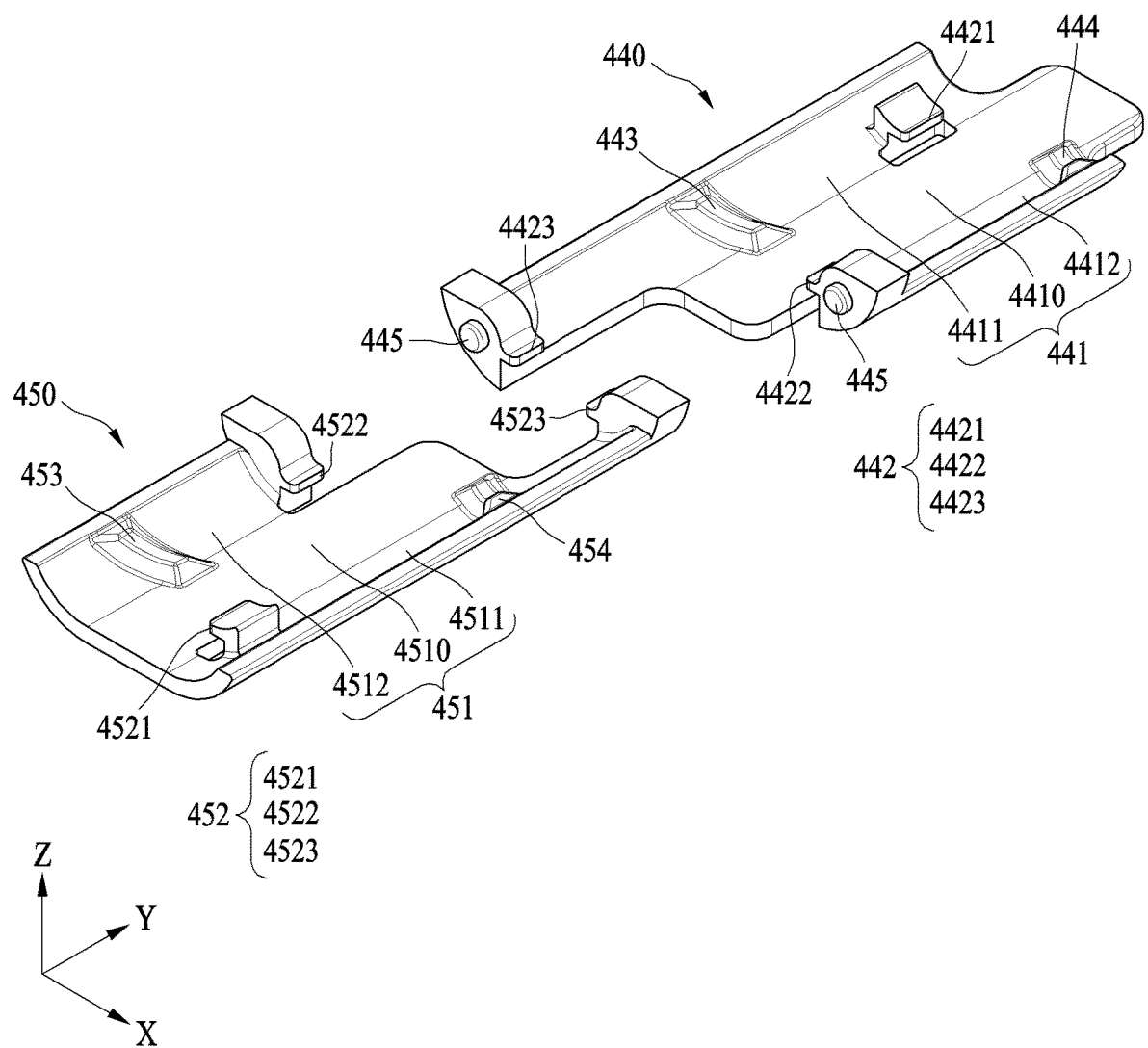
FIG. 4I is a perspective view illustrating a first slider and a second slider according to an example embodiment.
Figure 4J:
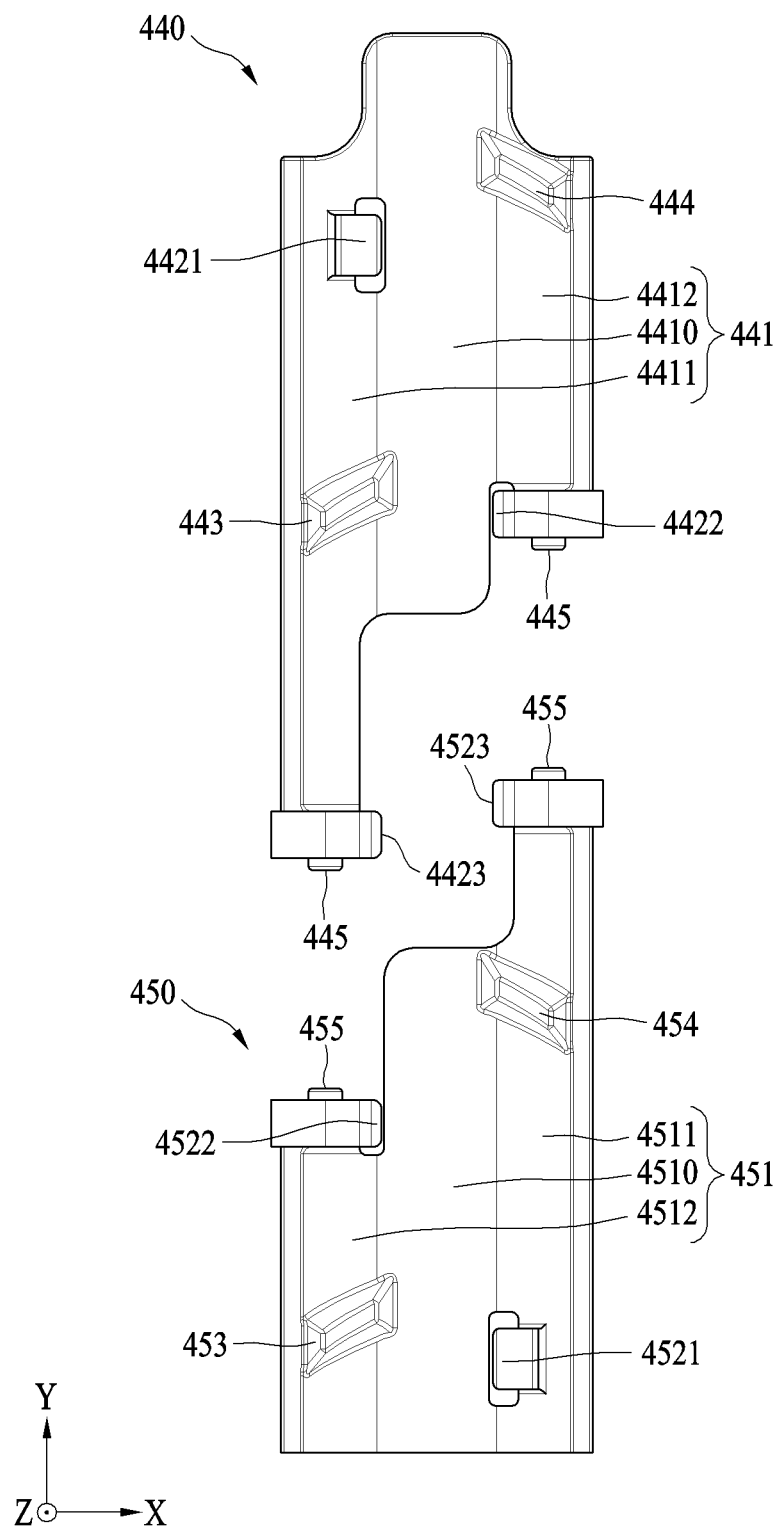
FIG. 4J is a front view illustrating the first slider and the second slider according to an example embodiment.

FIG. 4I is a perspective view illustrating a first slider and a second slider according to an example embodiment. FIG. 4J is a front view illustrating the first slider and the second slider according to an example embodiment.

Referring to FIGS. 4A to 4J, the first slider 440 and the second slider 450 may be slidably connected to the hinge bracket 410. For example, the first slider 440 and the second slider 450 may be slidably connected to the hinge bracket 410 in a direction (e.g., the y-axis direction) parallel with a first or second hinge axis Ha or Hb. The first slider 440 and the second slider 450 may be spaced apart from each other in the direction (e.g., the y-axis direction) parallel with the first or second hinge axis Ha or Hb.

Hereinafter, with reference to FIGS. 4A to 4J, the first slider 440 is described according to an example embodiment. In an example embodiment, the first slider 440 may include a first slider body 441, the first sliding rail structure 442, the first helical projection 443, the third helical projection 444, and a first connecting projection 445.

In an example embodiment, the first slider body 441 may form an exterior of the first slider 440. For example, the first slider body 441 may include a first slider main body 4410, a first side body 4411, and a second side body 4412.

In an example embodiment, the first slider main body 4410 may be formed in a substantially plate shape. The first slider main body 4410 may be formed to have a longitudinal direction (e.g., the y-axis direction) parallel with the first or second hinge axis Ha or Hb. A lower surface (e.g., a surface in the -Z direction) of the first slider main body 4410 may be formed to substantially correspond to an inner shape of the hinge housing 313.

In an example embodiment, the first side body 4411 may extend from one side (e.g., the -X direction side) of the first slider main body 4410. The second side body 4412 may extend from the other side (e.g., the +X direction side) of the first slider main body 4410. The first side body 4411 and the second side body 4412 may be formed to have a longitudinal direction (e.g., the y-axis direction) parallel with the first or second hinge axis Ha or Hb. For example, the length (e.g., the length in the y-axis direction) of the first side body 4411 may be formed to be greater than the length (e.g., the length in the y-axis direction) of the first slider main body 4410, and the length (e.g., the length in the y-axis direction) of the second side body 4412 may be formed to be less than the length (e.g., the length in the y-axis direction) of the first slider main body 4410. With reference to FIG. 4J, the lower end (e.g., the end in the -Y direction) of the first side body 4411 may be positioned on a relatively lower side (e.g., the -Y direction side) than the lower end (e.g., the end in the -Y direction) of the first slider main body 4410, and the lower end (e.g., the end in the -Y direction) of the second side body 4412 may be positioned on a relatively upper side (e.g., the +Y direction side) than the lower end (e.g., the end in the -Y direction) of the first slider main body 4410. However, the shape of the first slider body 441 described above is an example and is not limited thereto.

In an example embodiment, the first sliding rail structure 442 may slidably connect the first slider 440 to the hinge bracket 410 by interoperating with the fixed sliding rail structure 414 of the hinge bracket 410. For example, the first sliding rail structure 442 may include a first sliding part 4421, a second sliding part 4422, and a third sliding part 4423.

In an example embodiment, the first sliding part 4421 may be formed on the upper end side (e.g., the end side in the +Y direction) of the first side body 4411. The first sliding part 4421 may protrude by a designated width in the +X direction from a position spaced apart from a front surface (e.g., a surface in the +Z direction) of the first side body 4411 by a designated height. The second sliding part 4422 may be formed on the lower end (e.g., the end in the -Y direction) of the second side body 4412. The second sliding part 4422 may protrude by a designated width in the -X direction from a position spaced apart from a front surface (e.g., a surface in the +Z direction) of the second side body 4412 by a designated height. The third sliding part 4423 may be formed on the lower end (e.g., an end portion in the -Y direction) of the first side body 4411. The third sliding part 4423 may protrude by a designated width in the +X direction from a position spaced apart from the front surface (e.g., a surface in the +Z direction) of the first side body 4411 by a designated height. In a direction from the upper side (e.g., the +Y direction side) to the lower side (e.g., the -Y direction side) of the first slider body 441, the first sliding part 4421, the second sliding part 4422, and the third sliding part 4423 may be alternately disposed on the left side (e.g., the -X direction side) and the right side (e.g., the +X direction side). However, this is an example, and the number, shape, and/or location of the first sliding rail structures 442 are not limited thereto.

In an example embodiment, the first sliding part 4421, the second sliding part 4422, and the third sliding part 4423 may interoperate with the first fixed sliding rail 4141, the second fixed sliding rail 4142, and the fourth fixed sliding rail 4144 of the hinge bracket 410, respectively. The first slider 440 may be positioned in the slider connection space 412 from a downward direction (e.g., the -z side direction) of the hinge bracket 410, such that the first sliding part 4421, the second sliding part 4422, and the third sliding part 4423 may be caught by upper sides (e.g., the +Z direction side) of the first fixed sliding rail 4141, the second fixed sliding rail 4142, and the fourth fixed sliding rail 4144, respectively. The first sliding part 4421, the second sliding part 4422, and the third sliding part 4423 may slide respectively along the first fixed sliding rail 4141, the second fixed sliding rail 4142, and the fourth fixed sliding rail 4144 in a direction (e.g., the y-axis direction) of the first or second hinge axis Ha or Hb. According to the structure described above, the first slider 440 may slide in the direction (e.g., the y-axis direction) of the first or second hinge axis Ha or Hb with respect to the hinge bracket 410.

In an example embodiment, the first helical projection 443 may protrude in a helical shape from the first side body 4411. For example, the first helical projection 443 may be positioned between the first sliding part 4421 and the third sliding part 4423 in the first side body 4411. The first helical projection 443 may interoperate with the first helical groove 4231 of the first rotator 420. The first helical projection 443 may slide along a helical shape of the first helical groove 4231 by being inserted into the first helical groove 4231. The first helical projection 443 may be formed in a direction corresponding to a helical direction of the first helical groove 4231. For example, with reference to FIG. 4J, the first helical projection 443 may be formed in a counterclockwise helical shape when oriented from a lower side (e.g., the -Y direction side) to an upper side (e.g., the +Y direction side).

In an example embodiment, the third helical projection 444 may protrude in a helical shape from the second side body 4412. For example, the third helical projection 444 may be positioned on the upper end side (e.g., an end side in the +Y direction) of the second side body 4412. The third helical projection 444 may interoperate with the third helical groove 4331 of the second rotator 430. The third helical projection 444 may slide along the helical shape of the third helical groove 4331 by being inserted into the third helical groove 4331. The third helical projection 444 may be formed in a direction corresponding to a helical direction of the third helical groove 4331. For example, with reference to FIG. 4J, the third helical projection 444 may be formed in a clockwise helical shape when oriented from a lower side (e.g., the −Y direction side) to an upper side (e.g., the +Y direction side).

In an example embodiment, the first connecting projection 445 may be a component for connecting the elastic member 460. A pair of first connecting projections 445 may be formed. The pair of first connecting projections 445 may respectively protrude in a downward direction (e.g., the −Y direction) from lower ends (e.g., the end in the −Y direction) of the first side body 4411 and the second side body 4412. However, this is an example, and the number, shape, and/or location of the first connecting projections 445 are not limited thereto.

Hereinafter, with reference to FIGS. 4A to 4J, the second slider 450 is described according to an example embodiment. In an example embodiment, the second slider 450 may include a second slider body 451, the second sliding rail structure 452, the second helical projection 453, the fourth helical projection 454, and a second connecting projection 455.

In an example embodiment, the second slider body 451 may form an exterior of the second slider 450. For example, the second slider body 451 may include a second slider main body 4510, a third side body 4511, and the fourth side body 4512.

In an example embodiment, the second slider main body 4510 may be formed in a substantially plate shape. The second slider main body 4510 may be formed to have a longitudinal direction (e.g., the y-axis direction) parallel with the first or second hinge axis Ha or Hb. A lower surface (e.g., a surface in the −Z direction) of the second slider main body 4510 may be formed to substantially correspond to an inner shape of the hinge housing 313.

In an example embodiment, the third side body 4511 may extend from one side (e.g., the +X direction side) of the second slider main body 4510. The fourth side body 4512 may extend from the other side (e.g., the −X direction side) of the second slider main body 4510. The third side body 4511 and the fourth side body 4512 may be formed to have a longitudinal direction (e.g., the y-axis direction) parallel with the first or second hinge axis Ha or Hb. For example, the length (e.g., the length in the y-axis direction) of the third side body 4511 may be formed to be greater than the length (e.g., the length in the y-axis direction) of the second slider main body 4510, and the length (e.g., the length in the y-axis direction) of the fourth side body 4512 may be formed to be less than the length (e.g., the length in the y-axis direction) of the second slider main body 4510. With reference to FIG. 4J, the upper end (e.g., the end in the +Y direction) of the third side body 4511 may be positioned on a relatively upper side (e.g., the +Y direction side) than the upper end (e.g., the end in the +Y direction) of the second slider main body 4510, and the upper end (e.g., the end in the +Y direction) of the fourth side body 4512 may be positioned on a relatively lower side (e.g., the −Y direction side) than the upper end (e.g., the end in the +Y direction) of the second slider main body 4510. However, the shape of the second slider body 451 described above is an example and is not limited thereto.

In an example embodiment, the second sliding rail structure 452 may slidably connect the second slider 450 to the hinge bracket 410 by interoperating with the fixed sliding rail structure 414 of the hinge bracket 410. For example, the second sliding rail structure 452 may include a fourth sliding part 4521, a fifth sliding part 4522, and a sixth sliding part 4523.

In an example embodiment, the fourth sliding part 4521 may be formed on the lower end side (e.g., the end side in the −Y direction) of the third side body 4511. The fourth sliding part 4521 may protrude by a designated width in the −X direction from a position spaced apart from the front surface (e.g., a surface in the +Z direction) of the third side body 4511 by a designated height. The fifth sliding part 4522 may be formed on the upper end (e.g., the end in the +Y direction) of the fourth side body 4512. The fifth sliding part 4522 may protrude by a designated width in the +X direction from a position spaced apart from the front surface (e.g., a surface in the +Z direction) of the fourth side body 4512 by a designated height. The sixth sliding part 4523 may be formed on the upper end (e.g., the end in the +Y direction) of the third side body 4511. The sixth sliding part 4523 may protrude by a designated width in the −X direction from a position spaced apart from the front surface (e.g., a surface in the +Z direction) of the third side body 4511 by a designated height. In a direction from the upper side (e.g., the +Y direction side) to the lower side (e.g., the −Y direction side) of the second slider body 451, the fourth sliding part 4521, the fifth sliding part 4522, and the sixth sliding part 4523 may be alternately disposed on the right side (e.g., the +X direction side) and the left side (e.g., the −X direction side). However, this is an example, and the number, shape, and/or location of the second sliding rail structures 452 are not limited thereto.

In an example embodiment, the fourth sliding part 4521, the fifth sliding part 4522, and the sixth sliding part 4523 may interoperate with the sixth fixed sliding rail 4146, the fifth fixed sliding rail 4145, and the third fixed sliding rail 4143 of the hinge bracket 410, respectively. The second slider 450 may be positioned in the slider connection space 412 from a downward direction (e.g., the −z side direction) of the hinge bracket 410, such that the fourth sliding part 4521, the fifth sliding part 4522, and the sixth sliding part 4523 may be caught by upper sides (e.g., the +Z direction side) of the sixth fixed sliding rail 4146, the fifth fixed sliding rail 4145, and the third fixed sliding rail 4143, respectively. The fourth sliding part 4521, the fifth sliding part 4522, and the sixth sliding part 4523 may slide respectively along the sixth fixed sliding rail 4146, the fifth fixed sliding rail 4145, and the third fixed sliding rail 4143 in a direction (e.g., the y-axis direction) of the first or second hinge axis Ha or Hb. According to the structure described above, the second slider 450 may slide in a first or second hinge axis Ha or Hb direction (e.g., the y-axis direction) with respect to the hinge bracket 410.

In an example embodiment, the second helical projection 453 may protrude in a helical shape from the fourth side body 4512. For example, the second helical projection 453 may be positioned on the lower end side (e.g., an end side in the −Y direction) of the fourth side body 4512. The second helical projection 453 may interoperate with the second helical groove 4232 of the first rotator 420. The second helical projection 453 may slide along the helical shape of the second helical groove 4232 by being inserted into the second helical groove 4232. The second helical projection 453 may be formed in a direction corresponding to a helical direction of the second helical groove 4232. For example, with reference to FIG. 4J, the second helical projection 453 may be formed in a counterclockwise helical shape when oriented from a lower side (e.g., the −Y direction side) to an upper side (e.g., the +Y direction side).

In an example embodiment, the fourth helical projection 454 may protrude in a helical shape from the third side body 4511. For example, the fourth helical projection 454 may be positioned between the fourth sliding part 4521 and the sixth sliding part 4523 in the third side body 4511. The fourth helical projection 454 may interoperate with the fourth helical groove 4332 of the second rotator 430. The fourth helical projection 454 may slide along the helical shape of the fourth helical groove 4332 by being inserted into the fourth helical groove 4332. The fourth helical projection 454 may be formed in a direction corresponding to a helical direction of the fourth helical groove 4332. For example, with reference to FIG. 4J, the fourth helical projection 454 may be formed in a clockwise helical shape when oriented from a lower side (e.g., the −Y direction side) to an upper side (e.g., the +Y direction side).

In an example embodiment, the second connecting projection 455 may be a component for connecting the elastic member 460. A pair of second connecting projections 455 may be formed. The pair of second connecting projections 455 may protrude in an upward direction (e.g., the +Y direction) from each upper end (e.g., the end in the +Y direction) of the third side body 4511 and the fourth side body 4512. However, this is an example, and the number, shape, and/or location of the second connecting projections 455 are not limited thereto.

Referring to FIGS. 4A to 4D and FIGS. 4I to 4J, in an example embodiment, the elastic member 460 may be positioned between the first slider 440 and the second slider 450. The first slider 440 and the second slider 450 may be spaced apart such that the first side body 4411 and the third side body 4511 face each other and the second side body 4412 and the fourth side body 4512 face each other. A pair of elastic members 460 may be positioned between the first side body 4411 and the third side body 4511 and between the second side body 4412 and the fourth side body 4512, respectively.

In an example embodiment, the elastic member 460 may provide an elastic force to between the first slider 440 and the second slider 450 in a direction (e.g., the y-axis direction) parallel with the first or second hinge axis Ha or Hb. For example, the elastic member 460 may provide an elastic force in a direction in which the first slider 440 and the second slider 450 are apart from each other.

In an example embodiment, a pair of elastic members 460 may be provided. One side (e.g., the −Y direction side) of each of the pair of elastic members 460 may be connected to the first connecting projection 445 of the first slider 440, and the other side (e.g., the +Y direction side) may be connected to the second connecting projection 455 of the second slider 450.

Figure 4K:
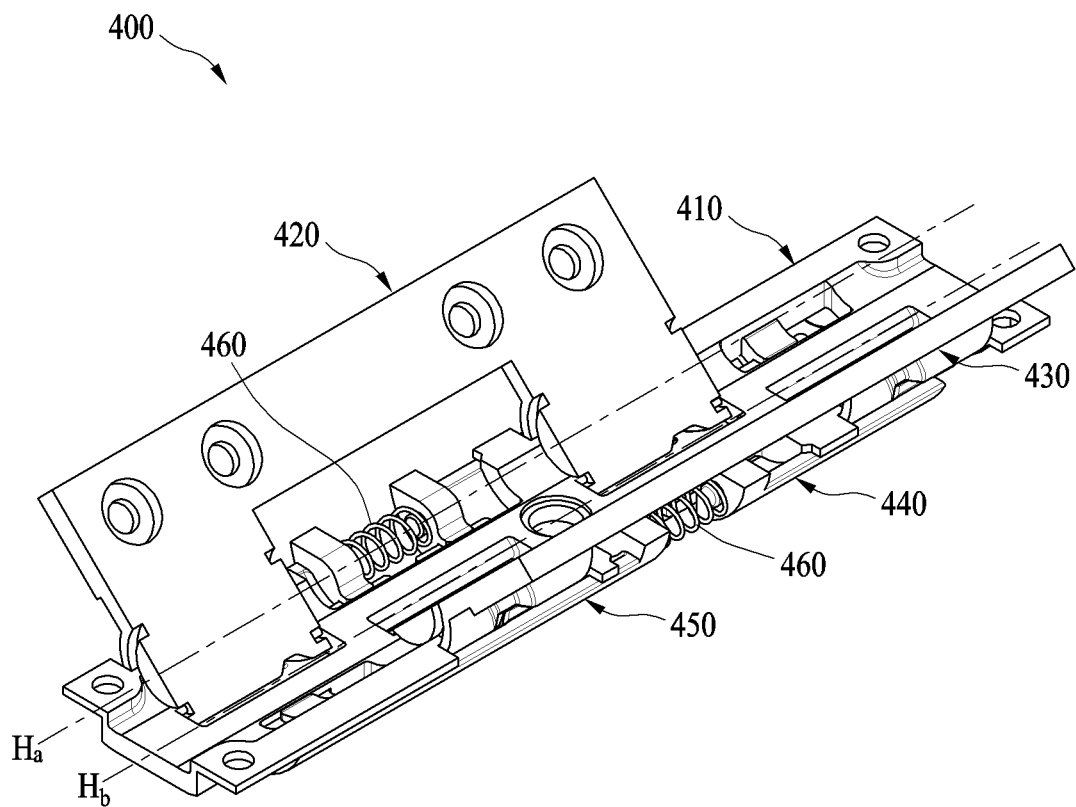
FIG. 4K is a perspective view illustrating an intermediate state of a hinge assembly according to an example embodiment.
Figure 4L:
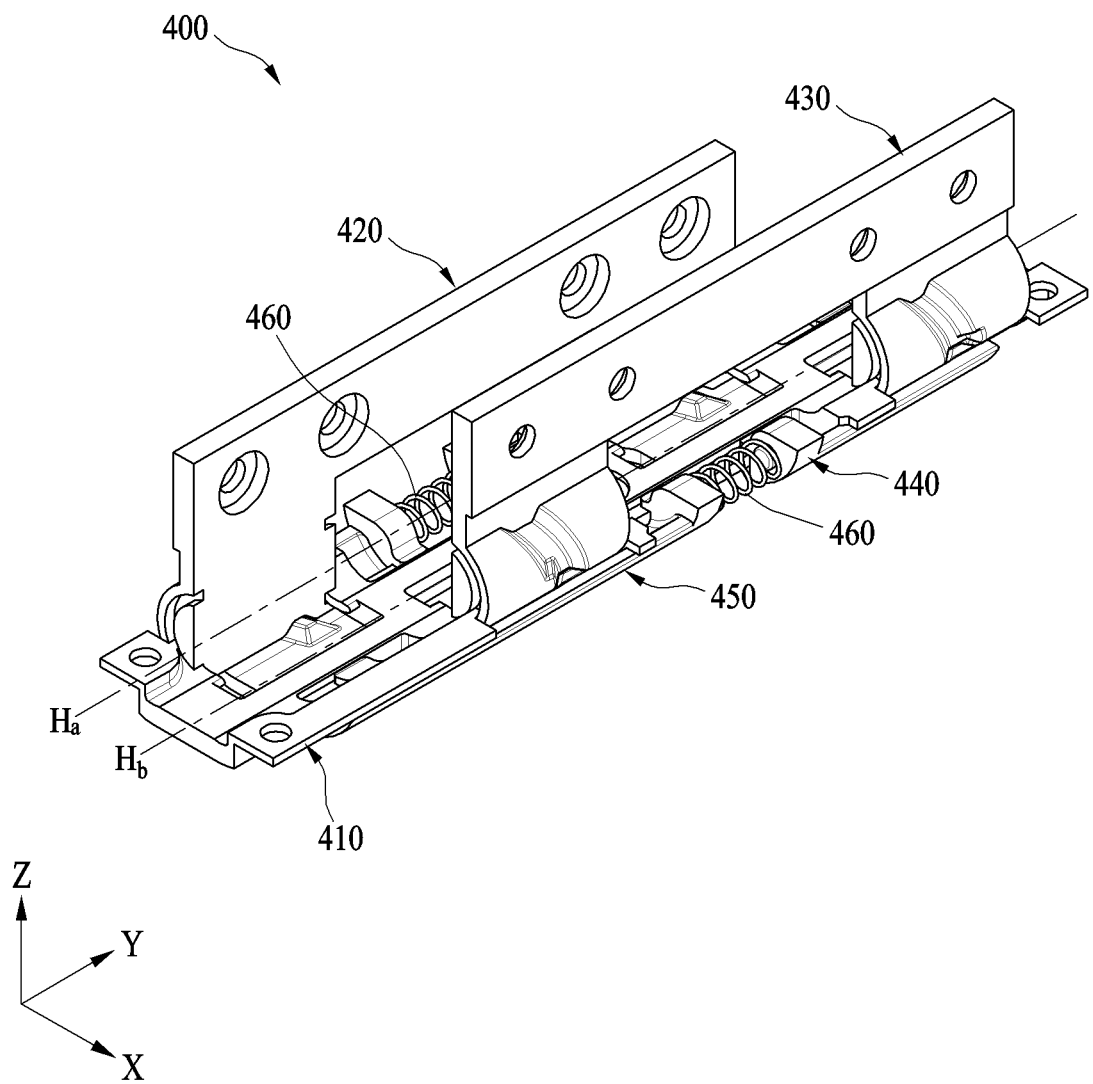
FIG. 4L is a perspective view illustrating a folded state of the hinge assembly according to an example embodiment.
Figure 4M:
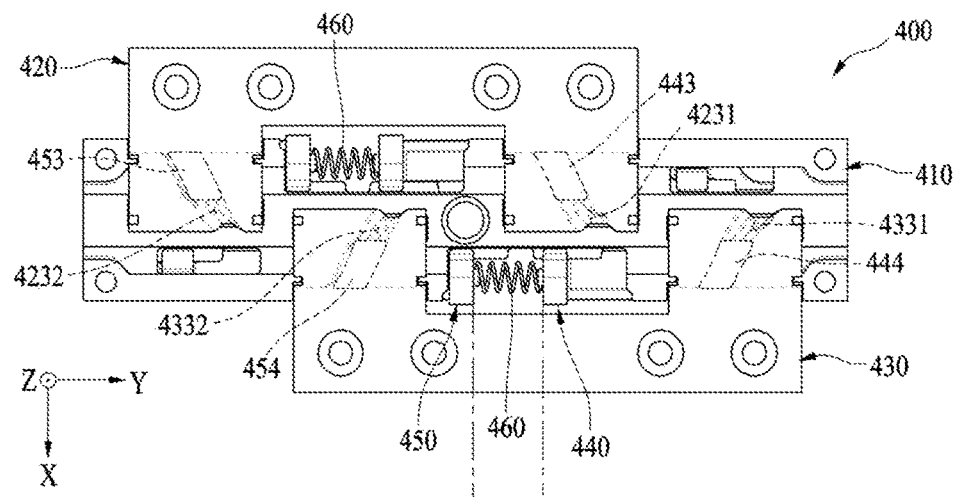
FIGS. 4M, 4N and 4O are front views illustrating the hinge assembly respectively in an unfolded state, an intermediate state, and a folded state, according to an example embodiment.
Figure 4N:
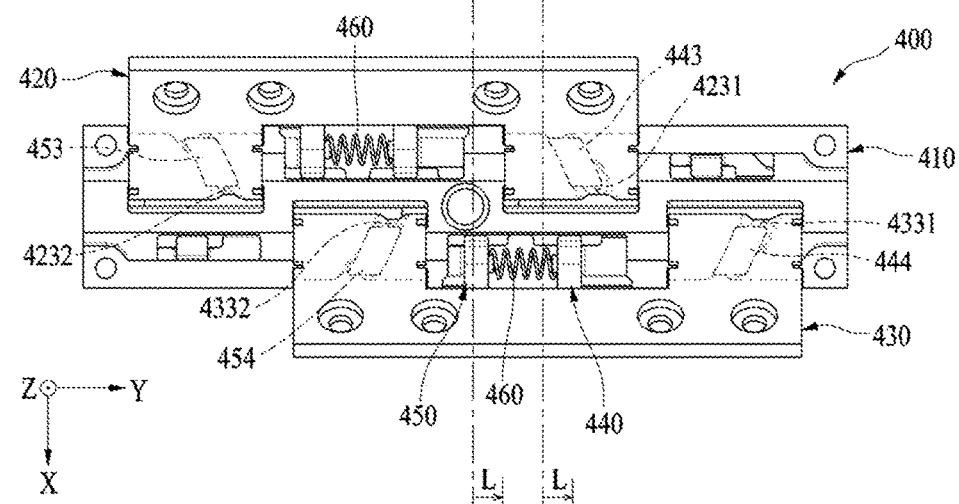
Figure 4O:
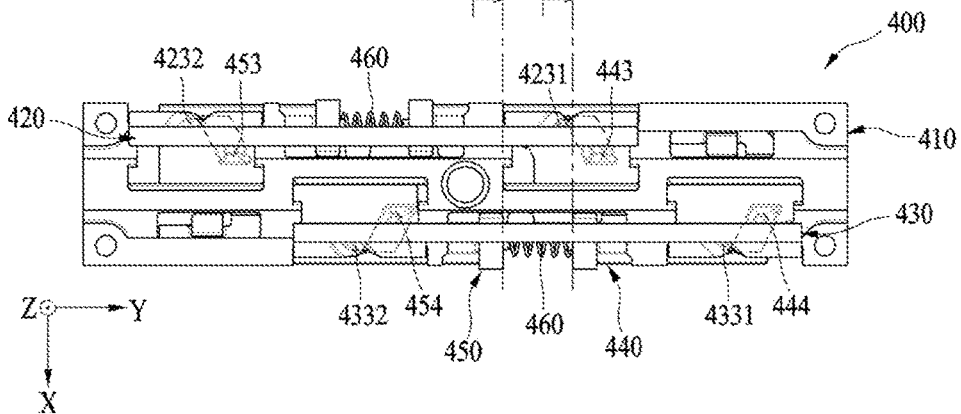

FIG. 4K is a perspective view illustrating an intermediate state of a hinge assembly according to an example embodiment. FIG. 4L is a perspective view illustrating a folded state of the hinge assembly according to an example embodiment. FIGS. 4M, 4N and 4O are front views illustrating the hinge assembly respectively in an unfolded state, an intermediate state, and a folded state, according to an example embodiment.

Referring to FIG. 4A and FIGS. 4K to 4O, in an example embodiment, as the first rotator 420 and the second rotator 430 rotate on the first hinge axis Ha and the second hinge axis Hb, respectively, the hinge assembly 400 may be in an unfolded state (e.g., FIG. 4A), an intermediate state (e.g., FIG. 4K), and a folded state (e.g., FIG. 4L).

In an example embodiment, the first rotator 420 may interoperate with the first slider 440 through the first helical groove 4231 and the first helical projection 443 and may interoperate with the second slider 450 through the second helical groove 4232 and the second helical projection 453. When the first rotator 420 rotates on the first hinge axis Ha, as the first helical projection 443 slides along the helical shape of the first helical groove 4231, the first slider 440 may linearly move in the first hinge axis Ha direction (e.g., the y-axis direction) with respect to the hinge bracket 410 by a pitch in an axis direction (e.g., the y-axis direction) corresponding to a rotation angle of the helical shape of the first helical groove 4231, and as the second helical projection 453 slides along the helical shape of the second helical groove 4232, the second slider 450 may linearly move in the first hinge axis Ha direction (e.g., the y-axis direction) with respect to the hinge bracket 410 by a pitch in the axis direction (e.g., the y-axis direction) corresponding to a rotation angle of the helical shape of the second helical groove 4232.

In an example embodiment, the second rotator 430 may interoperate with the first slider 440 through the third helical groove 4331 and the third helical projection 444 and may interoperate with the second slider 450 through the fourth helical groove 4332 and the fourth helical projection 454. When the second rotator 430 rotates on the second hinge axis Hb, as the third helical projection 444 slides along the helical shape of the third helical groove 4331, the first slider 440 may linearly move in the second hinge axis Hb direction (e.g., the y-axis direction) with respect to the hinge bracket 410 by a pitch in an axis direction (e.g., the y-axis direction) corresponding to a rotation angle of the helical shape of the third helical groove 4331, and as the fourth helical projection 454 slides along the helical shape of the fourth helical groove 4332, the second slider 450 may linearly move in the second hinge axis Hb direction (e.g., the y-axis direction) with respect to the hinge bracket 410 by a pitch in the axis direction (e.g., the y-axis direction) corresponding to a rotation angle of the helical shape of the fourth helical groove 4332.

In an example embodiment, when a state of the hinge assembly 400 switches from an unfolded state (e.g., FIG. 4M) to a folded state (e.g., FIG. 4O), the first slider 440 and the second slider 450 may linearly move by a designated length L in the +Y direction.

In an example embodiment, according to the structure described above, a rotation operation of the first rotator 420 and a rotation operation of the second rotator 430 may interoperate with each other by using linear movements of the first slider 440 and the second slider 450 as a medium. For example, any one of the rotation operations of the first rotator 420 and the second rotator 430 may interoperate with the other rotation operation of the first rotator 420 and the second rotator 430, by using linear movements of the first slider 440 and the second slider 450 as a medium. Accordingly, as the rotation operations of the first rotator 420 and the second rotator 430 interoperate with each other by the linear movements of the first slider 440 and the second slider 450 together with each other, rotation angles of the first rotator 420 and the second rotator 430 may be synchronized with each other.

Referring to FIGS. 4M, 4N and 4O, in an example embodiment, when a state of the hinge assembly 400 switches from the unfolded state (e.g., FIG. 4M), through the intermediate state (e.g., FIG. 4N), and to the folded state (e.g., FIG. 4O) or from the folded state (e.g., FIG. 4O), through the intermediate state (e.g., FIG. 4N), and to the unfolded state (e.g., FIG. 4M), a length in which the first slider 440 moves and a length in which the second slider 450 moves may be identical to each other. For example, when the first slider 440 moves in the +Y direction by L, the second slider 450 may also move in the +Y direction by L. Accordingly, while the hinge assembly 400 operates, a relative distance between the first slider 440 and the second slider 450 may be maintained to be constant. As a result, while the hinge assembly 400 operates, the elastic member 460 disposed between the first slider 440 and the second slider 450 may provide an elastic force with the same magnitude to the first slider 440 and the second slider 450. That is, the elastic member 460 disposed between the first slider 440 and the second slider 450 effectively connects the first slider 440 and the second slider 450 such that these sliders are moveable together with each other by rotation of one or more of the rotators.

Figure 5A:
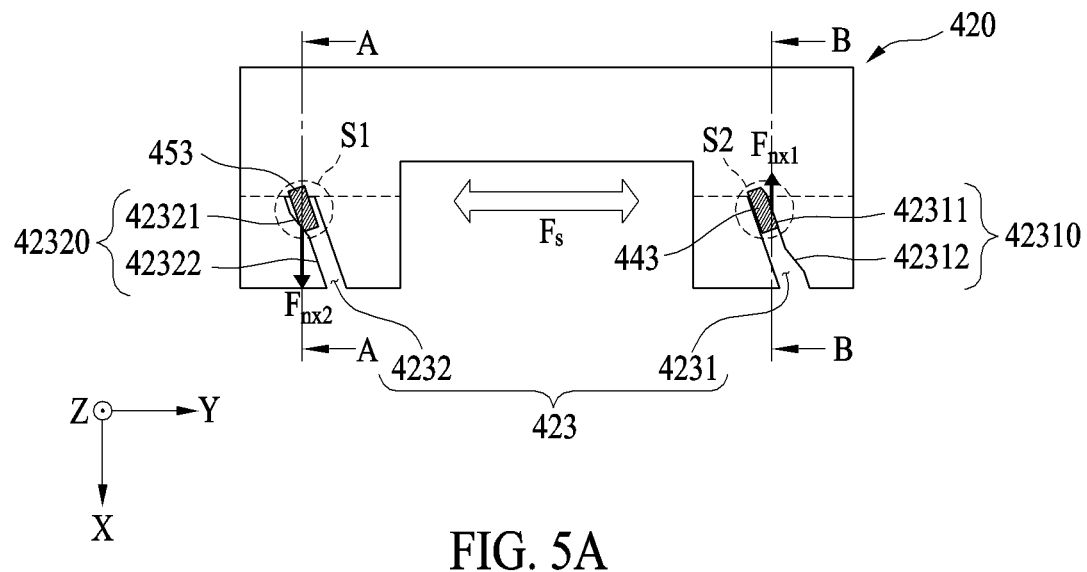
FIGS. 5A to 5E are diagrams illustrating an open detent occurring when the hinge assembly is in an unfolded state, according to an example embodiment.
Figure 5B:
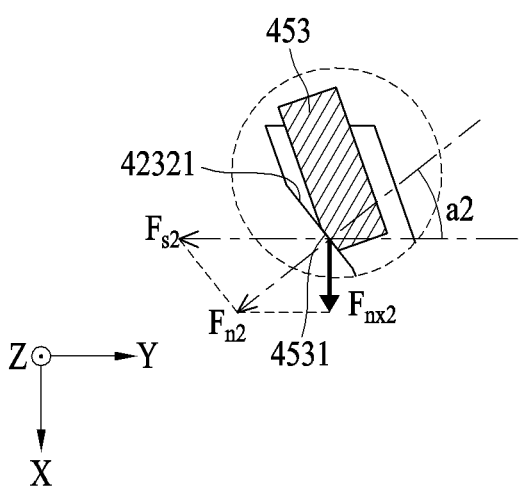
Figure 5C:
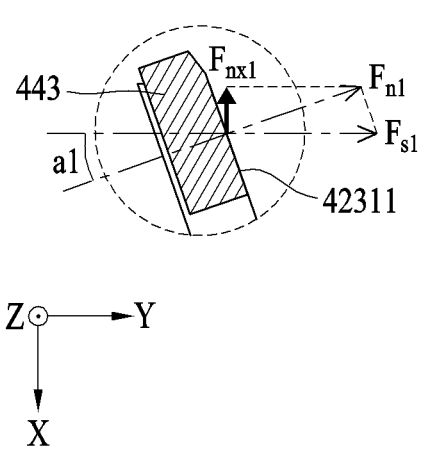
Figure 5D:
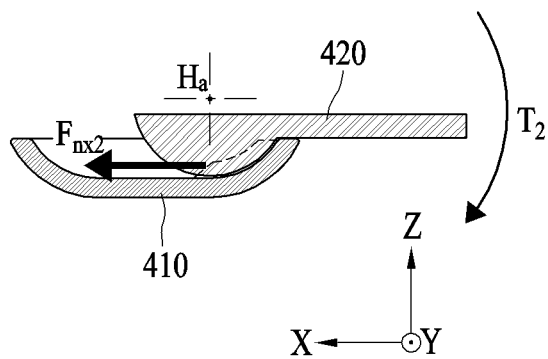
Figure 5E:
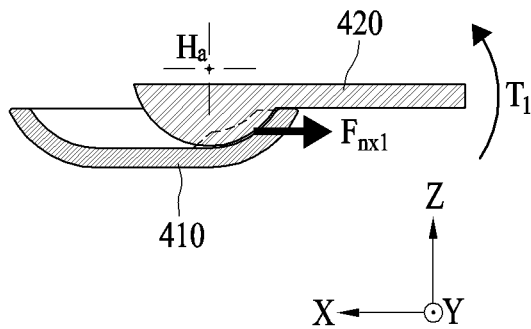

FIGS. 5A to 5E are diagrams illustrating an open detent occurring when the hinge assembly is in an unfolded state, according to an example embodiment. FIG. 5A is a schematic view illustrating a state in which the first helical projection 443 and the second helical projection 453 interoperate with the first helical structure 423, when viewing the first rotator 420 of FIG. 4M from the front, FIG. 5B is an enlarged plan view of S1 of FIG. 5A, FIG. 5C is an enlarged plan view of S2 of FIG. 5A, FIG. 5D is a schematic view taken along a line A-A of FIG. 5A, and FIG. 5E5E is a schematic view taken along a line B-B of FIG. 5A.

Figure 5F:
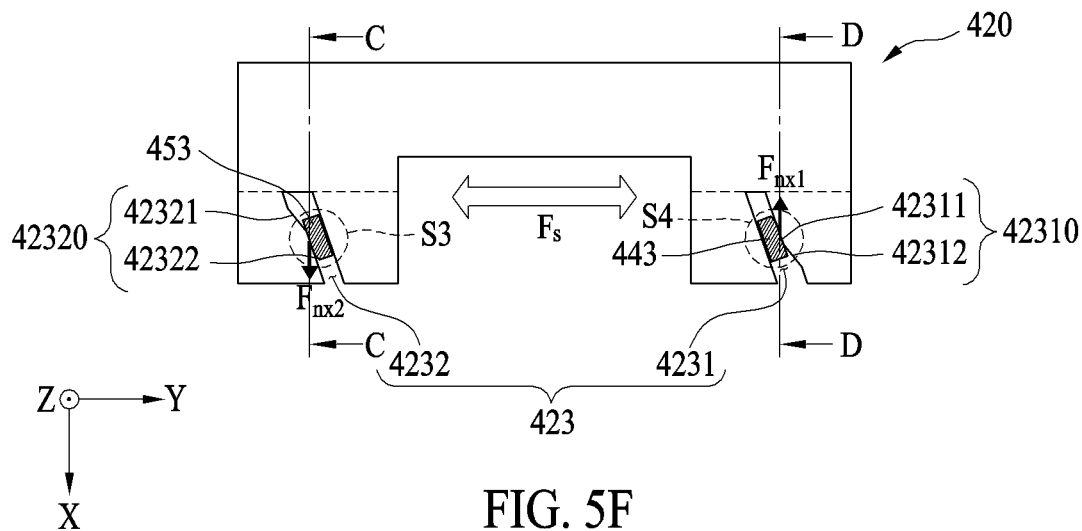
FIGS. 5F to 5J are diagrams illustrating a free stop occurring when the hinge assembly is in an intermediate state, according to an example embodiment.
Figure 5G:
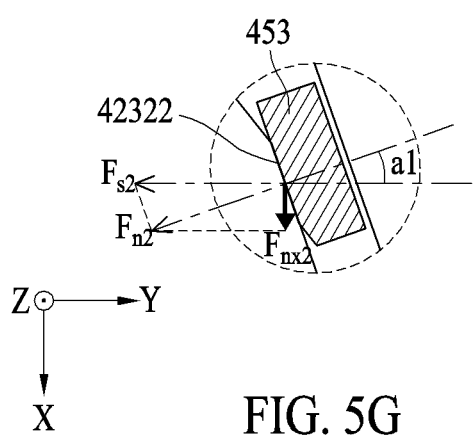
Figure 5H:
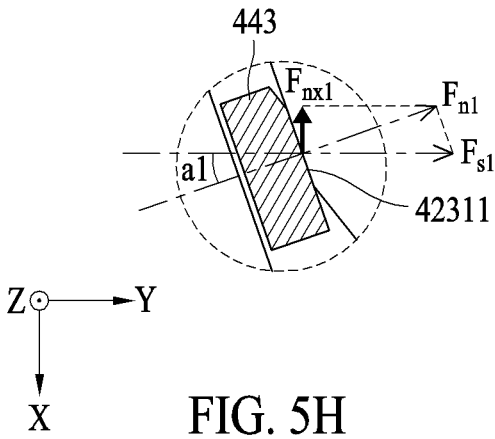
Figure 5I:
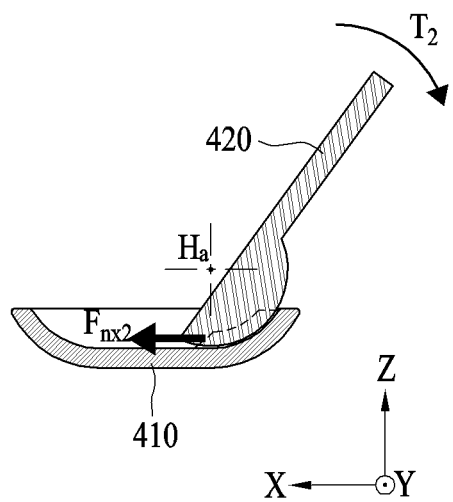
Figure 5J:
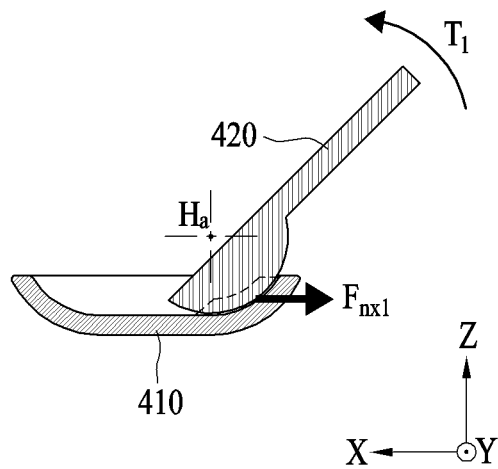

FIGS. 5F to 5J are diagrams illustrating a free stop occurring when the hinge assembly is in an intermediate state, according to an example embodiment. FIG. 5F is a schematic view illustrating a state in which the first helical projection 443 and the second helical projection 453 interoperate with the first helical structure 423, when viewing the first rotator 420 of FIG. 4M from the front, FIG. 5G is an enlarged plan view of S3 of FIG. 5F, FIG. 5H is an enlarged plan view of S4 of FIG. 5F, FIG. 5I is a schematic view taken along a line C-C of FIG. 5F, and FIG. 5J is a schematic view taken along a line D-D of FIG. 5J.

Figure 5K:
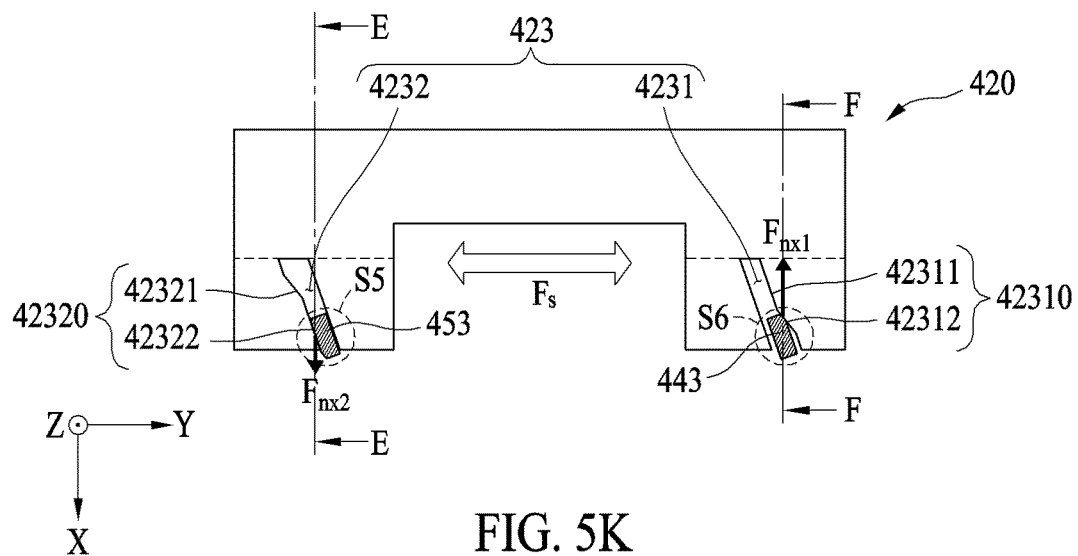
FIGS. 5K to 5O are diagrams illustrating a close detent occurring when the hinge assembly is in a folded state, according to an example embodiment.
Figure 5L:
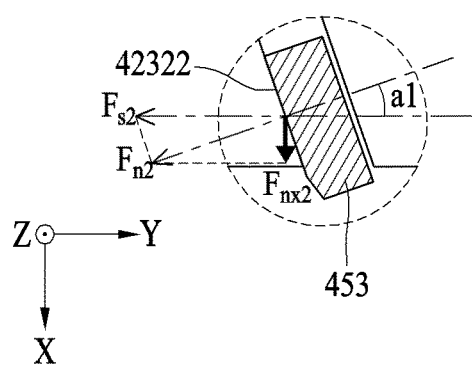
Figure 5M:
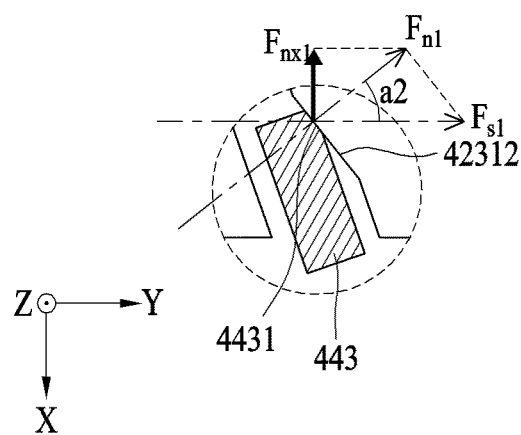
Figure 5N:
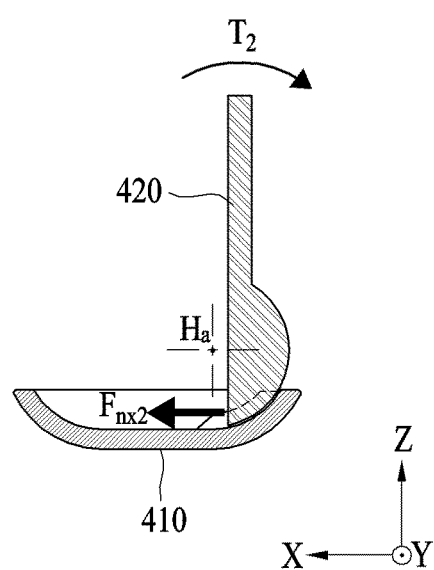
Figure 5O:
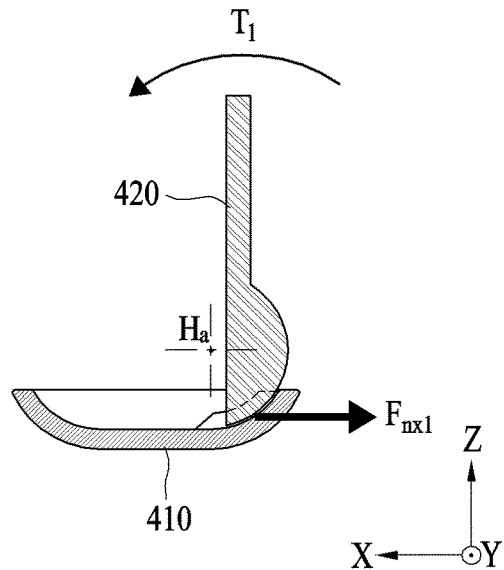

FIGS. 5K to 5O are diagrams illustrating a close detent occurring when the hinge assembly is in a folded state, according to an example embodiment. FIG. 5K is a schematic view illustrating a state in which the first helical projection 443 and the second helical projection 453 interoperate with the first helical structure 423, when viewing the first rotator 420 of FIG. 4O from the front, FIG. 5L is an enlarged plan view of S5 of FIG. 5K, FIG. 5M is an enlarged plan view of S6 of FIG. 5K, FIG. 5N is a schematic view taken along a line E-E of FIG. 5K, and FIG. 5O is a schematic view taken along a line F-F of FIG. 5K.

Referring to FIGS. 5A to 5O, in an example embodiment, the elastic member 460 disposed between the first slider 440 and the second slider 450 may provide an elastic force Fs in a direction in which the first slider 440 and the second slider 450 are apart (e.g., spaced apart) from each other. For example, with reference to FIGS. 5A to 5E, the first slider 440 may be pushed in the right direction (e.g., the +Y direction) by the elastic force Fs of the elastic member 460 and the second slider 450 may be pushed in the left direction (e.g., the -Y direction) by the elastic force Fs of the elastic member 460. Referring to FIGS. 5A, 5F, and 5K, as the first slider 440 is pushed in the right direction (e.g., the +Y direction) by the elastic force Fs of the elastic member 460, the first helical projection 443 of the first slider 440 may contact the right side surface (e.g., a surface in the +Y direction) of the first helical groove 4231 of the first rotator 420 and the third helical projection 444 of the first slider 440 may contact the right side surface (e.g., the surface in the +Y direction) of the third helical groove 4331 of the second rotator 430. Similarly, as the second slider 450 is pushed in the left direction (e.g., the -Y direction) by the elastic force Fs of the elastic member 460, the second helical projection 453 of the second slider 450 may contact the left side surface (e.g., a surface in the -Y direction) of the second helical groove 4232 of the first rotator 420 and the fourth helical projection 454 of the second slider 450 may contact the left side surface (e.g., the surface in the -Y direction) of the fourth helical groove 4332 of the second rotator 430. According to the configuration described above, since the state in which the first, third, second, and fourth helical projections 443, 444, 453, and 454 contact one side surface of the first, second, third, and fourth helical grooves 4231, 4232, 4331, and 4332 in spaces in the first, second, third, and fourth helical grooves 4231, 4232, 4331, and 4332 by the elastic force Fs of the elastic member 460, an abnormal operation of a gap occurring between the first, third, second, and fourth helical projections 443, 444, 453, and 454 and the first, second, third, and fourth helical grooves 4231, 4232, 4331, and 4332 while the hinge assembly 400 is folded or unfolded may decrease.

Referring to FIGS. 5A to 5O, in an example embodiment, the first slider 440 may be pushed in the right direction (e.g., +Y direction) and the second slider 450 may be pushed in the left direction (e.g., the -Y direction) by the elastic force Fs provided by the elastic member 460. Accordingly, the first helical projection 443 of the first slider 440 may contact a first surface 42310 of the first helical groove 4231 of the first rotator 420 and the second helical projection 453 of the second slider 450 may contact a second surface 42320 of the second helical groove 4232 of the first rotator 420. The first surface 42310 and the second surface 42320 may be surfaces in a direction facing each other. For example, the first surface 42310 may be the right side surface (e.g., the surface in the +Y direction) of the first helical groove 4231 and the second surface 42320 may be the left side surface (e.g., the surface in the -Y direction) of the second helical groove 4232.

In an example embodiment, the first surface 42310 may include a first inclined surface 42311 and a second inclined surface 42312. The first inclined surface 42311 may be inclined where a normal line has a first angle a1 with respect to a direction (e.g., the Y direction) parallel with the first hinge axis Ha. The second inclined surface 42312 may be inclined where a normal line has a second angle a2 with respect to a direction (e.g., the Y direction) parallel with the first hinge axis Ha.

In an example embodiment, the second surface 42320 may include a third inclined surface 42321 and a fourth inclined surface 42322. The third inclined surface 42321 may be inclined where a normal line has the second angle a2 with respect to a direction (e.g., the y-axis direction) parallel with the first hinge axis Ha. The fourth inclined surface 42322 may be inclined where a normal line has the first angle a1 with respect to a direction (e.g., the y-axis direction) parallel with the first hinge axis Ha.

In an example embodiment, the first angle a1 and the second angle a2 may be less than or equal to about 45 degrees, and the second angle a2 may be greater than the first angle a1. Alternatively, the first angle a1 and the second angle a2 may be greater than or equal to about 45 degrees and less than or equal to about 90 degrees, and the second angle a2 may be less than the first angle a1. For example, the second angle a2 may substantially be about 45 degrees.

However, this is an example, and the first angle a1 and the second angle a2 are not limited thereto.

In an example embodiment, the first helical projection 443 may be formed where a normal line of the first helical projection 443 has the first angle a1 with respect to a direction to (e.g., the y-axis direction) parallel with the first hinge axis Ha. For example, referring to FIG. 5C, one side surface (e.g. a side surface in the +Y direction) of the first helical projection 443 may form the first angle a1 with the first inclined surface 42311. At least a portion of the first helical projection 443 may be formed such that a normal line has the second angle a2 with respect to a direction (e.g., the y-axis direction) parallel with the first hinge axis Ha. For example, referring to FIG. 5M, a corner 4431 (e.g., a corner in the −X and +Y directions) of the first helical projection 443 may be formed at the second angle a2 corresponding to the second inclined surface 42312. According to this configuration, the first helical projection 443 may be in surface contact with both of the first inclined surface 42311 and the second inclined surface 42312.

In an example embodiment, the second helical projection 453 may be formed where a normal line of the second helical projection 453 has the first angle a1 with respect to a direction (e.g., the y-axis direction) parallel with the first hinge axis Ha. For example, referring to FIG. 5L, one side surface (e.g. a side surface in the −Y direction) of the second helical projection 453 may form the first angle a1 with the fourth inclined surface 42322. At least a portion of the second helical projection 453 may be formed such that a normal line has the second angle a2 with respect to a direction (e.g., the y-axis direction) parallel with the first hinge axis Ha. For example, referring to FIG. 5B, a corner 4531 (e.g., a corner in the +X and −Y directions) of the second helical projection 453 may be formed at the second angle a2 corresponding to the third inclined surface 42321. According to this configuration, the second helical projection 453 may be in surface contact with both of the third inclined surface 42321 and the fourth inclined surface 42322.

Hereinafter, with reference to FIGS. 5A to 5E, an open detent occurring when the hinge assembly 400 is in an unfolded state is described. That is, the hinge assembly which is unfolded defines an open detent.

Referring to FIGS. 5A to 5E, an open detent may occur when the hinge assembly 400 is in the unfolded state, according to an example embodiment. The open detent may be or define a force or a torque to allow the hinge assembly 400 to be maintained in the unfolded state. The open detent force may be generated by interoperation between the first helical structure 423 of the first rotator 420, the second helical structure 433 of the second rotator 430, the first helical projection 443 and the third helical projection 444 of the first slider 440, and the second helical projection 453 and the fourth helical projection 454 of the second slider 450. Hereinafter, for ease of description, the description is provided based on the first rotator 420.

In an example embodiment, as shown in FIG. 5A, in the unfolded state of the hinge assembly 400, the first helical projection 443 may contact the first inclined surface 42311 and the second helical projection 453 may contact the third inclined surface 42321.

In an example embodiment, the first helical projection 443 may receive a first elastic force Fs1 in the +Y direction from the elastic member 460. The first elastic force Fs1 may be substantially a half of the magnitude of the elastic force Fs provided by the elastic member 460. The first helical projection 443 may transmit a force, to the first inclined surface 42311, having the same magnitude of the first elastic force Fs1 in the +Y direction. A first normal force Fn1 applied between the first helical projection 443 and the first inclined surface 42311 may satisfy a relationship of $Fn_1 = Fs_1 * \cos(a_1) = \frac{1}{2}Fs * \cos(a_1)$. An x-axis direction element Fnx1 of the first normal force Fn1 may satisfy a relationship of $Fnx_1 = \frac{1}{2}Fs * \cos(a_1) * \sin(a_1) = \frac{1}{4}Fs * \sin(2a_1)$. The x-axis direction element Fnx1 of the first normal force Fn1 may apply in the −X direction. As shown in FIG. 5E, the x-axis direction element Fnx1 of the first normal force Fn1 may generate a first torque T1 with the first hinge axis Ha as a center. When a distance between the first hinge axis Ha and a point to which the first normal force Fn1 is applied is r, the first torque T1 may satisfy a relationship of $T_1 = r * Fnx_1 = \frac{1}{4} * r * Fs * \sin(2a_1)$. The first torque T1 may be applied in a counterclockwise direction based on FIG. 5E.

Similarly, the second helical projection 453 may receive a second elastic force Fs2 in the −Y direction from the elastic member 460. The second elastic force Fs2 may be substantially a half of the magnitude of the elastic force Fs provided by the elastic member 460. The second helical projection 453 may transmit a force, to the third inclined surface 42321, having the same magnitude of the second elastic force Fs2 in the +Y direction. A second normal force Fn2 applied between the second helical projection 453 and the third inclined surface 42321 may satisfy a relationship of $Fn_2 = Fs_2 * \cos(a_2) = \frac{1}{4}Fs * \cos(a_2)$. An x-axis direction element Fnx2 of the second normal force Fn2 may satisfy a relationship of $Fnx_2 = \frac{1}{2}Fs * \cos(a_2) * \sin(a_2) = \frac{1}{4}Fs * \sin(2a_2)$. The x-axis direction element Fnx2 of the second normal force Fn2 may apply in the +X direction. As shown in FIG. 5D, the x-axis direction element Fnx2 of the second normal force Fn2 may generate a second torque T2 with the first hinge axis Ha as a center. The second torque T2 may satisfy a relationship of $T_2 = r * Fnx_2 \frac{1}{4} * r * Fs * \sin(2a_2)$. The second torque T2 may be applied in a clockwise direction based on FIG. 5D.

Accordingly, with reference to FIGS. 5D and 5E, in the first helical groove 4231 of the first rotator 420, the first torque T1 may be generated in the counterclockwise direction and in the second helical groove 4232, the second torque T2 may be generated in the clockwise direction. Here, since the first angle a1 and the second angle a2 are less than or equal to about 45 degrees and the second angle a2 is greater than the first angle a1, $\sin(2a_2)$ may be greater than $\sin(2a_1)$. As a result, when the hinge assembly 400 is in the unfolded state, the second torque T2 $T_2 \frac{1}{4} * r * Fs * \sin(2a_2)$ may be greater than the first torque T1 $T_1 = \frac{1}{4} * r * Fs * \sin(2a_1)$. Accordingly, when the hinge assembly 400 is in the unfolded state, an effective torque applied to the first rotator 420 may be generated in the clockwise direction. When the hinge assembly 400 is in the unfolded state, the effective torque applied to the first rotator 420 in the clockwise direction may function as an open detent for maintaining the first rotator 420 to be in the unfolded state. The first rotator 420 may begin to be folded only when a force and/or a torque greater than the open detent is applied to the first rotator 420, and the first rotator 420 may be maintained to be in the unfolded state in case the force and/or the torque greater than the open detent is not applied to the first rotator 420.

Hereinafter, with reference to FIGS. 5F to 5J, a free stop occurring when the hinge assembly 400 is in an intermediate state is described.

Referring to FIGS. 5F to 5J, when the hinge assembly 400 is in the intermediate state, the free stop may occur. The free stop may be a state to maintain the hinge assembly 400 to be in the intermediate state. The free stop may be generated by interoperation between the first helical structure 423 of the first rotator 420, the second helical structure 433 of the second rotator 430, the first helical projection 443 and the third helical projection 444 of the first slider 440, and the second helical projection 453 and the fourth helical projection 454 of the second slider 450. Hereinafter, for ease of description, the description is provided based on the first rotator 420.

In an example embodiment, as shown in FIG. 5F, when the hinge assembly 400 is in the intermediate state, the first helical projection 443 may contact the second inclined surface 42312 and the second helical projection 453 may contact the third inclined surface 42321.

As described with reference to FIGS. 5A to 5E, the first elastic force Fs1 transmitted to the first helical groove 4231 by the elastic member 460 through the first helical projection 443 may be converted into the first torque T1 applied in the counterclockwise direction based on FIG. 5J, and the second elastic force Fs2 transmitted to the second helical groove 4232 by the elastic member 460 through the second helical projection 453 may be converted into the second torque T2 applied in the clockwise direction based on FIG. 5I. Since the second inclined surface 42312 forms the first angle a1 and the third inclined surface 42321 forms the first angle a1, the first torque T1 may satisfy a relationship of $T_1=\frac{1}{4} \ast r \ast Fs \ast \sin(2a_1)$ and the second torque T2 may satisfy a relationship of $T_2=\frac{1}{4} \ast r \ast Fs \ast \sin(2a_1)$. That is, since an inclination angle of the second inclined surface 42312 and an inclination angle of the third inclined surface 42321 are the same as the first angle a1, the first torque T1 $T_1=\frac{1}{4} \ast r \ast Fs \ast \sin(2a_1)$ may be the same as the second torque T2 $T_2=\frac{1}{4} \ast r \ast Fs \ast \sin(2a_1)$ when the hinge assembly 400 is in the intermediate state. Accordingly, when the hinge assembly 400 is in the intermediate state, the effective torque may not be generated, and thus, the hinge assembly 400 may be maintained to be in the intermediate state.

Hereinafter, with reference to FIGS. 5K to 5O, a close detent occurring when the hinge assembly 400 is in a folded state is described.

Referring to FIGS. 5K to 5O, the close detent may occur when the hinge assembly 400 is in the folded state. The close detent may be a force or a torque to allow the hinge assembly 400 to be maintained in the folded state. The close detent may be generated by interoperation between the first helical structure 423 of the first rotator 420, the second helical structure 433 of the second rotator 430, the first helical projection 443 and the third helical projection 444 of the first slider 440, and the second helical projection 453 and the fourth helical projection 454 of the second slider 450. Hereinafter, for ease of description, the description is provided based on the first rotator 420.

In an example embodiment, as shown in FIG. 5K, when the hinge assembly 400 is in the folded state, the first helical projection 443 may contact the second inclined surface 42312 and the second helical projection 453 may contact the fourth inclined surface 42322.

As described with reference to FIGS. 5A to 5E, the first elastic force Fs1 transmitted to the first helical groove 4231 by the elastic member 460 through the first helical projection 443 may be converted into the first torque T1 applied in the counterclockwise direction based on FIG. 5O, and the second elastic force Fs2 transmitted to the second helical groove 4232 by the elastic member 460 through the second helical projection 453 may be converted into the second torque T2 applied in the clockwise direction based on FIG. 5N. Since the second inclined surface 42312 forms the second angle a2 and the fourth inclined surface 42322 forms the first angle a1, the first torque T1 may satisfy a relationship of $T_1=\frac{1}{4} \ast r \ast Fs \ast \sin(2a_2)$ and the second torque T2 may satisfy a relationship of $T_2=\frac{1}{4} \ast r \ast Fs \ast \sin(2a_1)$. Here, since the first angle a1 and the second angle a2 are less than or equal to about 45 degrees and the second angle a2 is greater than the first angle a1, $\sin(2a_2)$ may be greater than $\sin(2a_1)$. As a result, when the hinge assembly 400 is in the folded state, the first torque T1 $T_1=\frac{1}{4} \ast r \ast Fs \ast \sin(2a_2)$ may be greater than the second torque $T_2=T_2=\frac{1}{4} \ast r \ast Fs \ast \sin(2a_1)$. Accordingly, when the hinge assembly 400 is in the folded state, an effective torque applied to the first rotator 420 may be generated in the counterclockwise direction. When the hinge assembly 400 is in the folded state, the effective torque applied to the first rotator 420 in the counterclockwise direction may function as a close detent for maintaining the first rotator 420 to be in the folded state. The first rotator 420 may begin to be unfolded only when a force and/or a torque greater than the close detent is applied to the first rotator 420, and the first rotator 420 may be maintained to be in the folded state in case the force and/or the torque greater than the close detent is not applied to the first rotator 420.

As described above, by interoperations between the first helical structure 423 of the first rotator 420, the second helical structure 433 of the second rotator 430, the first helical projection 443 and the third helical projection 444 of the first slider 440, and the second helical projection 453 and the fourth helical projection 454 of the second slider 450, the hinge assembly 400 according to an example embodiment may cause the rotation operations of the first rotator 420 and the second rotator 430 to interoperate with each other, in addition, may generate the open detent, the free stop, and the close detent. Since one hinge assembly 400 may perform rotation, detent, and interoperation functions, a separate sync assembly may not be provided, and thus, the number of components, width, weight, and/or cost of an electronic device (e.g., the electronic device 300 of FIG. 3) may be reduced.

To describe the open detent, the free stop, and the close detent of the hinge assembly 400, the description has been provided based on the first rotator 420 with reference to FIGS. 5A to 5O. However, this is for ease of description, and the second rotator 430 may generate the open detent, the free stop, and the close detent in substantially the same manner as the first rotator 420. For example, the third helical groove 4331, the fourth helical groove 4332, the third helical projection 444, and the fourth helical projection 454 may be formed to respectively and substantially include symmetrical shapes to the first helical groove 4231, the second helical groove 4232, the first helical projection 443, and the second helical projection 453 with respect to an axis (e.g., the y-axis) parallel with the first or second hinge axis Ha or Hb. The third helical groove 4331, the fourth helical groove 4332, the third helical projection 444, and the fourth helical projection 454 may interoperate in substantially the same manner described for the first helical groove 4231, the second helical groove 4232, the first helical projection 443, and the second helical projection 453. To avoid a repeated description, a description of an open detent, a free stop, and a close detent generated by the second rotator 430 is omitted.

Moreover, the description and the drawings have illustrated that the first, second, third, and fourth helical grooves 4231, 4232, 4331, and 4332 are formed in the first rotator 420 and the second rotator 430, and the first, third, second, and fourth helical projections 443, 444, 453, and 454 are formed in the first slider 440 and the second slider 450. However, this is an example, and one of ordinary skill in the art may obviously understand that helical projections may be formed in the first rotator 420 and the second rotator 430, and helical grooves may be formed in the first slider 440 and the second slider 450.

Figure 6A:
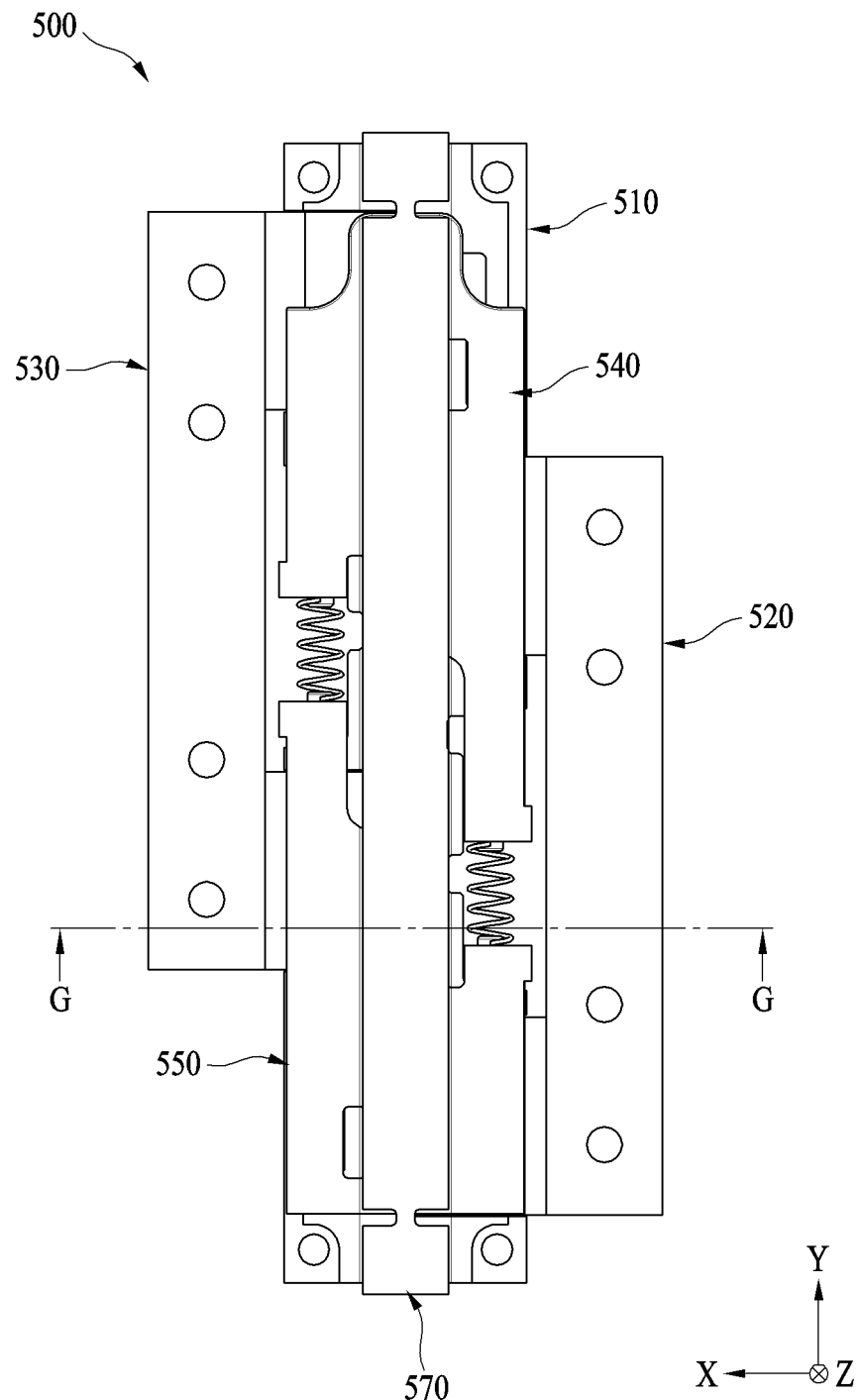
FIG. 6A is a rear view illustrating a hinge assembly according to an example embodiment.
Figure 6B:
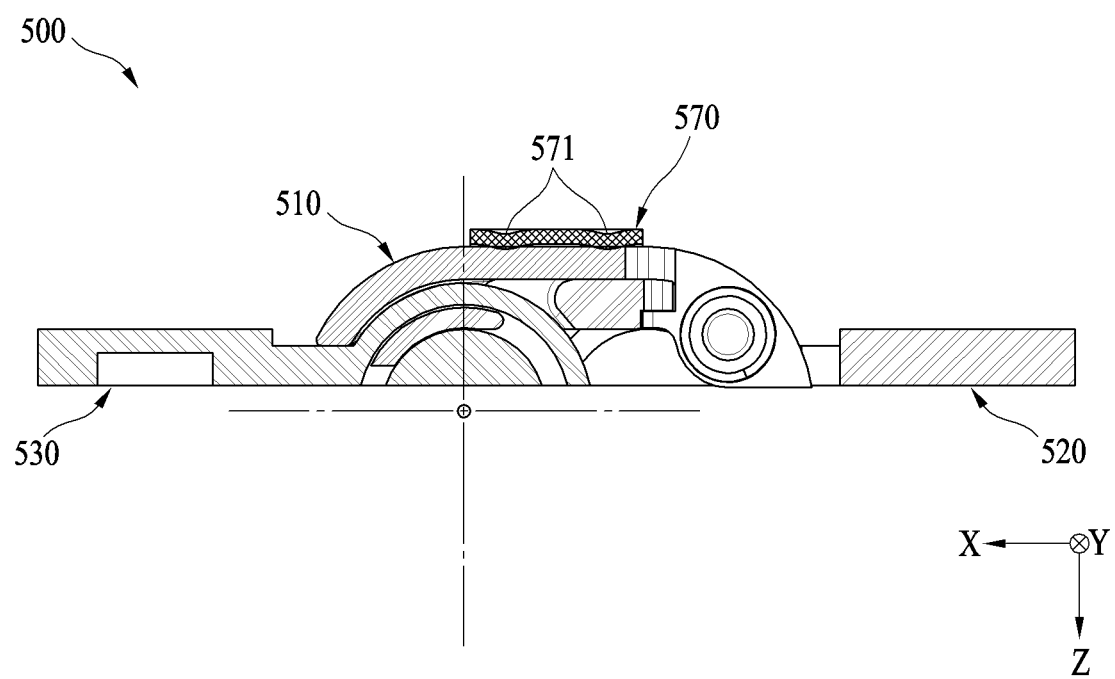
FIG. 6B is a cross-sectional view taken along line G-G of FIG. 6A.

FIG. 6A is a rear view illustrating a hinge assembly according to an example embodiment. FIG. 6B is a cross-sectional view taken along line G-G of FIG. 6A.

Referring to FIGS. 6A and 6B, a hinge assembly 500 according to an example embodiment may further include a bracket cover 570. The bracket cover 570 may be connected to the lower side (e.g. the −Z direction side) of a hinge bracket 510 to cover a first slider 540 and a second slider 550 from the lower side (e.g., the −Z direction side). For example, with reference to FIG. 6A, the bracket cover 570 may be formed in a longitudinal direction (e.g., the y-axis direction) corresponding to the hinge bracket 510, and one side and the other side of the bracket cover 570 may be formed to be fastened to the upper end (e.g., the end in the +Y direction) and the lower end (e.g., the end in the −Y direction) of the hinge bracket 510, respectively.

In an example embodiment, the bracket cover 570 may press the first slider 540 and the second slider 550 in a front direction (e.g., the +Z direction) with respect to the hinge bracket 510. The bracket cover 570 may include an uneven portion 571 protruding toward the front direction (e.g., the +Z direction). For example, the uneven portion 571 may be curved to protrude from a front surface (e.g., a surface in the +Z direction) of the bracket cover 570 toward the front direction (e.g., the +Z direction). The uneven portion 571 may be formed in a longitudinal direction (e.g., the y-axis direction) of the bracket cover 570. For example, a pair of uneven portions 571 spaced apart from each other in a width direction (e.g., the x-axis direction) of the bracket cover 570 may be formed.

In an example embodiment, as the bracket cover 570 presses the first slider 540 and the second slider 550 in the front direction (e.g., the +Z direction) with respect to the hinge bracket 510, a magnitude of a normal force applied between the hinge bracket 510 and the two sliders (the first slider 540 and the second slider 550) may increase. Accordingly, a friction force generated between the hinge bracket 510 and the two sliders (the first slider 540 and the second slider 550) may increase. In other words, a resistance force to the sliding between the first slider 540 and the hinge bracket 510 and a resistance force to the sliding between the second slider 550 and the hinge bracket 510 may increase. Accordingly, a resistance force to rotation operations of the first rotator 520 and the second rotator 530 may increase, and thus, the free stop performance that maintains the intermediate state of the hinge assembly 500 when the hinge assembly 500 is in the intermediate state may be improved.

Figure 7A:
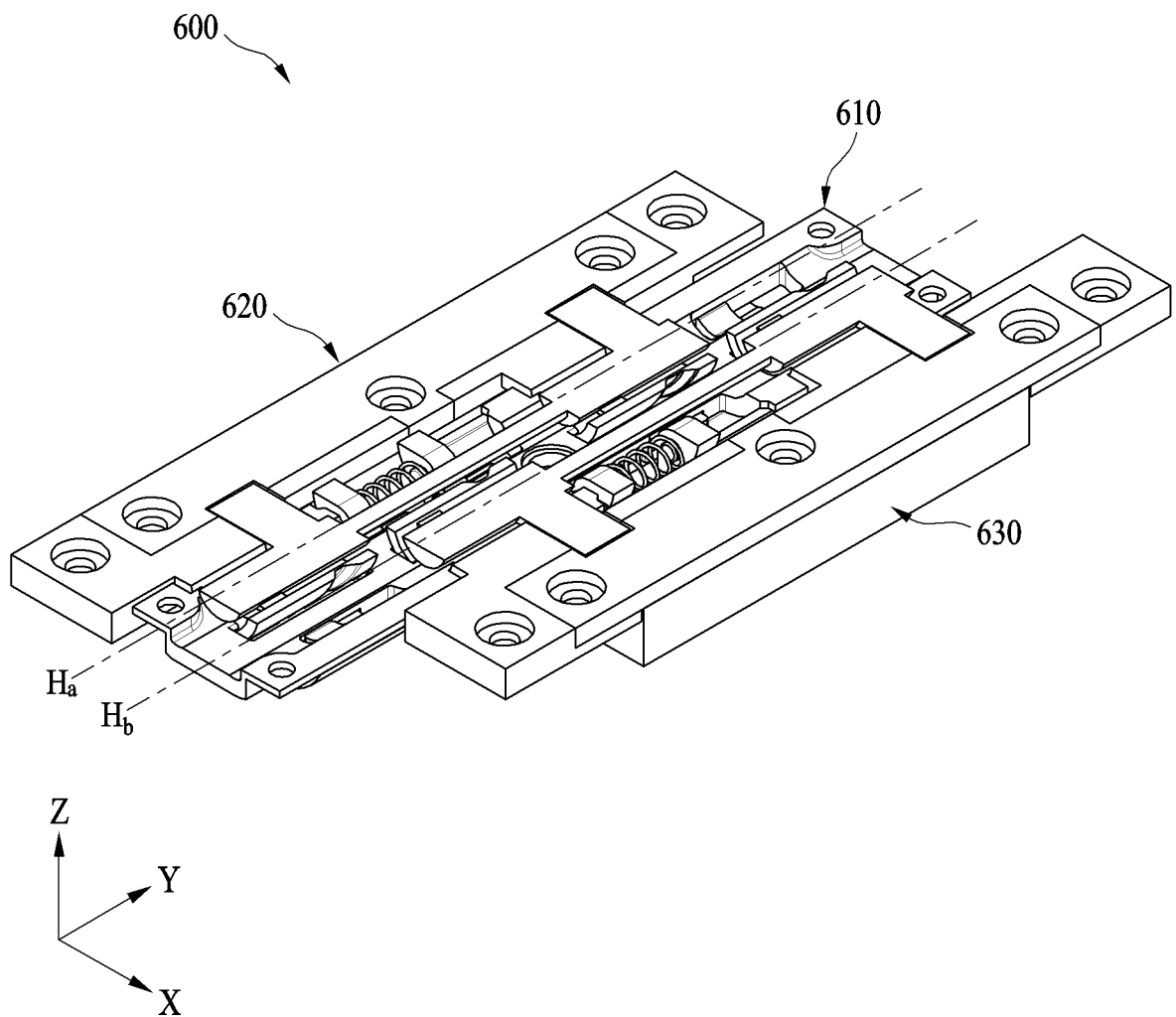
FIG. 7A is a perspective view illustrating a hinge assembly according to an example embodiment.
Figure 7B:
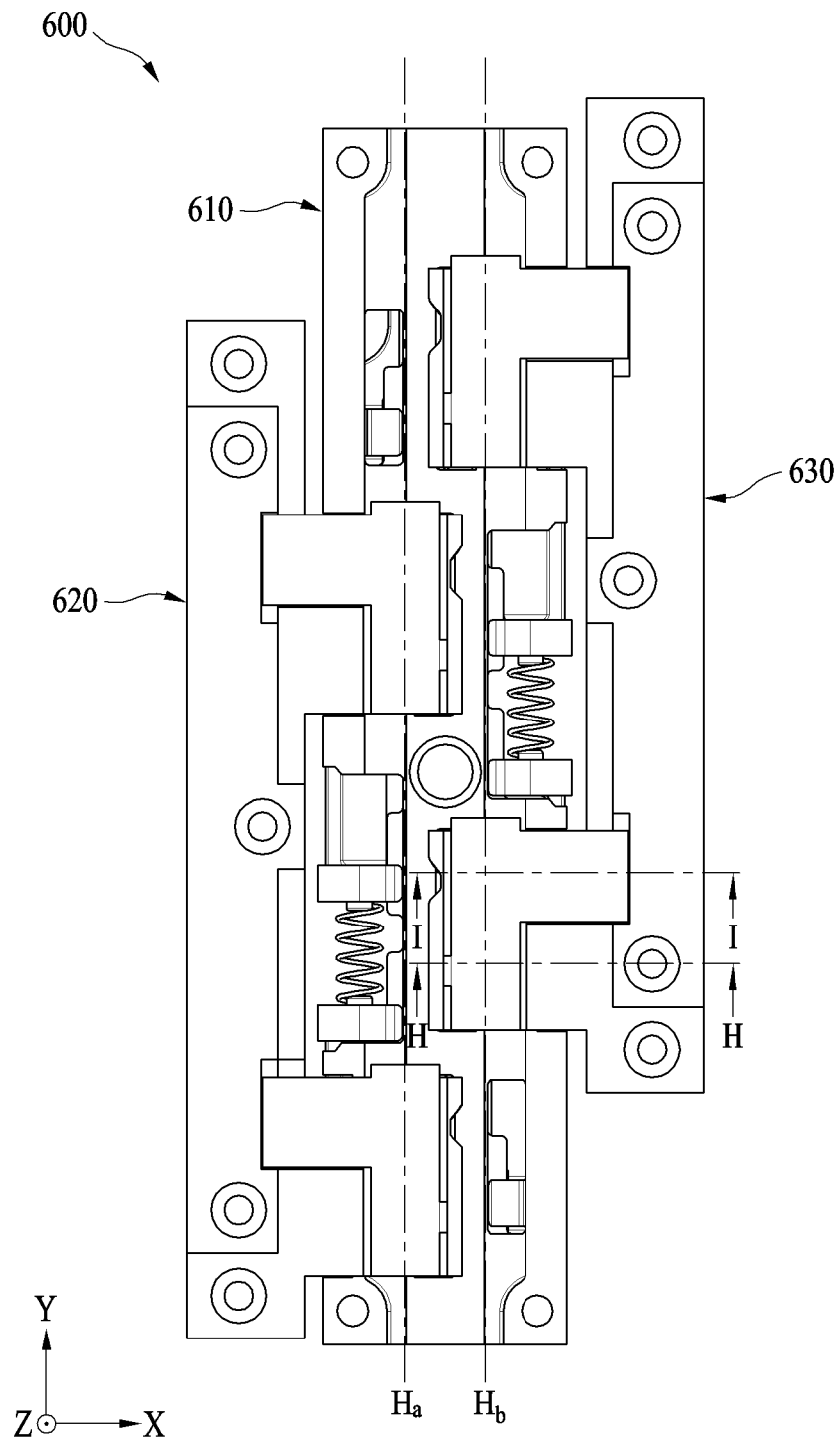
FIG. 7B is a front view illustrating the hinge assembly according to an example embodiment.
Figure 7C:
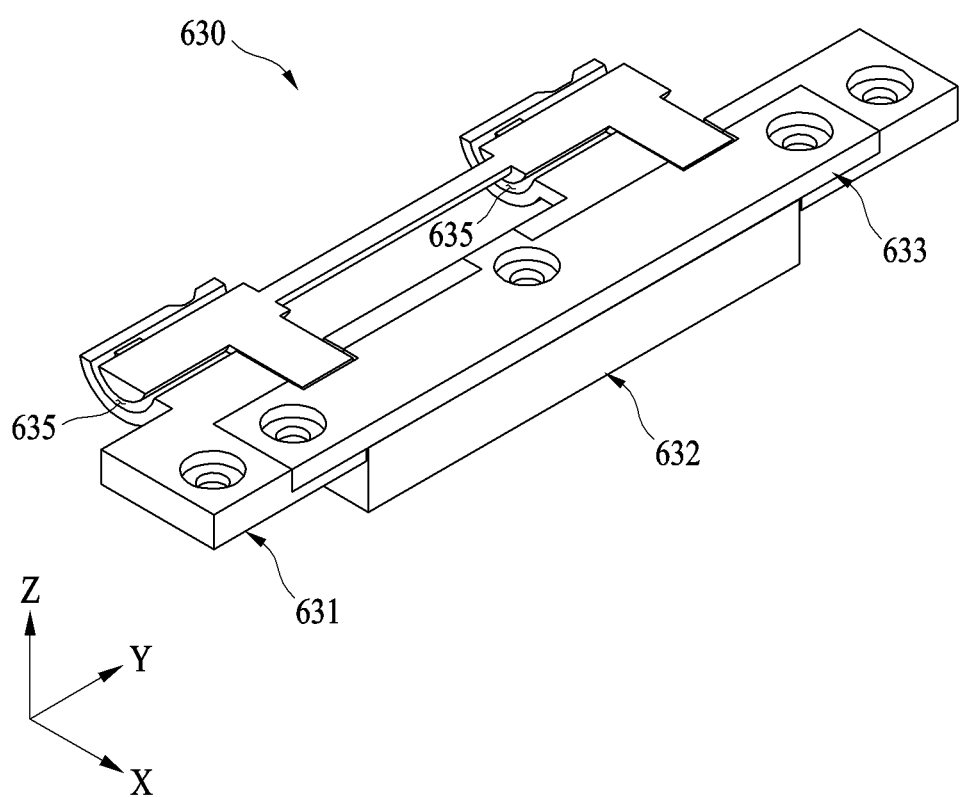
FIG. 7C is a perspective view illustrating a second rotator according to an example embodiment.
Figure 7D:
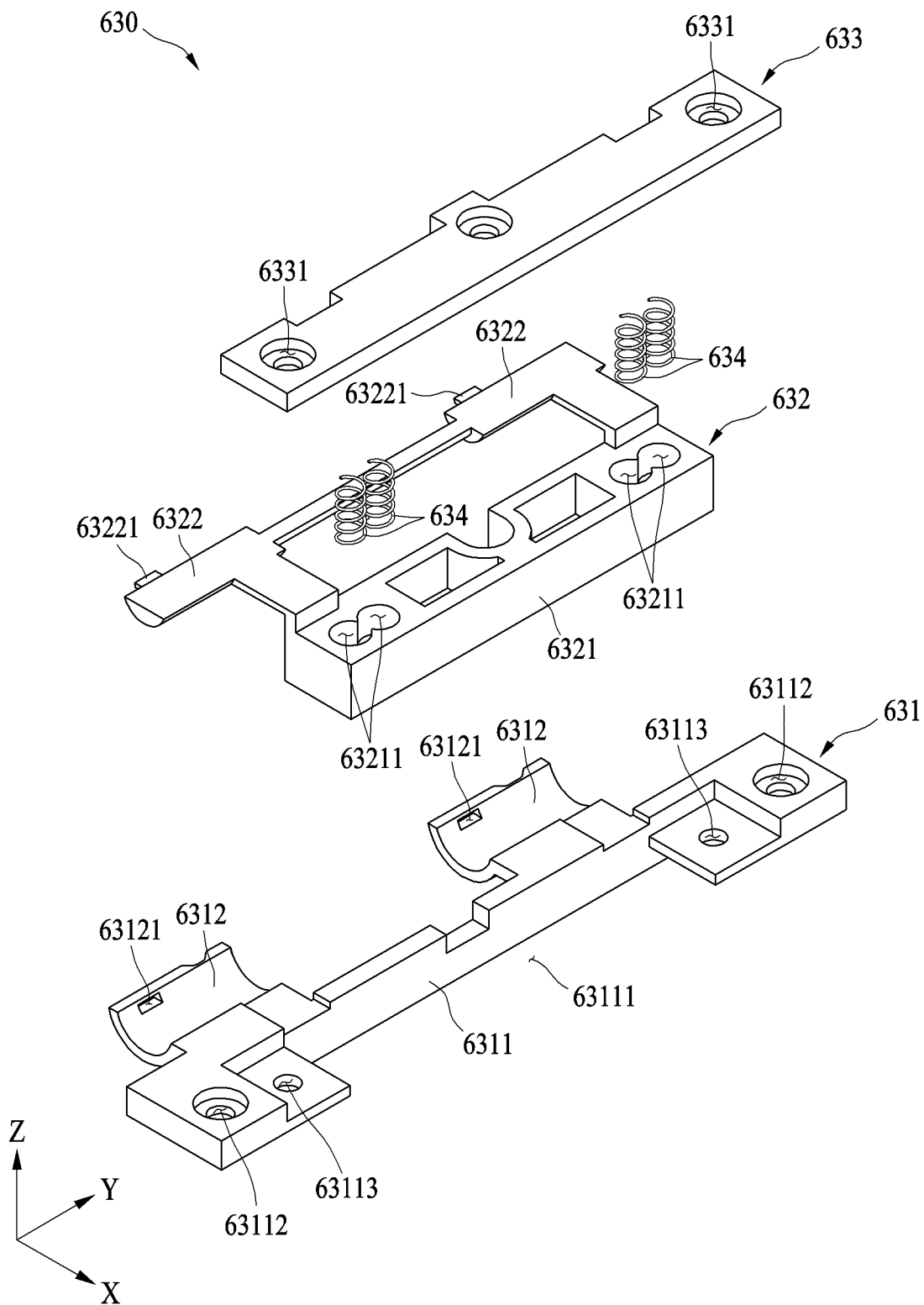
FIG. 7D is an exploded perspective view illustrating the second rotator according to an example embodiment.
Figure 7E:
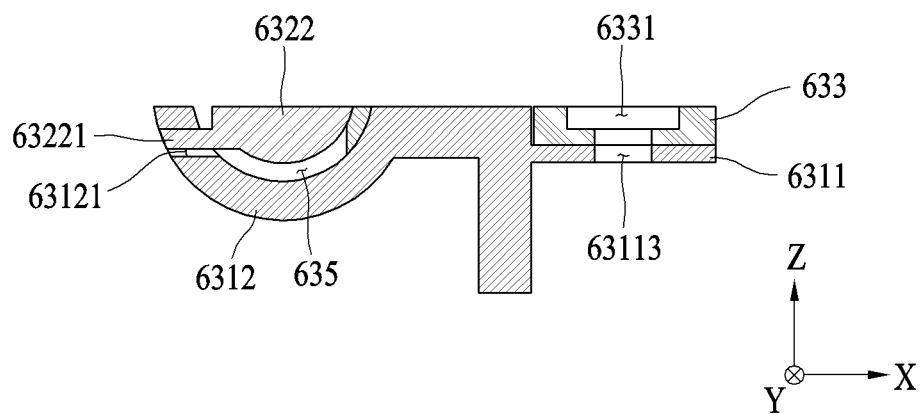
FIG. 7E is a cross-sectional view taken along line H-H of FIG. 7B.
Figure 7F:
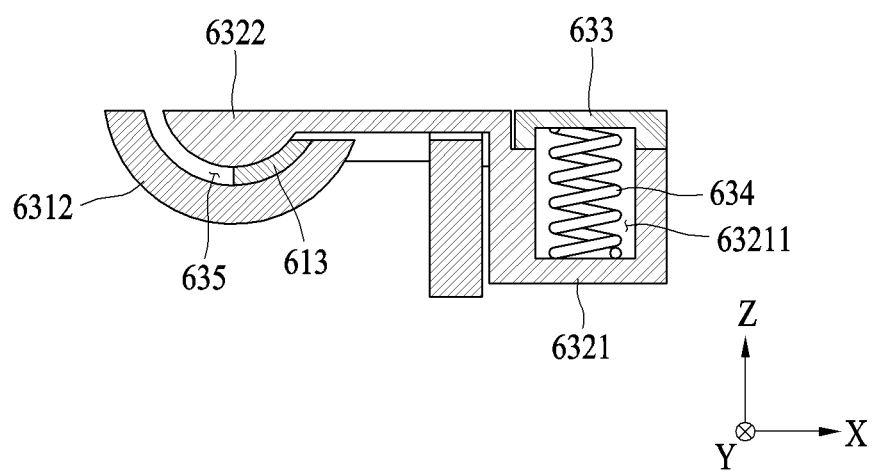
FIG. 7F is a cross-sectional view taken along line I-I of FIG. 7B.

FIG. 7A is a perspective view illustrating a hinge assembly according to an example embodiment. FIG. 7B is a front view illustrating the hinge assembly according to an example embodiment. FIG. 7C is a perspective view illustrating a second rotator according to an example embodiment. FIG. 7D is an exploded perspective view illustrating the second rotator according to an example embodiment. FIG. 7E is a cross-sectional view taken along line H-H of FIG. 7B, and FIG. 7F is a cross-sectional view taken along line I-I of FIG. 7B.

Referring to FIGS. 7A to 7F, a first rotator 620 and a second rotator 630 of a hinge assembly 600 according to an example embodiment may include a structure that may increase a rotational resistance to a hinge bracket 610. To describe structures of the first rotator 620 and the second rotator 630, for ease of description, the description is provided based on the second rotator 630. However, one of ordinary skill in the art may obviously understand that the first rotator 620 may be formed in substantially the same structure as the structure of the second rotator 630 described below.

In an example embodiment, the second rotator 630 may include a first frame 631, a second frame 632, a cover frame 633, and an elastic body 634.

In an example embodiment, the first frame 631 may include a first main frame 6311 and a first rotation guide 6312.

In an example embodiment, the first main frame 6311 may be formed in a longitudinal direction (e.g., the y-axis direction). A second frame disposition space 63111 may be formed between the upper end (e.g., the end in the +Y direction) and the lower end (e.g., the end in the −Y direction) of the first main frame 6311. The second frame disposition space 63111 may be a space in which the second frame 632 is disposed. A housing fixing hole 63112 and first cover frame fastening holes 63113 may be formed in the upper end (e.g., the end in the +Y direction) and the lower end (e.g., the end in the −Y direction) of the first main frame 6311. The housing fixing hole 63112 may be a hole to fix the second rotator 630 to a second housing (e.g., the second housing 312 of FIG. 3). The first cover frame fastening holes 63113 may be a hole to fasten the first frame 631 to the cover frame 633. In the upper end (e.g., the end in the +Y direction) of the first main frame 6311, the housing fixing hole 63112 may be formed at a relatively upper side (e.g., the +Y direction side) of the first cover frame fastening hole 63113, and in the lower end (e.g., the end in the −Y direction) of the first main frame 6311, the housing fixing hole 63112 may be formed at a relatively lower side (e.g., the −Y direction side) of the first cover frame fastening hole 63113. The front surface (e.g., the surface in the +Z direction) of the first main frame 6311 may be formed to be stepped such that a surface in which the first cover frame fastening hole 63113 is formed is at a lower height in the z-axis direction than a surface in which the housing fixing hole 63112 is formed.

In an example embodiment, the first rotation guide 6312 may extend from one side (e.g., the −X direction side) of the first main frame 6311. The first rotation guide 6312 may include an arc shape having a first diameter with the second hinge axis Hb as a center. A space in which a second rotation guide 6322 of the second frame 632 is disposed may be formed on the upper side (e.g., the +Z direction side) of the first rotation guide 6312. A pair of first rotation guides 6312 may be formed and spaced apart from each other in a longitudinal direction (e.g., the y-axis direction) of the first main frame 6311. A second helical structure (e.g., the second helical structure 433 of FIG. 4H) may be formed in the lower side (e.g., the −Z direction side) of the first rotation guide 6312. For example, a third helical groove (e.g., the third helical groove 4331 of FIG. 4H) and a fourth helical groove (e.g., the fourth helical groove 4332 of FIG. 4H) may be formed respectively in lower sides (e.g., the −Z direction side) of the pair of first rotation guides 6312.

In an example embodiment, a clasp connecting hole 63121 may be formed in one side (e.g., the −X direction side) of the first rotation guide 6312. For example, the clasp connecting hole 63121 may be formed in upper end (e.g., the end in the +Z direction) of the one side (e.g., the −X direction side) of the first rotation guide 6312. The clasp connecting hole 63121 may be formed to penetrate the first rotation guide 6312 in the XX direction. The clasp connecting hole 63121 may be a space for inserting a clasp 63221 of the second frame 632.

In an example embodiment, the second frame 632 may be positioned on the upper side (e.g., the +Z direction side) of the first frame 631. The second frame 632 may include a second main frame 6321 and the second rotation guide 6322.

In an example embodiment, the second main frame 6321 may be formed in a longitudinal direction (e.g., the y-axis direction). The second main frame 6321 may be disposed in the second frame disposition space 63111 formed in the first main frame 6311. An elastic body disposition space 63211 may be formed in the second main frame 6321. The elastic body disposition space 63211 may be recessed from the front surface (e.g., the surface in the +Z direction) of the second main frame 6321 such that the upper side of the elastic body disposition space 63211 is opened. A plurality of elastic body disposition spaces 63211 may be formed. For example, as shown in FIG. 7D, four elastic body disposition spaces 63211 may be formed. However, this is an example, and the number, the shape, and/or the location of the elastic body disposition spaces 63211 are not limited thereto.

In an example embodiment, the second rotation guide 6322 may extend from one side (e.g., the −X direction side) of the second main frame 6321. The second rotation guide 6322 may include an arc shape having a second diameter with the second hinge axis Hb as a center. The second diameter of the second rotation guide 6322 may be less than the first diameter of the first rotation guide 6312. A pair of second rotation guides 6322 may be formed and spaced apart from each other in a longitudinal direction (e.g., the y-axis direction) of the second main frame 6321. The pair of second rotation guides 6322 may be connected to each other in the y-axis direction. The pair of second rotation guides 6322 may be formed respectively at locations corresponding to the pair of first rotation guides 6312. The second rotation guide 6322 may be positioned in an upper side (e.g., the +Z direction side) space of the first rotation guide 6312. The second rotation guide 6322 may be disposed on the upper side (e.g., the +Z direction side) of the first rotation guide 6312 by being spaced and space apart therefrom to form a rotation rail 635 between the first rotation guide 6312 and the second rotation guide 6322. The rotation rail 635 may interoperate with a fixed rotation rail structure 613 formed in the hinge bracket 610. For example, the fixed rotation rail structure 613 may be inserted into the rotation rail 635 and the fixed rotation rail structure 613 may rotate on the second hinge axis Hb along the rotation rail 635 within a designated angle range. According to the structure above described, the second rotator 630 may rotate on the second hinge axis Hb within the designated angle range with respect to the hinge bracket 610.

In an example embodiment, a clasp 63221 may be formed on one side (e.g., the −X direction side) of the second rotation guide 6322. For example, the clasp 63221 may protrude from the upper end (e.g., the end in the +Z direction) of one side (e.g., the −X direction side) of the second rotation guide 6322 toward the −X direction. The clasp 63221 may be formed at a location and/or in a shape corresponding to the clasp connecting hole 63121. When the second frame 632 is connected to the first frame 631, the clasp 63221 may be inserted into the clasp connecting hole 63121.

In an example embodiment, the cover frame 633 may be formed in a longitudinal direction (e.g., the y-axis direction). Second cover frame fastening holes 6331 may be formed in the upper end (e.g., the end in the +Y direction) and the lower end (e.g., the end in the −Y direction) of the cover frame 633, respectively. The second cover frame fastening hole 6331 may be a hole to fasten the first frame 631 to the cover frame 633. The cover frame 633 may be positioned on the upper side (e.g., the +Z direction side) of the second frame 632 and may cover the second main frame 6321. The cover frame 633 may be connected to the first main frame 6311 and cover the second main frame 6321. For example, as a fastening member (e.g., a screw, a bolt, a pin, and/or a counterpart structure) is inserted into the first cover frame fastening holes 63113 and the second cover frame fastening holes 6331, the cover frame 633 may be connected to the first main frame 6311.

In an example embodiment, the elastic body 634 may be positioned between the second main frame 6321 and the cover frame 633. The elastic body 634 may be disposed in the elastic body disposition space 63211 formed in the second main frame 6321. The elastic body 634 may be provided in a number corresponding to the number of elastic body disposition spaces 63211. When the elastic body 634 is disposed in the elastic body disposition space 63211, the open upper side (e.g., the +Z direction side) of the elastic body disposition space 63211 may be covered by the cover frame 633. The elastic body 634 may provide an elastic force that presses the second frame 632 in a downward direction (e.g., the −z direction) with respect to the cover frame 633. When the fixed rotation rail structure 613 formed in the hinge bracket 610 is inserted between the second rotation guide 6322 and the first rotation guide 6312 and the clasp 63221 of the second frame 632 is fastened to the clasp connecting hole 63121 of the first frame 631, as the elastic body 634 presses the second frame 632 in the downward direction (e.g., the −z direction), a gap between the second rotation guide 6322 and the first rotation guide 6312 may narrow, and thus, the second rotation guide 6322, the first rotation guide 6312, and the fixed rotation rail structure 613 may adhere to each other. Accordingly, a friction force generated between the fixed rotation rail structure 613 and the second rotation guide 6322 and between the fixed rotation rail structure 613 and the first rotation guide 6312 may increase and a resistance force in the rotation operation of the second rotator 630 may increase, and thus, the free stop performance that maintains the intermediate state when the hinge assembly 600 is in the intermediate state may be improved.

According to an example embodiment, the electronic device 300 includes the display 250 which is foldable, the display 250 including the first area 251, the second area 252, and the folding area 253 between the first area 251 and the second area 252, a housing comprising the first housing 311 corresponding to the first area 251 and the second housing 312 corresponding to the second area 252, the hinge assembly 400 which is foldable together with the display 250, corresponds to the folding area 253 of the display 250, and connects the first housing 311 to the second housing 312, where the hinge assembly 400 may include the hinge bracket 410 defining the first hinge axis Ha and the second hinge axis Hb which is spaced apart from the first hinge axis Ha, the first rotator 420 and the second rotator 430 both connected to the hinge bracket 410 and respectively rotatable about the first hinge axis Ha and the second hinge axis Hb, the first slider 440 and the second slider 450 both connected to the hinge bracket 410, slidable relative to the hinge bracket 410 in a direction parallel with the first hinge axis Ha or the second hinge axis Hb, and spaced apart from each other in the direction parallel with the first hinge axis Ha or the second hinge axis Hb, the first rotator 420 which includes a first helical structure 423 having a helical shape in a direction with the first hinge axis Ha as a center, and is connected to both the first slider 440 and the second slider 450 through the first helical structure 423, the second rotator 430 which includes a second helical structure 433 having a helical shape in a direction with the second hinge axis Hb as a center, and is connected to both the first slider 440 and the second slider 450 through the second helical structure 433, and the elastic member 460 between the first slider 440 and the second slider 450 and configured to provide an elastic force in the direction parallel with the first hinge axis Ha or the second hinge axis Hb.

In an example embodiment, within the first rotator 420, the first helical structure 423 may include the first helical groove 4231 and the second helical groove 4232, and within the second rotator 430, the second helical structure 433 may include the third helical groove 4331 and the fourth helical groove 4332.

In an example embodiment, the first slider 440 may include the first helical projection 443 engaged with the first helical groove 4231 of the first rotator 420 and slidable along the first helical groove 4231, and the third helical projection 444 engaged with the third helical groove 4331 of the second rotator 430 and slidable along the third helical groove 4331, and the second slider 450 may include the second helical projection 453 engaged with the second helical groove 4232 of the first rotator 420 and slidable along the second helical groove 4232, and the fourth helical projection 454 engaged with the fourth helical groove 4332 of the second rotator 430 and slidable along the fourth helical groove 4332.

In an example embodiment, the elastic member 460 may provide the elastic force in a direction in which the first slider 440 and the second slider 450 are spaced apart from each other.

In an example embodiment, the first helical structure 423 of the first rotator 420 comprise a first surface 42310 of the first helical groove 4231 and a second surface 42320 of the second helical groove 4232, the first and second surface 42310, 42320 facing each other, the first helical projection 443 of the first slider 440 may contact the first surface 42310 of the first helical groove 4231, the second helical projection 453 of the second slider 450 may contact the second surface 42320 of the second helical groove 453.

In an example embodiment, the first surface 42310 of the first helical groove 4231 may include the first inclined surface 42311 where the normal line has the first angle a1 with respect to a direction parallel with the first hinge axis Ha and the second inclined surface 42312 where the normal has the second angle a2 with respect to the direction parallel with the first hinge axis Ha, and the second surface 42320 of the second helical groove 4232 may include the third inclined surface 42321 where the normal line has the second angle a2 with respect to the direction parallel with the first hinge axis Ha and the fourth inclined surface 42322 where the normal line has the first angle a1 with respect to the direction parallel with the first hinge axis Ha.

In an example embodiment, the hinge assembly 400 which is unfolded disposes the first helical projection 443 of the first slider 440 contacting the first inclined surface 42311 of the first helical groove 4231 of the first rotator 423, together with the second helical projection 453 of the second slider 450 contacting the third inclined surface 42321 of the second helical groove 4232 of the first rotator 420, the hinge assembly 400 which is fully folded disposes the first helical projection 443 of the first slider 440 contacting the second inclined surface 42312 of the first helical groove 4231 of the first rotator 420, together with the second helical projection 453 of the second slider 450 contacting the fourth inclined surface 42322 of the second helical groove 4232 of the first rotator 420, and the hinge assembly 400 which is partially folded disposes the first helical projection 443 of the first slider 440 contacting the second inclined surface 42312 of the first helical groove 4231 of the first rotator 420, together with the second helical projection 453 of the second slider 350 contacting the third inclined surface 42321 of the second helical groove 4232 of the first rotator 420.

In an example embodiment, the first angle a1 and the second angle a2 may be less than or equal to about 45 degrees and the second angle a2 may be greater than the first angle a1, or the first angle a1 and the second angle a2 may be greater than or equal to about 45 degrees and less than or equal to about 90 degrees and the second angle a2 may be less than the first angle a1.

In an example embodiment, each of the first helical projection 443 of the first slider 440 and the second helical projection 453 of the second slider 450 has a corner 4431, 4531, the normal line of each of the first helical projection 443 and the second helical projection 453 may have the first angle a1 with respect to the first hinge axis Ha, together with the normal line of the corner 4431, 4531 of each of the first helical projection 443 and the second helical projection 453 may have the second angle a2 with respect to the first hinge axis Ha.

In an example embodiment, with respect to an axis parallel with the first hinge axis Ha or the second hinge axis Hb, the third helical groove 4331, the fourth helical groove 4332, the third helical projection 444, and the fourth helical projection 454 may include shapes respectively symmetrical to the first helical groove 4231, the second helical groove 4232, the first helical projection 443, and the second helical projection 453, respectively.

In an example embodiment, the electronic device 300 may further include the bracket cover 570 which is connected to the hinge bracket 510 and covers the first slider 540 and the second slider 550, and the bracket cover 570 pressing both of the first slider 540 and the second slider 550 to the hinge bracket 510 and defining a friction force between the hinge bracket 510 and the first slider 540 and between the hinge bracket 510 and the second slider 550.

In an example embodiment, the first rotator 620 and the second rotator 630 each may include the first frame 631 including the first main frame 6311, and the first rotation guide 6312 which extends from the first main frame 6311, the first rotation guide 6312 including an arc shape having the first diameter, and the second frame 632 on the first frame 631, the second frame 632 including the second main frame 6321 and the second rotation guide 6322 which extends from the second main frame 6321, the second rotation guide 6322 including an arc shape having the second diameter, less than the first diameter, where the second rotation guide 6322 of the second frame 632 may be spaced apart from the first rotation guide 6312 of the first frame 631 to form the rotation rail 635 between the first rotation guide 6312 and the second rotation guide 6322.

In an example embodiment, the first frame 631 may further include the clasp connecting hole 63121 penetrating one side of the first rotation guide 6312, and the second frame 632 may further include the clasp 63221 protruding from one side of the second rotation guide 6322 which corresponds to the one side of the first rotation guide 6312, and configured to be inserted into the clasp connecting hole 63121 of the first frame 631.

In an example embodiment, the first rotator 620 and the second rotator 630 each may further include a cover frame 633 connected to the first main frame 6311 to cover the second main frame 6321.

In an example embodiment, the first rotator 620 and the second rotator 630 each may further include the elastic body 634 between the second main frame 6321 and the cover frame 633, the elastic body 634 pressing the second frame 632 away from the cover frame 633.

According to an example embodiment, the hinge assembly 400 includes the hinge bracket 410 corresponding to a folding area 253 of an electronic device 300, the hinge bracket 410 defining the first hinge axis Ha and the second hinge axis Hb, the first rotator 420 and the second rotator 430 both corresponding to a non-folding area 251, 252 of the electronic device 200 which is adjacent to the folding area 253, and both connected to the hinge bracket 410 and respectively rotatable about the first hinge axis Ha and the second hinge axis Hb of the hinge bracket 410, the first slider 440 and the second slider 450 both connected to the hinge bracket 410, slidable relative to the hinge bracket 410 in a direction parallel with the first hinge axis Ha or the second hinge axis Hb, and spaced apart from each other in the direction parallel with the first hinge axis Ha or the second hinge axis Hb, the first rotator 420 which includes a first helical structure 423 having a helical shape in a direction with the first hinge axis Ha as a center, and is connected to both the first slider 440 and the second slider 450 through the first helical structure 423, the second rotator 430 which includes a second helical structure 433 having a helical shape in a direction with the second hinge axis Hb as a center, and is connected to both the first slider 440 and the second slider 450 through the second helical structure 433, and the elastic member 460 between the first slider 440 and the second slider 450 and configured to provide an elastic force in the direction parallel with the first hinge axis Ha or the second hinge axis Hb.

In an example embodiment, within the first rotator 420, the first helical structure 423 may include the first helical groove 4231 and the second helical groove 4232, within the second rotator 430, the second helical structure 433 may include the third helical groove 4331 and the fourth helical groove 4332, the first slider 440 may include the first helical projection 443 engaged with the first helical groove 4231 of the first rotator 420 and slidable along the first helical groove 4231, and the third helical projection 444 engaged with the third helical groove 4331 of the second rotator 430 and slidable along the third helical groove 4331, and the second slider 450 may include the second helical projection 453 engaged with the second helical groove 4232 of the first rotator 420 and slidable along the second helical groove 4232, and the fourth helical projection 454 engaged with the fourth helical groove 4332 of the second rotator 430 and slidable along the fourth helical groove 4332.

In an example embodiment, the first helical structure 423 of the first rotator 420 may comprise: a first surface 42310 of the first helical groove 4231 which includes: a first inclined surface 42311 where a normal line has a first angle a1 with respect to a direction parallel with the first hinge axis Ha, and a second inclined surface 42312 where a normal line has a second angle a2 with respect to the direction parallel with the first hinge axis Ha, and a second surface 42320 of the second helical groove 4232 which faces the first surface 42310 and includes: a third inclined surface 42321 where a normal line has the second angle a2 with respect to the direction parallel with the first hinge axis Ha, and a fourth inclined surface 42322 where a normal line has the first angle a1 with respect to the direction parallel with the first hinge axis Ha, the first helical projection 443 of the first slider 440 contacts the first surface 42310 of the first helical groove 4231, and the second helical projection 453 of the second slider 450 contacts the second surface 42310 of the second helical groove 4231.

In an example embodiment, the hinge assembly 400 which is unfolded disposes the first helical projection 443 of the first slider 440 contacting the first inclined surface 42311 of the first helical groove 4231 of the first rotator 423, together with the second helical projection 453 of the second slider 450 contacting the third inclined surface 42321 of the second helical groove 4232 of the first rotator 420, the hinge assembly 400 which is fully folded disposes the first helical projection 443 of the first slider 440 contacting the second inclined surface 42312 of the first helical groove 4231 of the first rotator 420, together with the second helical projection 453 of the second slider 450 contacting the fourth inclined surface 42322 of the second helical groove 4232 of the first rotator 420, and the hinge assembly 400 which is partially folded disposes the first helical projection 443 of the first slider 440 contacting the second inclined surface 42312 of the first helical groove 4231 of the first rotator 420, together with the second helical projection 453 of the second slider 350 contacting the third inclined surface 42321 of the second helical groove 4232 of the first rotator 420.

In an example embodiment, the first angle a1 and the second angle a2 may be less than or equal to about 45 degrees and the second angle a2 may be greater than the first angle a1, or the first angle a1 and the second angle a2 may be greater than or equal to about 45 degrees and less than or equal to about 90 degrees and the second angle a2 may be less than the first angle a1.

What is claimed is:

1. An electronic device comprising:
  a display which is foldable, the display comprising a first area, a second area, and a folding area between the first area and the second area;
  a housing comprising a first housing corresponding to the first area, and a second housing corresponding to the second area; and
  a hinge assembly which is foldable together with the display, corresponds to the folding area of the display, and connects the first housing to the second housing,
  wherein the hinge assembly comprises:
    a hinge bracket defining a first hinge axis and a second hinge axis which is spaced apart from the first hinge axis;
    a first rotator and a second rotator both connected to the hinge bracket and respectively rotatable about the first hinge axis and the second hinge axis;
    a first slider and a second slider both connected to the hinge bracket, slidable relative to the hinge bracket in a direction parallel with the first hinge axis or the second hinge axis, and spaced apart from each other in the direction parallel with the first hinge axis or the second hinge axis;
    the first rotator which includes a first helical structure having a helical shape in a direction with the first hinge axis as a center, and is connected to both the first slider and the second slider through the first helical structure;
    the second rotator which includes a second helical structure having a helical shape in a direction with the second hinge axis as a center, and is connected to both the first slider and the second slider through the second helical structure; and an elastic member between the first slider and the second slider and configured to provide an elastic force in the direction parallel with the first hinge axis or the second hinge axis.

2. The electronic device of claim 1, wherein
within the first rotator, the first helical structure comprises a first helical groove and a second helical groove, and
within the second rotator, the second helical structure comprises a third helical groove and a fourth helical groove.

3. The electronic device of claim 2, wherein
the first slider comprises a first helical projection engaged with the first helical groove of the first rotator and slidable along the first helical groove, and a third helical projection engaged with the third helical groove of the second rotator and slidable along the third helical groove, and
the second slider comprises a second helical projection engaged with the second helical groove of the first rotator and slidable along the second helical groove, and a fourth helical projection engaged with the fourth helical groove of the second rotator and slidable along the fourth helical groove.

4. The electronic device of claim 3, wherein the elastic member provides the elastic force in a direction in which the first slider and the second slider are spaced apart from each other.

5. The electronic device of claim 4, wherein
the first helical structure of the first rotator comprise a first surface of the first helical groove and a second surface of the second helical groove, the first and second surface facing each other,
the first helical projection of the first slider contacts the first surface of the first helical groove, and
the second helical projection of the second slider contacts the second surface of the second helical groove.

6. The electronic device of claim 5, wherein
the first surface of the first helical groove comprises:
    a first inclined surface where a normal line has a first angle with respect to a direction parallel with the first hinge axis, and
    a second inclined surface where a normal line has a second angle with respect to the direction parallel with the first hinge axis, and
the second surface of the second helical groove comprises:
    a third inclined surface where a normal line has the second angle with respect to the direction parallel with the first hinge axis, and
    a fourth inclined surface where a normal line has the first angle with respect to the direction parallel with the first hinge axis.

7. The electronic device of claim 6, wherein
the hinge assembly which is unfolded disposes the first helical projection of the first slider contacting the first inclined surface of the first helical groove of the first rotator, together with the second helical projection of the second slider contacting the third inclined surface of the second helical groove of the first rotator,
the hinge assembly which is fully folded disposes the first helical projection of the first slider contacting the second inclined surface of the first helical groove of the first rotator, together with the second helical projection of the second slider contacting the fourth inclined surface of the second helical groove of the first rotator, and
the hinge assembly which is partially folded disposes the first helical projection of the first slider contacting the second inclined surface of the first helical groove of the first rotator, together with the second helical projection of the second slider contacting the third inclined surface of the second helical groove of the first rotator.

8. The electronic device of claim 7, wherein
the first angle and the second angle are less than or equal to about 45 degrees, and the second angle is greater than the first angle, or
the first angle and the second angle are greater than or equal to about 45 degrees and less than or equal to about 90 degrees, and the second angle is less than the first angle.

9. The electronic device of claim 8, wherein
each of the first helical projection of the first slider and the second helical projection of the second slider has a corner,
a normal line of each of the first helical projection and the second helical projection has the first angle with respect to the first hinge axis, together with a normal line of the corner of each of the first helical projection and the second helical projection having the second angle with respect to the first hinge axis.

10. The electronic device of claim 9, wherein with respect to an axis parallel with the first hinge axis or the second hinge axis, the third helical groove, the fourth helical groove, the third helical projection and the fourth helical projection comprise shapes respectively symmetrical to the first helical groove, the second helical groove, the first helical projection, and the second helical projection, respectively.

11. The electronic device of claim 1, further comprising:
    a bracket cover which is connected to the hinge bracket and covers the first slider and the second slider, and
    the bracket cover pressing both of the first slider and the second slider to the hinge bracket and defining a friction force between the hinge bracket and the first slider and between the hinge bracket and the second slider.

12. The electronic device of claim 1, wherein
the first rotator and the second rotator each comprise:
    a first frame comprising a first main frame, and a first rotation guide which extends from the first main frame, the first rotation guide comprising an arc shape having a first diameter; and
    a second frame on the first frame, the second frame comprising a second main frame and a second rotation guide which extends from the second main frame, the second rotation guide comprising an arc shape having a second diameter less than the first diameter, and
the second rotation guide of the second frame is spaced apart from the first rotation guide of the first frame to form a rotation rail between the first rotation guide and the second rotation guide.

13. The electronic device of claim 12, wherein
the first frame further comprises a clasp connecting hole penetrating one side of the first rotation guide, and
the second frame further comprises a clasp protruding from one side of the second rotation guide which corresponds to the one side of the first rotation guide, and configured to be inserted into the clasp connecting hole of the first frame.

14. The electronic device of claim 13, wherein the first rotator and the second rotator each further comprise a cover frame connected to the first main frame to cover the second main frame.

15. The electronic device of claim 14, wherein the first rotator and the second rotator each further comprise an elastic body between the second main frame and the cover frame, the elastic body pressing the second frame away from the cover frame.

16. A hinge assembly comprising:
a hinge bracket corresponding to a folding area of an electronic device, the hinge bracket defining a first hinge axis and a second hinge axis;
a first rotator and a second rotator both corresponding to a non-folding area of the electronic device which is adjacent to the folding area, and both connected to the hinge bracket and respectively rotatable about the first hinge axis and the second hinge axis of the hinge bracket;
a first slider and a second slider both connected to the hinge bracket, slidable relative to the hinge bracket in a direction parallel with the first hinge axis or the second hinge axis, and spaced apart from each other in the direction parallel with the first hinge axis or the second hinge axis;
the first rotator which includes a first helical structure having a helical shape in a direction with the first hinge axis as a center, and is connected to both the first slider and the second slider through the first helical structure;
the second rotator which includes a second helical structure having a helical shape in a direction with the second hinge axis as a center, and is connected to both the first slider and the second slider through the second helical structure; and
an elastic member between the first slider and the second slider and configured to provide an elastic force in the direction parallel with the first hinge axis or the second hinge axis.

17. The hinge assembly of claim 16, wherein
within the first rotator, the first helical structure comprises a first helical groove and a second helical groove,
within the second rotator, the second helical structure comprises a third helical groove and a fourth helical groove,
the first slider comprises a first helical projection engaged with the first helical groove of the first rotator and slidable along the first helical groove, and a third helical projection engaged with the third helical groove of the second rotator and slidable along the third helical groove, and
the second slider comprises a second helical projection engaged with the second helical groove of the first rotator and slidable along the second helical groove, and a fourth helical projection engaged with the fourth helical groove of the second rotator and slidable along the fourth helical groove.

18. The hinge assembly of claim 17, wherein
the first helical structure of the first rotator comprise:
a first surface of the first helical groove which includes:
a first inclined surface where a normal line has a first angle with respect to a direction parallel with the first hinge axis, and
a second inclined surface where a normal line has a second angle with respect to the direction parallel with the first hinge axis, and
a second surface of the second helical groove which faces the first surface and includes:
a third inclined surface where a normal line has the second angle with respect to the direction parallel with the first hinge axis, and
a fourth inclined surface where a normal line has the first angle with respect to the direction parallel with the first hinge axis,
the first helical projection of the first slider contacts the first surface of the first helical groove, and
the second helical projection of the second slider contacts the second surface of the second helical groove.

19. The hinge assembly of claim 18, wherein
the hinge assembly which is unfolded disposes the first helical projection of the first slider contacting the first inclined surface of the first helical groove of the first rotator, together with the second helical projection of the second slider contacting the third inclined surface of the second helical groove of the first rotator,
the hinge assembly which is fully folded disposes the first helical projection of the first slider contacting the second inclined surface of the first helical groove of the first rotator, together with the second helical projection of the second slider contacting the fourth inclined surface of the second helical groove of the first rotator, and
the hinge assembly which is partially folded disposes the first helical projection of the first slider contacting the second inclined surface of the first helical groove of the first rotator, together with the second helical projection of the second slider contacting the third inclined surface of the second helical groove of the first rotator.

20. The hinge assembly of claim 19, wherein
the first angle and the second angle are less than or equal to about 45 degrees and the second angle is greater than the first angle, or
the first angle and the second angle are greater than or equal to about 45 degrees and less than or equal to about 90 degrees and the second angle is less than the first angle.

* * * * *